(12) United States Patent
Miles

(10) Patent No.: US 10,803,432 B1
(45) Date of Patent: Oct. 13, 2020

(54) SYSTEMS AND METHODS FOR AUTOMATIC TRIGGERING OF A CODE SCANNING APPLICATION BY A USER APPLICATION

(71) Applicant: Stanley Kevin Miles, Foresthill, CA (US)

(72) Inventor: Stanley Kevin Miles, Foresthill, CA (US)

(*) Notice: Subject to any disclaimer, the term of this patent is extended or adjusted under 35 U.S.C. 154(b) by 329 days.

(21) Appl. No.: 15/833,660

(22) Filed: Dec. 6, 2017

Related U.S. Application Data

(63) Continuation-in-part of application No. 15/783,644, filed on Oct. 13, 2017, which is a continuation-in-part of application No. 15/187,469, filed on Jun. 20, 2016.

(60) Provisional application No. 62/182,369, filed on Jun. 19, 2015, provisional application No. 62/519,816, filed on Jun. 14, 2017, provisional application No. 62/553,671, filed on Sep. 1, 2017.

(51) Int. Cl.
| | |
|---|---|
| *G06F 3/048* | (2013.01) |
| *G06Q 20/14* | (2012.01) |
| *G06K 7/14* | (2006.01) |
| *G06F 16/955* | (2019.01) |

(52) U.S. Cl.
CPC ............ *G06Q 20/14* (2013.01); *G06F 3/048* (2013.01); *G06F 16/9554* (2019.01); *G06K 7/1413* (2013.01); *G06K 7/1417* (2013.01)

(58) Field of Classification Search
CPC ..... G06F 3/048; G06F 16/9554; G06Q 20/14; G06K 7/1413; G06K 7/1417
See application file for complete search history.

(56) References Cited

U.S. PATENT DOCUMENTS

| | | | |
|---|---|---|---|
| 8,627,438 B1* | 1/2014 | Bhimanaik | H04L 63/10 726/9 |
| 2002/0152179 A1 | 10/2002 | Racov | |
| 2004/0222302 A1* | 11/2004 | Matsumori | G06K 7/10851 235/472.01 |
| 2004/0249753 A1 | 12/2004 | Blinn et al. | |
| 2012/0209749 A1* | 8/2012 | Hammad | G06Q 20/20 705/27.1 |

(Continued)

OTHER PUBLICATIONS

Non-Final Office Action issued in related U.S. Appl. No. 15/187,469 dated Oct. 9, 2018, 17 pages.

*Primary Examiner* — Calvin L Hewitt, II
*Assistant Examiner* — Dennis G Keritsis
(74) *Attorney, Agent, or Firm* — Pillsbury Winthrop Shaw Pittman LLP

(57) ABSTRACT

In some embodiments, a user device may detect, via pattern recognition by a user application, a pattern (indicative of a given code type) presented on a physical object. The user device may cause, via the user application, a code scanning application to be launched based on the detection to scan the pattern. The user device may obtain, via the user application, a code (associated with a biller entity) of the given code type from the code scanning application based on the code scanning application's scan. The user device may cause, via the user application, the code or information derived from the code to be provided over the Internet to a computer system hosting accounts of a user of the user application. The code or the derived information may be used by the computer system to complete transactions between the biller entity and at least one of the accounts.

18 Claims, 14 Drawing Sheets

(56) References Cited

U.S. PATENT DOCUMENTS

| | | |
|---|---|---|
| 2013/0317984 A1 | 11/2013 | O'Leary et al. |
| 2014/0156461 A1* | 6/2014 | Lerner ............... G06Q 30/0623 |
| | | 705/26.61 |
| 2014/0279552 A1 | 9/2014 | Ortiz et al. |
| 2015/0106395 A1* | 4/2015 | Stafira ................ G06Q 30/0251 |
| | | 707/758 |
| 2016/0019547 A1 | 1/2016 | Gurnani et al. |
| 2018/0032997 A1* | 2/2018 | Gordon .............. G06Q 20/3224 |

* cited by examiner

SYSTEMS AND METHODS FOR AUTOMATIC TRIGGERING OF A CODE SCANNING APPLICATION BY A USER APPLICATION

CROSS-REFERENCE TO RELATED APPLICATIONS

This application is a continuation-in-part of and claims the priority benefit of U.S. patent application Ser. No. 15/783,644, filed Oct. 13, 2017, which is continuation-in-part of and claims the priority benefit of U.S. patent application Ser. No. 15/187,469, filed Jun. 20, 2016, which claims the priority benefit of U.S. Provisional Patent Application No. 62/182,369, filed Jun. 19, 2015. This application also claims the priority benefit of U.S. Provisional Patent Application No. 62/519,816, filed Jun. 14, 2017 and U.S. Provisional Patent Application No. 62/553,671, filed Sep. 1, 2017. The entire contents of the aforementioned applications are hereby incorporated herein by reference.

BACKGROUND OF THE INVENTION

Field of the Invention

This application relates to systems and methods for automatic triggering of a code scanning application by a user application, for example, to facilitate transaction security and a user-friendly obtainment of information corresponding to physically-presented code.

Description of the Related Technology

Code scanning applications often exist on mobile phones and other mobile devices, and a user application with code scanning features will typically provide a user with an icon (or other menu item) on its user interface that the user can activate (e.g., by clicking, tapping, or otherwise selecting the menu item) to initiate the launch of a code scanning application installed on the user's device. Upon launch, the user may use the code scanning application to scan a barcode, QR-code, or other pattern/code to obtain information from such pattern/code. Typically, to scan a second pattern/code, the user must again activate the corresponding icon on the user interface of the user application to launch the code scanning application to scan the second pattern/code. Given latency and other delay-related issues with regard to communication between the user application and the code scanning application, such typical user interfaces/applications often result in unnecessary delays for the user application to obtain information from patterns/codes presented on physical objects (e.g., when other background processes on a user device slows the transmission of a launch command from the user application to the code scanning application, delays the launch of the code scanning application, etc.), thereby resulting in a poor user experience. These or other drawbacks exist.

SUMMARY

One aspect of the disclosure may relate to automatic triggering of a code scanning application by a user application to facilitate transaction security and a user-friendly obtainment of information corresponding to physically-presented code. In some embodiments, without a user input specifically indicating launching of the code scanning application or scanning for a code, a user device (via the user application) may automatically launch the code scanning application based on one or more automated triggers to cause the code scanning application to scan a pattern presented on a physical object. As an example, the automated triggers may include (i) the user application being executed on the user device (e.g., the user application being launched, the user application's state being changed from a background state to a foreground state, thereby being set to run in the foreground, etc.), (ii) recognition of patterns indicative of a barcode, QR code, or other type of code, or (iii) other triggers. In some embodiments, the code scanning application may be automatically launched and executed in an active state in the background (e.g., performing one or more actions in the background, not running in the background as an idle process, etc.) based on the automated triggers, and then is brought to the foreground of based on one or more other triggers (e.g., another automated trigger or a user input specifying the code scanning application or the scanning of a pattern/code). The user application may obtain a code (associated with a biller entity) of a given code type from the code scanning application based on the code scanning application's scan of the pattern. The user application may cause the code or information derived from the code to be provided over the Internet or other communication network or solution (e.g., SSL Internet connection, dedicated lease line, etc.) to a computer system hosting one or more accounts of a user of the user application. The code or the information derived from the code may be used by the computer system to complete one or more transactions between the biller entity and at least one of the accounts. In this way, even if certain latency and other delay-related issues with regard to communication between the user application and the code scanning application do occur, the negative effects on the user experience is reduced. As an example, even if other background processes on a user device slows the transmission of a launch command from the user application to the code scanning application or delays the launch of the code scanning application, one or more portions of such slowdown/delays will not be noticed by the user given that the user application can initiate launching of the code scanning application before the time that the user realizes the code scanning application should be launched.

In some embodiments, in response to being launched, the code scanning application may obtain light reflected from a physical medium (on which pattern is presented) via a light sensor of the user device, and decode the reflected light to obtain the code associated with the biller entity. As an example, when the reflected light is detected, an analog signal may be generated, and then converted by the light sensor into a digital signal. The code scanning application may then interpret the digital signal to determine the code associated with the biller entity.

DETAILED DESCRIPTION OF CERTAIN INVENTIVE EMBODIMENTS

Figure 1A:
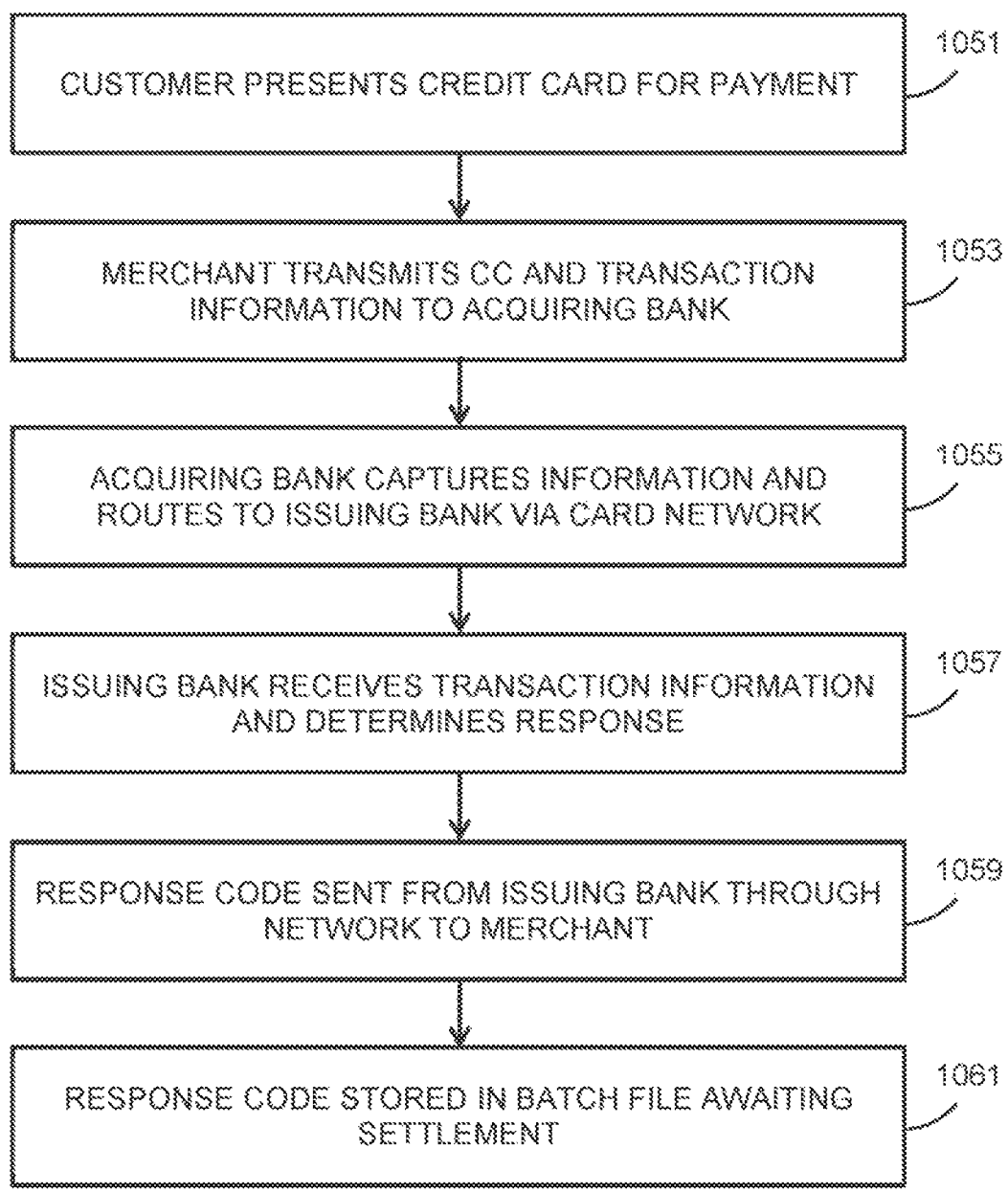
FIG. 1A is an example of a prior art payment process reflecting certain drawbacks described above.

Some embodiments of this application relate to systems and methods for a payer to electronically complete a payment to a biller without transmitting certain sensitive information, such as financial account data or personal data, to the biller, etc. Some embodiments achieve significant benefits over existing payment systems. As described above, existing payment systems are typically required to transmit sensitive information across computer networks. FIG. 1A is one example of one such payment process that suffers from this significant drawback. More particularly, FIG. 1A is a flowchart that generally depicts a current technique for processing payments between a purchaser and a seller using a credit card. The process begins at block 1051, where a customer presents a credit card to complete payment to a merchant in exchange for goods or services. The process then continues to block 1053, where the merchant transmits the customer's credit card information along with the details of the transaction to the acquiring bank associated with the merchant. This data is typically transmitted using a credit card machine, software, or some other type of payment gateway and associated network or networks thereof. This transmitted data can include sensitive data such as the credit card number, expiration date, the customer name, and other similar types of customer or otherwise payer information.

The process then continues at block 1055, where the acquiring bank (or its processor) captures the transaction information and routes it through the appropriate card network to the customer's issuing bank. Examples of card networks include but are not limited to the Banknet network provided by Mastercard, and the Visanet network provided by Visa. The issuing bank receives the transaction information at block 1057, and responds by approving or declining the transaction. In making this determination, the issuing bank (or its processor) may apply various criterions, including, but not limited to, whether the transaction information is valid, the customer has sufficient balance to make the purchase, and/or that the account is in good standing, etc. Based on this determination, the issuing bank may send a response code back through the card network to the acquiring bank and to the merchant as shown in block 1059. At block 1061, this response code may then be sent to the merchant's credit card machine, software, or gateway where it may be stored in a batch file awaiting settlement.

Some systems and methods disclosed herein provide inventive solutions to the drawbacks associated with the process described in FIG. 1A. For example, in some embodiments, systems, such as the system 100 shown in FIG. 1B, and methods are provided wherein an authorized user/payer/purchaser/shopper (e.g., a customer etc.) may make a payment transaction to a biller(s) (e.g., brick and mortar stores, government entities, service providers, products providers, online stores, web based check-out, television advertisers, utility companies, magazine advertisers, ATMs, kiosks, goods providers, and/or any entity or device that may provide or send an electronic or tangible bill to a user/payer/purchaser/shopper or even a biller that is a friend to whom payment is owed, etc.). The payment transaction may be made via the user/payer electronic device or computing device (e.g., smartphone, mobile phone, tablet, computer, etc.) to complete a purchase (e.g., for products, goods and/or services). The electronic device or computing device may be referred to herein as an authorized user payment interface device and in some embodiments may correspond to the authorized user payment interface device 104 (AUPID 104) shown in FIG. 1B.

In some such embodiments, a functionality (e.g., an application, software, and/or some internal or external hardware component(s) etc.) may be provided in or on the payer's authorized user payment interface device 104 that allows the user/payer to securely access and receive (e.g., via a user interface, via near field communication (NFC), via a secure communication channel, etc.) biller data (e.g., biller identification information, billing information, total cost/funds required, item cost, and/or address, transaction identifier, etc.) from a biller associated with the payment transaction. For example, the authorized user payment interface device 104 may communicate via a secure communication channel (e.g., NFC, WiFi, Bluetooth, infrared, RFID, QR code, local communication channel, etc.) with a biller's computing device (e.g., server, desktop, tablet, POS system, etc.) to receive the biller data. The biller's computing device may be referred to herein as a biller point of sale device (or virtual biller point of sale device) and in some embodiments may correspond to the biller point of sale device 106 (or virtual biller point of sale device 106) shown in FIG. 1B (e.g., an application, software, and/or some internal or external hardware component(s) etc.).

It should be noted, that either previously or subsequently within this disclosure, the descriptive words or term "point of sale" may be abbreviated as "POS".

The authorized user payment interface device 104 may further be configured to transmit the biller data to a computing device, such as a server, which receives the biller data such as via a secure wired and/or secure wireless connection. In some embodiments, the computing device may be a proxy server, or the computing device may be a type of management server for managing payments or payment related information, or the computing device may also be referred to herein as a secure pass-through server such as the secure pass-through server 116 shown in FIG. 1B. The secure pass-through server 116 may be integrated into or communicate with one or more financial institutions and may be securely accessed by authorized personnel only via financial computing devices (e.g., servers, workstations, etc.) that are associated with, interface with, or are integral to the one or more associated financial institutions thereof. The financial institutions may be financial institutions where the payer has one or more financial accounts and may be referred to herein as an authorized user financial institution (e.g., customer bank). In some embodiments, the financial institutions may correspond to the authorized user financial institution 120, the biller financial institution 110, or both. In some embodiments, the functionality described with respect to the secure pass-through server 116, the messaging module 108, and Bill-Pay processor 112 (or any other suitable Bill-Pay processor replacement, or additional Bill-Pay processor, including, but not limited to, any type of funds transfer network that may be used for Bill-Pay processing purposes, such as any payments processing network, or clearing house network, or "on us" Intra-Bank memo post network bank solution (described previously or subsequently within the present disclosure), or shared ledger network solution having a public or private ledger system (e.g., block chain, etc.)), may be hosted and/or otherwise controlled by the authorized user financial institution 120, the biller financial institution 110, or a plurality of both. In some embodiments, their respective functions may be performed by one device or server instead of separate devices or servers. The one device or server or separate devices or servers may be managed by and/or otherwise associated with and/or fully integrated into the technology infrastructure of the authorized user financial institution 120, the biller financial institution 110, or a plurality of both.

In some embodiments, the functionality described with respect to one or more of the secure pass-through server, management server, proxy server 116, messaging module 108 and/or Bill-Pay processor 112, may be hosted, managed, controlled and/or maintained externally of one or both of either the authorized user financial institution 120, or the biller financial institution 110. Their respective functions may be performed by one device or server instead of separate devices or servers in some embodiments.

In some embodiments, this one device or server or separate devices or servers may be fully integrated into a secure technology infrastructure that may or may not be partially or wholly controlled by, managed by, or owned by the authorized user financial institution 120, the biller financial institution 110, or a plurality of both. This one device or server or separate devices or servers may be partially or wholly controlled by, managed by, and/or owned by a third party management company or business entity that may or may not be associated with the authorized user financial institution 120, the biller financial Institution 110, or a plurality of both, yet nonetheless may securely technologically interface with the authorized user financial institution 120, the biller financial institution 110, or a plurality of both.

Figure 1B:
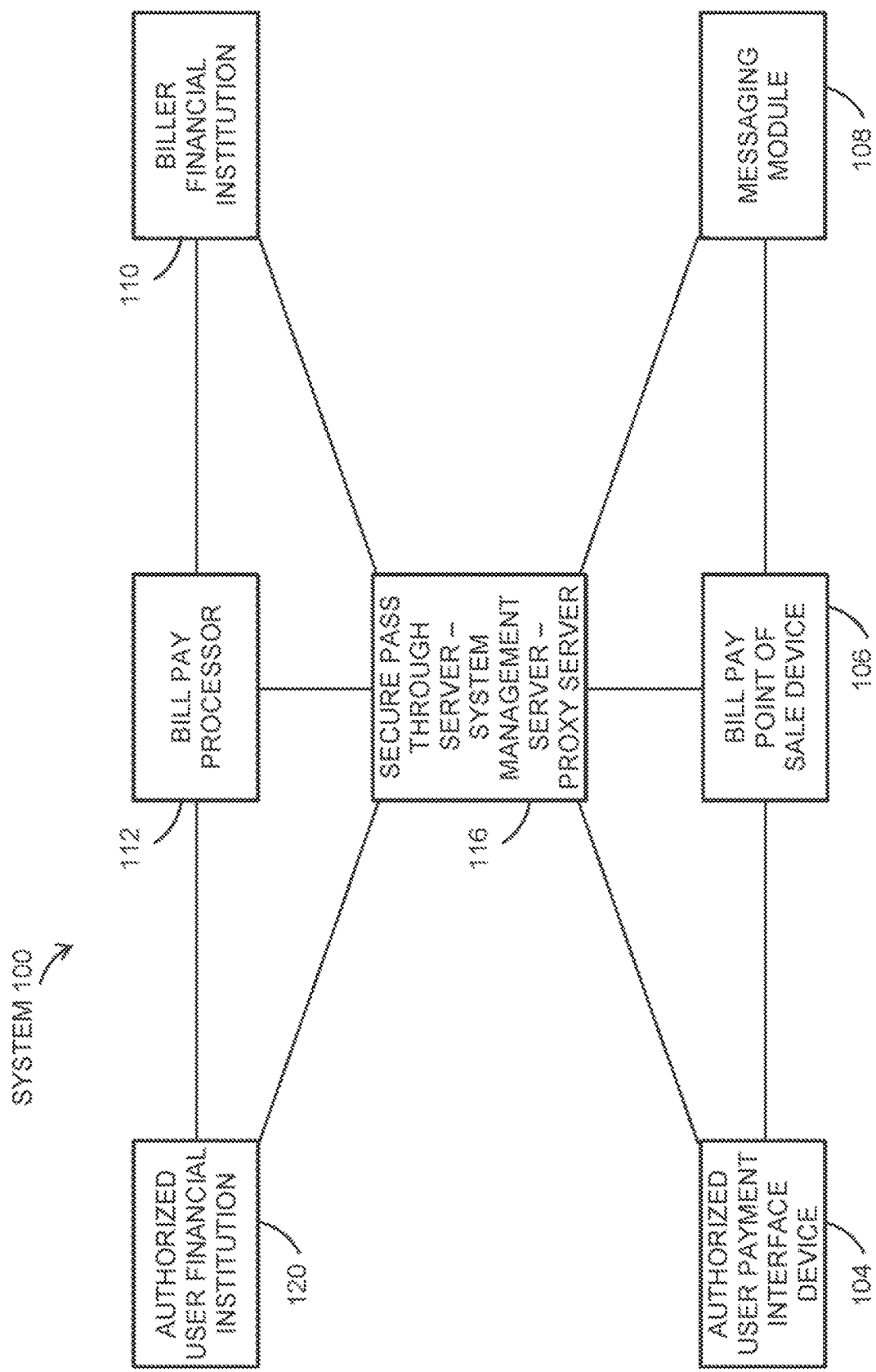
FIG. 1B illustrates an example of a system for making secure payments electronically.

In some embodiments, the authorized user payment interface device 104 may be configured to modify (e.g., format etc.) the biller data to comply with the requirements of a Bill-Pay system (which may be referred to herein as a Bill-Pay processor such as the Bill-Pay processor 112 shown in FIG. 1B) associated with the authorized user financial institution 120 or the biller financial institution 110 or associated with both, before sending the biller data to the secure pass-through server 116. It should be noted that use of any Bill-Pay system may be contemplated in accordance with some embodiments of the present technology, including, but not limited to, any type of funds transfer network or payments processing network or shared ledger network having a public or private ledger system, etc. (e.g., block chain, etc.).

In some embodiments, the authorized user payment interface device 104 may transmit the biller data to the secure pass-through server 116 and the secure pass-through server 116 may be configured to modify the biller data to comply with the requirements of the Bill-Pay processor 112. In some embodiments, the functionality described with respect to the Bill-Pay processor 112 and the authorized user financial institution 120, the biller financial Institution 110, or both, may be performed by one device or server instead of separate devices or servers. In addition, the functionality described with respect to the Bill-Pay processor 112 may be provided by a financial institution (such as the authorized user financial institution 120, or the biller financial Institution 110, or a plurality of both) as part of its service offering to customers.

In some embodiments, the roles, provisions, functions, capabilities, types of DDA's and/or Point of Sale DDA's (POSDDA's), credit lines, support etc. provided by the authorized user financial institution 120 may also be provided by the biller financial institution 110 and the roles, provisions, functions, capabilities, types of DDA's or POSDDA's, credit lines, support etc. provided by the biller financial Institution 110 may also be provided by the authorized user financial institution 120. Therefore, the authorized user financial institution 120 may also be a biller financial institution 110 and/or the biller financial Institution 110 may also be an authorized user financial institution 120. Therefore, it is to be appreciated that there may be multiple authorized user financial institutions 120 and multiple biller financial institutions 110, and either financial institution may be technologically or otherwise enabled to support or perform the same functions as the other, or either financial institution may be technologically or otherwise enabled to support or perform the same functions of both.

In some embodiments, the secure pass-through server 116 may be configured to interface and communicate with (but not limited to) the authorized user financial institution 120 (via a secure wired and/or secure wireless connection) to determine which financial accounts are associated with the user/payer based on payer identification information received from the payer's authorized user payment interface device 104, and whether there are sufficient available funds in the one or more of the associated payer's financial accounts 202, 205, 204a, 204b, 204c and/or the POSDDA 206 to complete a payment transaction to a biller.

In some embodiments, the aforementioned payer's financial accounts may include DDAs and other financial accounts not directly associated with, but linked to, the payer's POSDDA 206 at the authorized user financial institution 120. These financial accounts may include the aforementioned externally linked, bank-issued credit lines 204c and/or externally linked DDA's 205 or the like. Therefore, it should be noted that in some embodiments, with respect to funding the POSDDA 206, the associated payer thereof may direct or authorize credits and/or debits of sufficient funds from one, or more than one, of the internal or external traditional DDA's 202 and 205 and/or from one, or more than one, of the internal or external conjunctive credit line accounts 204a, 204b and 204c into the payer's POSDDA 206 to then complete a payment transaction to a biller via the Bill-Pay processor 112 associated with the payer's POSDDA 206 within the payer associated authorized user financial institution 120 (e.g., customer bank).

In some embodiments, the payer's POSDDA 206 cannot be credited or debited by or from (1) any sources other than the associated payer thereof; (2) the associated authorized user financial institution 120 in its normal authorized, permissible overriding management capacity to perform "on us" Intra-Bank memo post network credits and debits transactions upon any payer's POSDDA 206 or otherwise any financial accounts that it hosts; and (3) the associated Bill-Pay processor 112 thereof in performing any authorized debits of the payer's POSDDA 206, or otherwise receive credits from the payer's POSDDA 206 (only directed by the associated payer thereof), in order to perform and fulfill a Bill-Pay payment transaction from the associated payer thereof to a biller.

In some embodiments, only the authorized user/payer may direct or perform credit and/or debit transactions into (and/or out of) the payer associated credit lines 204 into the payer associated POSDDA 206 for the purpose of directing payment to a biller or any person, business entity, or organization, etc., that is enabled as a biller to receive funds (e.g. a payment) from the associated payer thereof.

In this context, in some embodiments the payer's conjunctive credit line accounts 204a, 204b, and 204c may not be debited or credited by or from any source other than the associated user/payer thereof. In some embodiments, any such debits or credits may only be performed in a manner whereby the associated user/payer thereof may direct funding credits from the one or more of the payer's conjunctive credit line accounts 204 into the user/payer's associated POSDDA 206 or the user/payer thereof may direct the debiting of funds from the one or more of the payer's conjunctive credit line accounts 204 into the user/payer's associated POSDDA 206 (as previously or subsequently described within this disclosure). One exception may be that the financial institution or otherwise credit issuing source of which hosts the one or more of the conjunctive credit line accounts 204a, 204b, and 204c may, in its normal authorized, permissible overriding management capacity, perform "on us" Intra-Bank memo post network credits and debits transactions upon any credit line accounts that it hosts. Therefore, with respect to a user/payer making a payment to a biller, the systems and methods for secure payment identified herein may be supported by a "sealed system" of associated accounts that may only be credited and/or debited by the aforementioned authorized parties.

To the extent that any system or method embodiment (as previously or subsequently described within this disclosure) may include payer and/or biller associated financial accounts that may only be credited and/or debited by the aforementioned authorized parties (as previously or subsequently described within this disclosure), regardless of the type or nature of the financial accounts thereof, any such system or method thereof may be deemed as a certified "sealed system" and/or any financial accounts thereof, regardless of the type or nature of the financial accounts thereof, may be deemed as certified ("sealed system") financial accounts.

It should be noted that, in some embodiments, a biller may also be a payer and perform the functions of a payer, and a payer may also be a biller and perform the functions of a biller. Therefore, both payers and billers of this system may each perform the same functions as the other or each may be enabled with, and perform, the functions of both.

Billers and payers may be members of and/or enrolled into the secure directories of this secure system in order for either to perform the functions of a payer or a biller or in order that each may perform the functions of both.

Therefore, based on this information, after a user/payer receives biller data into the user/payer's authorized user payment interface 104 from the biller point of sale device 106 (or from the virtual biller point of sale device 106) (as previously or subsequently described within this disclosure), the user/payer thereof may allow, direct, or initiate, via the authorized user payment interface device 104, the transmission of the biller data (along with payer selected, requested or determined financial account(s) to be used in completing payment to the biller) to the secure pass-through server 116 of which may send a request to the authorized user financial institution 120 (that internally hosts payer financial accounts and may be linked to external payer financial accounts) requesting information regarding the availability of sufficient funds needed (from the payer selected, requested or determined financial account(s) thereof) to complete the payment transaction to a biller. The request for available funds from the payer funding sources may be based on the biller data. The authorized user financial institution 120 may determine availability of sufficient funds by checking to see if the one or more of the payer selected internally hosted financial accounts or externally linked financial accounts (such as those described above associated with the payer as identified in FIG. 2) either individually, or as a combination of more than one, have sufficient funds to meet the required amount of funds requested to complete or fulfill payment to the biller. In some embodiments, the authorized user financial institution 120 may then send an indication or message to the secure pass-through server 116 indicating whether the payer has sufficient funds within at least one, or within a combination of more than one, financial account(s) to complete payment to the biller.

Based on the received indication or message, the secure pass-through server 116 may determine or conclude if sufficient funds are available in the one or more accounts associated with the payer to complete the payment transaction to the biller. If there are not sufficient available funds, the secure pass-through server 116 may send a message (e.g., SMS, MMS, e-mail, application specific message, etc.) including an indication (e.g., a decline code related to the payment transaction, transaction identifier, and/or payment identifier, etc.) to the authorized user payment interface device 104 and/or the biller point of sale device 106 (or the virtual biller point of sale device 106) that sufficient funds are not available and the payment transaction is not completed and may be declined or is declined. In some embodiments, the message may be sent from the secure pass-through server 116 to any one or more, or all, party(s) that may, or may not, be associated with the payment transaction, including but not limited to, any party that may host a payer account associated with a payment transaction. This may include the associated biller point of sale device 106, the biller financial institution 110, the authorized user payment interface device 104 and the authorized user financial institution 120, etc. For example, where the indication comprises a decline code and/or a transaction I.D. and/or a decline message, the biller point of sale device 106 (and all of the aforementioned parties that may or may not be associated with the payment transaction) may receive a portion, or all, of the information of a decline code and/or a transaction I.D. and/or decline message etc. from the secure pass-through server 116 that may match a portion, or all, of the same decline code and/or a transaction I.D. and/or decline message etc. received by the payer via the payer's authorized user payment interface device 104 from the secure pass-through server 116. Alternatively, the decline message may be sent to all or any one or more of the aforementioned parties from another source in the network.

If the secure pass-through server, management server, and/or proxy server 116 determines that the payer selected account or accounts (the payer POSDDA 206 and/or one or more of the other payer selected accounts, as previously identified above) hosted within or linked to the authorized user financial institution 120 provides sufficient available funds to fulfill the payment transaction to the biller, the secure pass-through server, management server, and/or proxy server 116, (or the authorized user financial institution 120 working in conjunction with the secure pass-through server, management server, proxy server 116), may perform payer directed authorized credit(s) and/or debits(s) transaction(s). This may be done with sufficient available funds (from the one or more of the payer selected accounts)

directly into the payer POSDDA 206 (unless the payer selects existing sufficient available funds from the payer POSDDA 206 only) dedicated toward fulfillment of the associated payment transaction to the biller, and the secure pass-through server 116, (or the authorized user financial institution 120 working in conjunction with the secure pass-through server, management server, proxy server 116). The biller data (e.g., the amount specified etc. in the biller data to complete the payment transaction to the biller) may be further transmitted (and payer authorization needed to effectuate or instruct the Bill-Pay processor 112) to then initiate a debit of, or receive an authorized credit from, the payer's POSDDA 206 within the authorized user financial institution 120 to perform the associated Bill-Pay payment transaction to fulfill payment into the biller DDA 107 at the biller financial institution 110. For example, after the secure pass-through server 116 determines the payer selected account or accounts will provide sufficient funds to complete or fulfill payment to the biller (i.e., either existing funds from the payer POSDDA 206 and/or funds provided into, or dedicated to be provided into, the payer POSDDA 206 from the one or more other of the payer accounts are sufficient to fulfill the authorized payment transaction to the biller, as requested only by the associated payer thereof), the secure pass-through server 116 may then transmit the appropriately formatted biller data (e.g., all or a portion of the biller data) to the payer authorized user financial institution 120 thereof, authorizing it to initiate a Bill-Payment from the associated payer POSDDA 206 therein, through the associated Bill-Pay processor 112 thereof, in order to fulfill payment to the biller on behalf of the payer.

The Bill-Pay processor 112 thereof may fulfill the payer's payment to the biller in the form of an electronic ACH credit to the biller DDA 107 held at the biller financial institution 110 or as an internal "on us" Intra-Bank direct payment made to an account of the biller held at the same financial institution of the payer (the authorized user financial institution 120 (e.g., customer bank)). Or the Bill-Pay processor may generate the payment as a paper check item sent to the biller via some form of mail service and/or parcel package carrier. The payment may otherwise be completed to the biller via a shared ledger network having a public or private ledger system (e.g., block chain etc.), or some other type of payment processing network.

After, concurrently with, or before or just before the secure pass-through server 116 transmits the data which allows the authorized user financial institution 120 to allow or initiate the Bill-Payment, the secure pass-through server 116 may send a message (e.g., SMS, MMS, e-mail, application specific message, etc.) including an indication (e.g., authorization code that is related to the payment transaction, transaction identifier, and/or payment made identifier, etc.) to the biller point of sale device 106 and/or the authorized user payment interface device 104. This may indicate that payment has been approved. In some embodiments, the message may be sent from the secure pass-through server 116 to all or any one or more party(s) that may be associated with the payment transaction, or to parties that may not be associated with the payment transaction, including but not limited to any party that may host a payer account associated with a payment transaction, the biller point of sale device 106, the biller financial institution 110, the authorized user payment interface device 104, and the authorized user financial institution 120, etc. (as previously or subsequently described within this disclosure). For example, where the indication comprises the authorization code and/or a transaction I.D. and/or approval message etc., the biller point of sale device 106 (and all of the aforementioned parties that may or may not be associated with the payment transaction), may receive an authorization code and/or a transaction I.D. and/or approval message that may match the same authorization code and/or a transaction I.D. and/or approval message received by the payer via the payer's authorized user payment interface device 104. Alternatively, the approval message may be sent to all or any one or more of the aforementioned parties from another source in the network. If the payment is approved, the biller may then release, ship, or otherwise provide the purchased products, goods or services to the associated user/payer thereof.

It should be noted that in some embodiments, with respect to updating payer financial account(s) information within the payer's authorized user payment interface device 104, certain things may occur. For example, in some embodiments, whenever a payer may securely log on, or log into, the payment application (e.g., an application, software, and/or some internal or external hardware component(s) etc.), that may reside in or on the payer's authorized user payment interface device 104 (as previously or subsequently described within this disclosure), whether to receive billing data (from a biller), view financial account information, direct payment to a biller, examine or view payment receipts, program recurring payments into the recurring payment(s) module therein, receive payment application updates, etc., or otherwise view any information therein, or perform or facilitate any functions therein that may be associated with, or integral to, the payment application thereof, or that are accessible to the user/payer through the payment application interface thereof, then, during any instance whereby the associated payer thereof may be securely logged on, or logged into, the payment application thereof, the payment application may automatically update (or the payer may manually update), via the secure pass-through server 116, payer financial account information (e.g., account balances, available funds information, account status, account type, etc.). This may be done for one, or as many as all, of the payer financial account(s) of which the payer may use as funding sources in directing payment(s) to a biller(s). The updated payer financial account(s) information may be for as few as one, or as many as all, of the payer financial account(s) hosted internally within the payer authorized user financial institution 120 and/or payer financial account(s) externally hosted within other financial institutions of the payer (as identified within FIG. 2 and further described previously or subsequently herein).

It should be noted that, in some cases, a Bill-Payment may actually take one or more days to process before the biller receives the payment electronically or, in some cases, as a paper check item sent to the biller via some form of mail service or parcel package carrier, etc.

Accordingly, in some embodiments, if the associated funds are not available to the biller during the one or more days the Bill-Payment takes to process and be received by the biller, a guarantor, such as, but not limited to, a financial institution or third party that controls the secure pass-through server 116 or some other related or unrelated party may guarantee that the payment will be completed or fulfilled to the associated biller thereof.

In some embodiments, the system 100 further includes a messaging module 108. The messaging module 108 may be configured to send one or more context-relevant messages (e.g., advertisements related to the payment transaction, advertisements related to the user, coupons, rewards, etc.) to the authorized user payment interface device 104 (AUPID 104) for display on the AUPID 104 to the associated payer thereof at any time before, during, or after the payment transaction. For example, the authorized user payment interface device 104 may receive, via the secure pass-through server 116 (or from some other source in the network) such context-relevant messages originating at the messaging module 108. In some embodiments, the functionality described with respect to the messaging module 108 and the secure pass-through server 116 may be performed by one device or server instead of separate devices or servers.

Figure 1C:
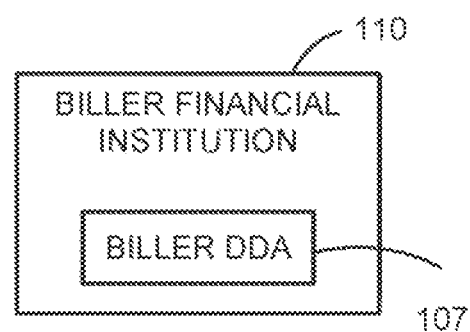
FIG. 1C illustrates an example of a biller DDA hosted by the biller financial institution of FIG. 1B

FIG. 1C illustrates an example of a biller DDA 107 hosted by the biller financial institution of FIG. 1B.

Figure 2:
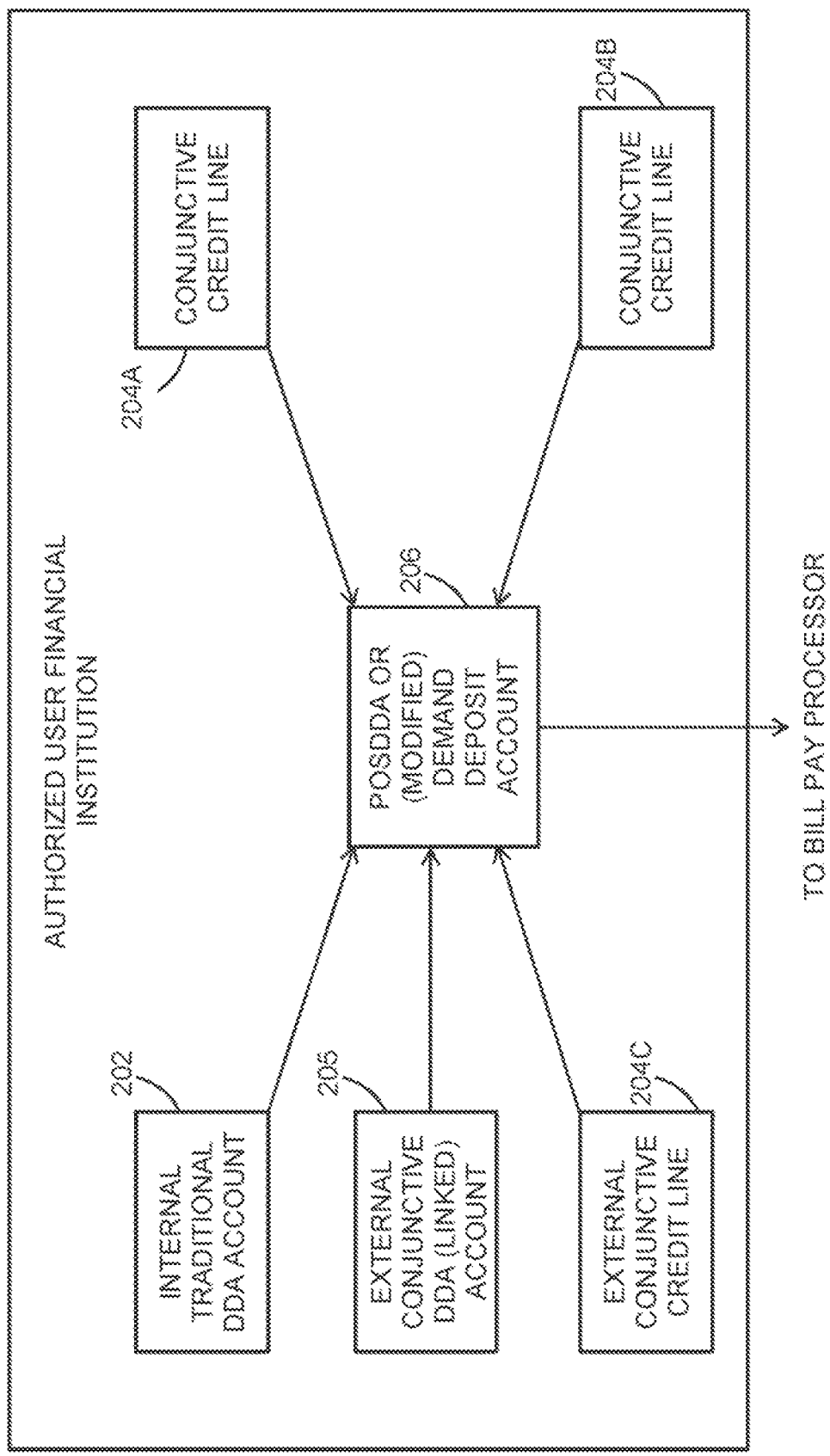
FIG. 2 illustrates an example of an authorized user financial institution of the system of FIG. 1B.

FIG. 2 illustrates an embodiment of the authorized user financial institution 120 (e.g., customer bank). As described above, a payer may have one or more accounts provided by business entities, personal entities or financial institutions (such as, but not limited to, the authorized user financial institution 120, collectively referred to herein as financial institutions) associated with the payer that may all act as, or provide, available funding sources (financial accounts) to the payer to complete a payment transaction between the payer and a biller. These one or more payer accounts may include one or more internally hosted conjunctive credit line(s) 204a and 204b, and may include one or more externally hosted (linked) conjunctive credit line(s) 204c (also referred to herein, in the collective, as conjunctive credit lines 204), and may include one or more internally hosted traditional DDA 202 and the internally hosted POSDDA 206 and the externally hosted (linked) traditional DDA 205 (also referred to herein as internal TDDA 202 and POSDDA 206 and the conjunctive externally hosted (linked) TDDA 205). In some embodiments, there may be no conjunctive credit lines 204, one conjunctive credit line 204, or a plurality of conjunctive credit lines 204. The conjunctive credit lines 204 (e.g., conjunctive credit lines 204a and 204b) may be provided by the authorized user financial institution 120, or may be provided by another financial institution (e.g., external conjunctive credit lines 204c). In some embodiments, there may be no internal or external TDDAs 202 or 205, one of either a conjunctive TDDA 202 or a conjunctive TDDA 205, one of each of a TDDA 202 and a TDDA 205, or a plurality of conjunctive TDDA 202 and/or TDDA 205. With respect to any externally hosted financial accounts of a payer (e.g., the one or more externally hosted (linked) conjunctive credit line(s) 204c and/or the externally hosted (linked) traditional DDA 205) that may be provided and/or hosted by a financial institution that may be other than, or external of, the payer's authorized user financial institution 120, the pertinent account information (e.g., funds availability etc.) about the one or more externally hosted (linked) conjunctive credit line(s) 204c and/or the externally hosted (linked) traditional DDA 205, etc., may be shared directly and/or indirectly with the payer's authorized user financial institution 120. This may be accomplished through the secure pass-through server 116 via, but not limited to, a secure network or secure information sharing solution of one type or another, etc.

The aforementioned payer accounts may each comprise a type of funding source for the user/payer, including but not limited to the conjunctive credit lines 204. The one or more accounts of the payer that may further be included as funding sources are the traditional demand deposit accounts (TDDAs or traditional DDAs), such as the internal traditional DDA 202 and the external traditional DDA 205, or the like. The internal traditional DDA 202, in some embodiments, may be provided by the authorized user financial institution 120. The external traditional DDA 205, in some embodiments, may be provided by a financial institution other than, and/or external of the user/payer's authorized user financial institution 120. The internal traditional DDA 202 may comprise a type of funding source for the user/payer and the external traditional DDA 205 may also comprise a type of funding source for the user/payer. Another DDA associated with a user/payer that may reside within the authorized user financial institution 120 is identified therein as the modified, limited access, limited purpose or limited functionality POSDDA 206 that may also comprise a type of funding source for the associated user/payer thereof.

With respect to the aforementioned payer funding source(s) accounts, to the extent that any such payer funding source(s) accounts may not be limited access, or limited functionality type accounts, but instead, are "open access" types of accounts, such accounts may not always reflect the true state of funds availability within the account(s). For example, the internally hosted payer TDDAs 202 and/or any externally hosted linked payer DDAs 205 may be described herein as traditional "open access" types of accounts, for all, but not limited to all, of the following accessibility and functionality reasons: When a payer writes check(s) payments against an "open access" type of account or traditional DDA, (such as the internally hosted payer TDDA's 202 and/or any externally hosted linked payer DDA's 205 described herein) such check(s) payments may take time to process ("clear") against the associated account balance or account ledger thereof. This may result in an account balance that appears higher than what can actually be relied upon until such time as any such check(s) debits may clear the associated DDA thereof to reveal the actual account balance thereof. Therefore, if, in advance of any such checks or debits clearing the account balance thereof to reveal the actual available DDA funds balance thereof, and the associated payer thereof writes one or more subsequent check(s) against the account balance thereof, or performs, directs or authorizes some other or additional forms of debits against the account, or the payer thereof authorizes or enables billers or third parties to perform singular or recurring debit transactions upon the payer account thereof, or the payer account sustains unauthorized or fraudulent debit transactions upon the account, then one or more of the subsequent payer authorized debits or subsequent checks written against the account by the payer thereof may begin to compete for funds that were previously already dedicated towards fulfilling the prior dedicated payments to billers. In these instances, the DDA thereof may not have sufficient funds to fulfill payment of subsequent additional authorized debits or subsequently written checks or authorized recurring debits upon the account thereof. Therefore, the balance thereof may be less than what could be relied upon and may result in unavailable funds and the account thereof may therefore become overdrawn, and as such, may financially damage one or more parties to a payment transaction between the payer and a biller.

Furthermore, with respect to payer funding account security (and the security of all parties to a payment transaction between the payer and a biller), to the extent that any such payer funding source(s) accounts may not be limited access, limited functionality type accounts, but instead, are "open access" types of accounts (as described previously and/or subsequently herein), such accounts may not protect and secure the private personal information and/or associated payment data of the payer and/or further protect all parties associated with a payment transaction between the payer and a biller. For example, even though the internally hosted payer TDDAs 202 and/or any externally hosted linked payer DDAs 205 may comprise types of funding sources for the associated payer/user thereof, such accounts may not be configured as limited access or limited functionality type accounts and therefore may provide common traditional "open access" DDA debit functionality to billers. In many instances, the payer thereof, (in order to use such accounts to make traditional debit payments to billers), may provide personal information and/or corresponding payment data thereof to numerous billers, biller networks, biller databases, third parties, third party networks, and/or third party databases etc., This may be done in order to enable such billers etc. to perform traditional debit transactions, ATM transactions, check card transactions, recurring debits, paper check transactions, etc. against any such payer "open access" type accounts in order for the biller to capture payment from the payer thereof. Therefore, when payers do not use limited access, limited functionality type accounts and accordingly provide personal information and/or corresponding payment data to billers, biller networks, biller databases, third parties, third party networks, and/or third party databases etc., to enable them to perform traditional debit transactions of any kind upon any such payer "open access" type accounts, the private personal information and/or payment data of the payer thereof and all parties associated with a payment transaction thereof (between the payer and a biller) may not be secure and may become vulnerable to nefarious individuals or nefarious parties associated with (or not associated with) the associated billers, biller networks, biller databases, third parties, third party networks and/or third party databases etc. thereof. These entities etc. may fraudulently and/or unlawfully access (hack into) the private personal information and/or payment data of the payer thereof, and potentially all parties associated with a payment transaction thereof, in order to fraudulently use or misuse any such information in numerous unlawful, fraudulent, or nefarious ways that may damage at least one, or as many as all, of the parties to any such traditional "open access" account debit or check type payment transactions that may be performed between the payer and a biller.

It should be noted that Credit Card or card based "debit" type accounts may also suffer from as much as all, of the aforementioned available funds concerns and/or security concerns of "open access" types of accounts in that they may be debited by billers and other third parties sources etc., other than only by the associated payer thereof.

Conversely, in some embodiments, only credit type transactions may be directed into or out of particular or specific payer associated "limited access" "limited functionality" type accounts that may be internal, or external, of the payer authorized user financial institution 120. This may create a "credits only" "sealed system" configuration for only the associated payer thereof to use in directing payment to a biller, described herein as follows: The "limited access" "limited functionality" modified demand deposit account POSDDA 206 (of the payer) may be configured in such a way that it may only receive funds directed into the account as credit type transactions (directed only by the associated payer thereof), and only from the internal or external associated payer "limited access" "limited functionality" credit lines 204a, 204b, and 204c. In some embodiments, funds may only be directed out of the payer POSDDA 206 as credit type transactions (directed only by the associated payer thereof), and the internal or external payer credit lines 204a, 204b, and 204c may each be configured in such a way that they may each only receive funds as credit type transactions and funds may only be directed out of each of the internal or external payer credit lines 204a, 204b, and 204c as credit type transactions (directed only by the associated payer thereof) and only into the "limited access" "limited functionality" modified demand deposit account POSDDA 206 (of the payer). This may be accomplished in a manner whereby the accounts thereof may be governed by particular or specific account rules and/or technological configuration(s) that may not permit or allow for debits upon the accounts to occur from any source. In some embodiments, such accounts may be limited to those transactions in which funds may only be received as credit transactions into the account(s) and funds may only exit or be directed out of the account(s) as credit transactions (directed only by the associated payer thereof) in order to preserve how money may flow into and out of any such accounts for security and guarantee of funds purposes. Therefore, this "credits only" "sealed system" may be based solely on the payer accounts thereof receiving or sending credits (directed only by the associated payer thereof). In some embodiments, any such payer accounts thereof may not be enabled in any way whereby they may be debited by any source (with only a few exceptions as previously or subsequently described within this disclosure). Therefore, when a user/payer, upon receiving a bill from a biller, via the biller point of sale device 106 (or from the virtual biller point of sale device 106) into the payer's authorized user payment interface device 104, indicating to the payer that a Bill-Payment has been initiated, the payer thereof may then choose to select and direct "credit(s) only" funds transactions from the one or more of the payer's associated conjunctive credit lines 204 (e.g., conjunctive credit lines 204a, 204b and 204c) revealed to the payer (along with other payer accounts or account types) within the payer's authorized user payment interface device 104, to the biller (the payer may select a funding amount equal to or greater than the amount of funds needed to complete the payment transaction to the biller), via the secure pass-through server 116, into the user/payer's associated POSDDA 206 within the payer authorized user financial institution 120, of which may almost simultaneously authorize the Bill-Pay processor 112 (associated with the payer authorized user financial institution 120) to perform a debit of, or receive a credit from, the payer's associated POSDDA 206 therein, in order to complete the payer initiated payment into the biller's account 107 within the biller financial institution 110 of which fulfills the payer's payment to the biller (directed only by the associated payer thereof). Therefore, all of the payer accounts of this "credits only" "sealed system" may not be "open access" traditional debit type accounts, but instead, may only be "limited access" "limited functionality" types of accounts of which may not be debited by or from any source, as only credit type transactions may be directed into or out of the payer accounts thereof, and only by the associated authorized user/payer thereof. (An exception may be that the payer authorized user financial institution 120 of which may host the payer POSDDA 206 and may host the one or more of the internal payer conjunctive credit line accounts 204a and 204b and the payer TDDA 202. In some embodiments, any other financial institution(s) of which may host the payer externally linked conjunctive credit line accounts 204c and host the payer externally linked conjunctive DDA's 205 or the like, may, in their normal authorized, permissible overriding management capacity, perform "on us" Intra-Bank credits and debits transactions upon any such payer accounts that they host, and the payer POSDDA 206 may also be directed to send credits into or be debited by a Bill-Pay processor 112 associated with the authorized user financial institution 120 wherein the user/payer POSDDA resides, the functionality thereof being previously or subsequently described in this disclosure.) Therefore, in contrast to any (previously or subsequently described) traditional "open access" debit types of accounts of which a payer may use when providing payment to billers, this "limited access" "limited functionality" "credits only" "sealed system" of the payer significantly improves upon the current security and funding drawbacks associated with a payer otherwise using traditional Credit Card or card based or non-card based types of biller debit solutions, or otherwise using any other sort of traditional "open access" debit types of accounts, in providing payments to billers, or using any such traditional "open access" debit types of accounts, Credit Card, or otherwise card based or non-card based types of debit solutions in connection with, or in conjunction with, Bill-Pay systems in providing payments to billers (as previously or subsequently described within this disclosure). This "limited access" "limited functionality" "credits only" "sealed system" may prevent or eliminate nefarious individuals or nefarious parties associated with (or not associated with) billers, biller networks, biller databases, third parties, third party networks and/or third party databases etc., to fraudulently and/or unlawfully access (hack into) the private personal information and/or payment data and/or financial accounts of the payer thereof, and likewise potentially access (hack into) at least one or more or all parties associated with a payment transaction thereof. This may be done in order to fraudulently use or misuse any such information thereof in numerous unlawful, fraudulent or nefarious ways of which may potentially damage at least one (or as many as all) parties to any such traditional debit type payment transactions between the payer and a biller, therefore this "limited access" limited functionality" "credits only" "sealed system" of a payer may ensure greater security, fraud reduction or otherwise the prevention or elimination of fraud and financial damages for payers and billers, financial institutions and all associated parties to a payment transaction between the payer and a biller than may currently be possible in any instance or environment whereby a payer is directing or providing payment to a biller.

In some embodiments, only credit and debit type transactions may be performed or initiated by a payer from particular or specific payer associated "limited access" "limited functionality" type accounts of the payer. These may be internal, or external, of the payer authorized user financial institution 120 and enable or create a "credits and debits only" "sealed system" configuration whereby only the associated payer thereof may be authorized or enabled to perform credits and debits(s) of any such payer accounts. Therefore, the "limited access" "limited functionality" modified demand deposit account POSDDA 206 (of the payer) may be configured in such a way that funds may be directed into the account as credit and debit type transactions, (directed only by the associated payer thereof) and only from the associated payer "limited access" "limited functionality" credit lines 204a, 204b, and 204c or the like, that may be internal or external of the payer authorized user financial institution 120. Funds may be directed out of the payer "limited access" "limited functionality" modified demand deposit account POSDDA 206 (directed only by the associated payer thereof) as credit and debit transactions, and the internal or external payer credit lines 204a, 204b, and 204c may each be configured in such a way that they may each only receive funds as credit and debit type transactions and funds may only be directed out of each of the internal or external payer credit lines 204a, 204b, and 204c as credit and debit type transactions (directed only by the associated payer thereof), and only into the "limited access" "limited functionality" modified demand deposit account POSDDA 206 (of the payer). This may be accomplished in a manner whereby the payer accounts thereof may be governed by particular or specific account rules and/or technological configuration(s) that may be limited to those transactions in which funds may only enter or exit any such payer "limited access" "limited functionality" account(s) as credit and debit transactions (directed only by the associated payer thereof) in order to preserve how money may flow into and out of any such accounts for security and guarantee of funds purposes. Therefore, the payer accounts of this "credits and debits only" "sealed system" may not be credited and debited by any source other than the associated payer thereof (with only a few exceptions as previously or subsequently described within this disclosure). Therefore, when a user/payer, upon receiving a bill from a biller, via the biller point of sale device 106 (or from the virtual biller point of sale device 106) into the payer's authorized user payment interface device 104, indicating to the payer that a Bill-Payment has been initiated, the payer thereof may then choose to select and direct a credit(s) and/or debits(s) from the one or more of the payer's associated conjunctive credit lines 204 (e.g., conjunctive credit lines 204a, 204b, and 204c) revealed to the payer (along with other payer accounts or account types) within the payer's authorized user payment interface device 104, to the biller (the payer may select a funding amount equal to or greater than the amount of funds needed to complete the payment transaction to the biller), via the secure pass-through server 116, into the user/payer's associated POSDDA 206 within the payer authorized user financial institution 120, of which may almost simultaneously authorize the Bill-Pay processor 112 (associated with the payer authorized user financial institution 120) to receive a credit from, or perform a debit of, the payer's associated POSDDA 206 therein, in order to complete the payer initiated payment into the biller's account 107 within the biller financial institution 110 of which fulfills the payer's payment to the biller (directed only by the associated payer thereof). Therefore, in some embodiments, the payer accounts of this "credits and debits only" "sealed system" may not be "open access" traditional debit type accounts, but instead, may only be "limited access" "limited functionality" types of accounts of which may not be credited and/or debited by or from any source other than the associated payer thereof. One exception may be that the payer authorized user financial institution 120 of which may host the payer POSDDA 206 and may host the one or more of the internal payer conjunctive credit line accounts 204a and 204b and the payer TDDA 202, and any other financial institution(s) of which may host the payer externally linked conjunctive credit line accounts 204c and host the payer externally linked conjunctive DDA's 205 or the like, may, in their normal authorized, permissible overriding management capacity, perform "on us" Intra-Bank credits and debits transactions upon any such payer accounts that they host, and the payer POSDDA 206 may also be directed to send credits into or be debited by a Bill-Pay processor 112 associated with the authorized user financial institution 120 wherein the user/payer POSDDA resides, the functionality thereof being previously or subsequently described in this disclosure. Therefore, in contrast to any (previously or subsequently described) traditional "open access" debit types of accounts of which a payer may use when providing payment to billers, this "limited access" "limited functionality" "credits and debits only" "sealed system" of the payer, significantly improves upon the current security and funding drawbacks associated with a payer otherwise using traditional Credit Card or card based or non-card based types of biller debit solutions, or otherwise using any other sort of traditional "open access" debit types of accounts, in making payment to billers, or using any such traditional "open access" debit types of accounts, Credit Card, or otherwise card based or non-card based types of debit solutions in connection with, or in conjunction with, Bill-Pay systems in making payment to billers (as previously described herein). This "limited access" "limited functionality" "credits and debits only" "sealed system" may prevent or eliminate nefarious individuals or nefarious parties associated with (or not associated with) billers, biller networks, biller databases, third parties, third party networks and/or third party databases etc., to fraudulently and/or unlawfully access (hack into) the private personal information and/or payment data and/or financial accounts of the payer thereof, and likewise potentially access (hack into) at least one or more or all parties associated with a payment transaction thereof, in order to fraudulently use or misuse any such information thereof in numerous unlawful, fraudulent or nefarious ways of which may damage at least one (or as many as all) parties to any such traditional debit type payment transactions between the payer and a biller. Ergo, this "limited access" limited functionality" "credits and debits only" "sealed system" of a payer may ensure greater security, fraud reduction or otherwise the prevention or elimination of fraud and financial damages for payers and billers, financial institutions, and all associated parties to a payment transaction between the payer and a biller than may currently be possible in any instance or environment whereby a payer is directing payment to a biller.

In some embodiments, only "on us" Intra-Bank memo post network "sealed system" types of funding transactions may be performed or initiated by a payer from particular or specific payer associated "limited access" "limited functionality" type accounts of the payer. In some embodiments, this may be done only within, or internal of, the payer authorized user financial institution 120 (of which may also include the internal processing "Intra-Bank" network functions of at least one, or between as many as all, of the associated branch locations thereof). This "on us" Intra-Bank memo post network configuration may only enable the associated payer thereof to perform credit(s) only, or credit(s) and debits(s), of the payer's own "limited access" "limited functionality" type accounts. Therefore, the payer's modified demand deposit account POSDDA 206 may be configured in such a way that it may only receive funds (directed only by the associated payer thereof), as credit(s) only, or credit(s) and debit(s) type transactions, and only from the associated payer "limited access" "limited functionality" credit lines 204a and 204b or the like, that are internal of the payer authorized user financial institution 120, and funds may only exit the payer "limited access" "limited functionality" modified demand deposit account POSDDA 206 (directed only by the associated payer thereof) as credit(s) only, or credit(s) and debit(s) transactions. Further, the internal payer credit lines 204a and 204b may each be configured in such a way that they may each only receive funds as credit(s) only, or credit(s) and debit(s) type transactions, and funds may only be directed out of each of the internal payer credit lines 204a and 204b as credit(s) only, or credit(s) and debit(s) type transactions (directed only by the associated payer thereof), and only into the "limited access" "limited functionality" modified demand deposit account POSDDA 206 (of the payer). This may be accomplished in a manner whereby the payer accounts thereof may be governed by particular or specific account rules and/or technological configuration(s) that may be limited to those transactions in which funds may only enter or exit any such payer "limited access" "limited functionality" account(s) as credit(s) only, or credit(s) and debit(s) type transactions (directed only by the associated payer thereof) in order to preserve how money may flow into and out of any such accounts for security and guarantee of funds purposes. Therefore, the payer accounts of this "on us" Intra-Bank memo post network "sealed system" may not be credited only, or credited and debited by any source other than the associated payer thereof, and only within, or internal of, the payer authorized user financial institution 120 thereof (with only a few exceptions as previously or subsequently described within this disclosure). Therefore, when a user/payer, upon receiving a bill from a biller, via the biller point of sale device 106 (or from the virtual biller point of sale device 106) into the payer's authorized user payment interface device 104, indicating to the payer that a Bill-Payment has been initiated, the payer thereof may then choose to select and direct a credit(s) only or credit(s) and debits(s) from the one or more of the payer's associated conjunctive credit lines 204 (e.g., conjunctive credit lines 204a and 204b) revealed to the payer (along with other payer accounts or account types) within the payer's authorized user payment interface device 104, to the biller. The payer may select a funding amount equal to or greater than the amount of funds needed to complete the payment transaction to the biller, via the secure pass-through server 116, into the user/payer's associated POSDDA 206 within the payer authorized user financial institution 120, of which may almost simultaneously authorize the Bill-Pay processor 112 (associated with the payer authorized user financial institution 120) to receive a credit from, or perform a debit of, the payer's associated POSDDA 206 therein. This may be done in order to complete the payer initiated payment into the biller's account 107 within the biller financial institution 110 of which fulfills the payer's payment to the biller (directed only by the associated payer thereof). Therefore, the payer accounts of this "on us" Intra-Bank memo post network "sealed system" may not be "open access" traditional debit type accounts, but instead, may only be "limited access" "limited functionality" types of accounts of which may not be credited only or credited and debited by or from any source other than the associated payer thereof, and only within, or internal of, the payer authorized user financial institution 120. An exception may be that the payer authorized user financial institution 120 of which may host the payer POSDDA 206 and may host the one or more of the internal payer conjunctive credit line accounts 204a and 204b and the payer TDDA 202, and any other financial institution(s) of which may host the payer externally linked conjunctive credit line accounts 204c and host the payer externally linked conjunctive DDA's 205 or the like, may, in their normal authorized, permissible overriding management capacity, perform "on us" Intra-Bank memo post network credits and debits transactions upon any such payer accounts that they host. The payer POSDDA 206 may also be directed to send credits into or be debited by a Bill-Pay processor 112 associated with the authorized user financial institution 120 wherein the user/payer POSDDA resides, the functionality thereof being previously or subsequently described in this disclosure. Therefore, in contrast to any (previously or subsequently described) traditional "open access" debit types of accounts of which a payer may use when providing payment to billers, this "limited access" "limited functionality" "on us" Intra-Bank memo post network "sealed system" of the payer, significantly improves upon the current security and funding drawbacks associated with a payer otherwise using traditional Credit Card or card based or non-card based types of biller debit solutions, or otherwise using any other sort of traditional "open access" debit types of accounts, in making payment to billers, or using any such traditional "open access" debit types of accounts, Credit Card, or otherwise card based or non-card based types of debit solutions in connection with, or in conjunction with, Bill-Pay systems in making payment to billers (as previously described herein). This "limited access" "limited functionality" "on us" Intra-Bank memo post network "sealed system" may prevent or eliminate nefarious individuals or nefarious parties associated with (or not associated with) billers, biller networks, biller databases, third parties, third party networks, and/or third party databases etc., from fraudulently and/or unlawfully accessing (hacking into) the private personal information and/or payment data and/or financial accounts of the payer. This may likewise prevent accessing (hacking into) at least one, or as many all, parties associated with a payment transaction thereof, in order to fraudulently use or misuse any such information thereof in numerous unlawful, fraudulent or nefarious ways of which may damage at least one (or as many as all) parties to any such traditional debit type payment transactions between the payer and a biller. Ergo, this "limited access" "limited functionality" "on us" Intra-Bank memo post network "sealed system" of a payer may ensure greater security, fraud reduction or otherwise the prevention or elimination of fraud and financial damages for payers and billers, financial institutions, and all associated parties to a payment transaction between the payer and a biller than may currently be possible in any instance or environment whereby a payer is directing payment to a biller.

It should be noted, in some embodiments, the payer's authorized user financial institution 120 may host at least one, but may not be limited to one, financial account of a payer, of which may be at least the payer's POSDDA 206 and/or at least one of the payer's conjunctive credit lines 204 (as previously or subsequently described within this disclosure), and in some embodiments, a biller's DDA 107, and other biller financial accounts may also be hosted within the payer's authorized user financial institution 120. In some such cases, the payer's authorized user financial institution 120 and a biller financial institution 110 may be one in the same financial institution (e.g. a bank etc.). Therefore, when the payer's authorized user financial institution 120 and a biller financial institution 110 may be one in the same financial institution, and when the financial accounts of the payer and the financial accounts of the biller (as previously or subsequently described within this disclosure) may be hosted within this, "one in the same financial institution", the one in the same financial institution thereof may be enabled with, and provide to the payer thereof, and to the biller thereof, an internal debit(s) and credit(s) type of network that may enable a payer thereof to direct payment to a biller thereof from directly within this one in the same financial institution, and therefore may negate the need for the payer thereof to use any external Bill-Pay network or Bill-Pay processor in directing payment to the biller when both the payer and the biller financial account(s) (as previously or subsequently described within this disclosure) are hosted within this one in the same financial institution. This one in the same financial institution internal network (as previously or subsequently described within this disclosure) may be an "on us" Intra-Bank memo post network. This one in the same financial institution "on us" Intra-Bank memo post network configuration may furthermore enable a payer thereof, to direct payment to a biller thereof (e.g., into the biller's DDA 107 therein), not only directly from the payer POSDDA 206 therein, but also (possibly directly) from other payer selected funding account(s) therein, such as, but may not be limited to, the payer's credit line account(s) 204*a* and/or 204*b*, or from other payer accounts therein (as previously or subsequently described within this disclosure) into an account of the biller (e.g., into the biller's DDA 107 therein), without the payer's funds first being directed by the payer into the payer's POSDDA 206 therein before being further directed or transferred into a financial account of the biller therein (e.g., into the biller's DDA 107 therein) held within the same financial institution of the payer (unless the payer may otherwise direct payment to the biller directly from existing funds within the aforementioned payer's POSDDA 206 therein). This is because, in some embodiments, it may be the case that as few as one, or as many as all, of the payer credit line(s) 204, and/or as few as one, or as many as all other financial accounts of the payer, internal to, or external of, the payer's authorized user financial institution 120 (as previously or subsequently described within this disclosure), including any financial accounts of the payer that may be hosted internal to, or external of, the aforementioned "one in the same financial institution", may all be configured to function in all of the same or duplicative manner, purpose, functionality, scope and capacity etc., as the payer POSDDA 206, whether hosted in the absence of, or in addition to, the payer POSDDA 206 also being hosted within the payer financial institution 120, and whether hosted in the absence of, or in addition to, the payer POSDDA 206 also being hosted within any, or any other, financial institution of the payer, and without limiting the manner, purpose, functionality, scope and capacity of the payer POSDDA 206 (as previously or subsequently described within this disclosure). It should be further noted, a financial institution may host as few as one, or as many as all, payer and biller accounts (i.e., all payer and biller accounts previously or subsequently described within this disclosure) on behalf of the other financial institution's payers and billers.

It should be further reiterated and noted (as previously or subsequently described within this disclosure), in some or all embodiments, a biller may also be a payer and perform the functions of a payer, and a payer may also be a biller and perform the functions of a biller. Therefore, in some embodiments, both payers and billers of this system may each perform the same functions as the other or each may be enabled with, and perform the functions of both. This is because both payers and billers may each be enabled with, or provided with, the same financial accounts or financial account types as the other, or each may be enabled with, or provided with, the same financial accounts or financial account types of both.

It should be further noted, with respect to some of the various systems, methods, financial accounts of payers and billers, and the associated functions thereof (as previously or subsequently described within this disclosure) that may support and perform all, but not limited to all, of providing and receiving biller data, determining availability of funds, receiving a selection of one or more payer accounts, providing an indication of payer accounts having sufficient available funds to use for payment to a biller based on the received biller data, providing an indication of payer accounts having sufficient available funds to use in fulfilling payment to a biller, and receiving a command from a payer to direct payment to a biller, may be performed outside of a traditional financial institution or partially within a traditional financial institution and partially external of a traditional financial institution. Furthermore, the payer accounts and biller accounts thereof may also reside outside of a traditional financial institution or partially within a traditional financial institution and partially external of a traditional financial institution.

In some embodiments, the payer, when directing payment to a biller, may choose payer account funding sources other than the previously described "limited access" "limited functionality" type payer account funding sources. Accordingly, the payer thereof may choose to use funds from "open access" type payer accounts (as described previously and/or subsequently within this disclosure) such as, but not limited to, the internally hosted payer TDDA 202 and/or any externally hosted linked payer DDA 205, as the following example illustrates: A user/payer, upon receiving a bill from a biller, via the biller point of sale device 106 (or from the virtual biller point of sale device 106) into the payer's authorized user payment interface device 104, indicating to the payer that a Bill-Payment has been initiated, may then choose to select and direct a credit(s) and/or debits(s) from the one or more of the user's/payer's associated "open access" type accounts such as, but not limited to, the internally hosted payer TDDA 202 and/or any externally hosted linked payer DDA 205 revealed to the payer (along with other payer accounts or account types) within the user's/payer's authorized user payment interface device 104, to the biller. (The payer may select a funding amount equal to or greater than the amount of funds needed to complete the payment transaction to the biller.) This may be accomplished via the secure pass-through server 116, into the user/payer's associated POSDDA 206 within the payer authorized user financial institution 120, of which may simultaneously or almost simultaneously authorize the Bill-Pay processor 112 (associated with the payer authorized user financial institution 120) to receive a credit from, or perform a debit of, the user's/payer's associated POSDDA 206 therein. This may be done in order to complete the payer initiated payment into the biller's account 107 within the biller financial institution 110 of which fulfills the payer's payment to the biller. It should be noted that the payer authorized user financial institution 120 of which may host the payer POSDDA 206 and may host the one or more of the internal payer conjunctive credit line accounts 204*a* and 204*b* and the payer TDDA 202, and any other financial institution(s) of which may host the payer externally linked conjunctive credit line accounts 204*c* and host the payer externally linked conjunctive DDA's 205 or the like, may, in their normal authorized, permissible overriding management capacity, perform "on us" Intra-Bank memo post network credits and debits transactions upon any such payer accounts that they host. Further, the payer POSDDA 206 may be directed to send credits into or be debited by a Bill-Pay processor 112 associated with the authorized user financial institution 120 wherein the user/payer POSDDA resides, the functionality thereof being previously or subsequently described in the present disclosure. Therefore, in this example, the payer, in choosing to direct payment to a biller from the payer's "open access" type account(s), such as, but not limited to the internally hosted payer TDDA 202 and/or any externally hosted linked payer DDA 205 of which (unlike the "limited access" "limited functionality" type accounts of the payer) may be credited and/or debited by or from sources that include, but are not limited to, the associated payer thereof, such as, but not limited to, biller debits, paper check debits, ATM debits, Check Card Debits, ACH Debits, Bill-Pay processor debits, unauthorized or fraudulent debits etc., therefore resulting in the payer directing payment to a biller from "open access" account(s) with unreliable account balance(s), of which may further result in the payment to a biller being unfulfilled (as previously or subsequently described within this disclosure). However, in order that the financial integrity and reliability of this particular embodiment (or any other embodiment that may be exemplified within or extend from this disclosure) may be retained, whether a payer thereof is directing payment to a biller from the payer's "open access" type accounts, or from the payer's "limited access" "limited functionality" type accounts, and whether doing so from within a "credits and debits only" "sealed system" type of embodiment or from within a "credits only" "sealed system" type of embodiment, it is to be contemplated and appreciated that any financial institution thereof, which hosts any payer or biller account(s) thereof, may employ overdraft protection for any such accounts in order to protect the account(s) financial integrity and reliability for payers, billers, financial institutions, and all associated parties to a payment transaction between the payer and a biller, while nonetheless providing greater security, fraud reduction or otherwise the prevention or elimination of fraud than may currently be possible in any instance or environment whereby a payer is directing payment to a biller.

With respect to the security risk and unreliable funding risk associated with a payer directing payment to a biller from "open access" type accounts, such as, but not limited to, the internally hosted payer account TDDA 202 and/or any externally hosted linked payer account DDA 205, in doing so, the payer thereof may expose the biller, and some or all parties to a payment transaction, to substantial security and financial risk or damages. This is because, in addition to a payer using any such "open access" type accounts in directing payments to billers (as described within one or more embodiments of the present disclosure), the associated payer thereof may also be using the same "open access" type accounts in a more common traditional manner (outside of the embodiments of this disclosure), not only to make deposits and withdrawals etc., but moreover, to authorize "open access" traditional DDA debit payments to a biller(s). The biller(s) may, or may not, be associated with the payer thereof, to perform or initiate authorized, or in some cases, unauthorized, "credits and debits(s)" transactions of, or upon, the payer "open access" type accounts. In many instances, over time, the payer thereof may provide personal information and/or corresponding payment data information to numerous billers, biller networks, biller databases, third parties, third party networks, and/or third party databases etc., in order to enable such billers etc., to perform traditional debit transactions, ATM transactions, check card transactions, recurring debits, paper check deposit transactions, etc. into or out of any such payer "open access" accounts, in order for the biller to make payment to, or capture payment from, the associated payer thereof. Therefore, a payer's "open access" account payment data and/or corresponding personal information thereof may reside within substantially numerous biller networks, biller databases, third party networks and/or third party databases etc. throughout the payer's country of origin and/or perhaps throughout the world. This, sharing of "open access" account payment data and/or private personal information of a payer with billers, biller networks, biller databases, third parties, third party networks, and/or third party databases etc., may create the potential or likelihood for nefarious individuals or nefarious parties associated with (or not associated with) the billers etc., to seek out weaknesses or any "lack of security" thereof. This may be done in order to take steps to fraudulently breach and/or unlawfully access (hack into) the private personal information and/or payment data of the payer thereof, whereby the financial damages and/or security breaches thereof may not only damage the associated payer thereof, but may extend even further to damage a biller and at least one, or as many as all, parties to a payment transaction(s) between a payer(s) and a biller(s).

Therefore, in order to mitigate, reduce or eliminate the security risk and unreliable funding risk associated with a payer directing payment to a biller from "open access" type accounts, in some embodiments, it may be mandatory that a payer direct payment to a biller from only "limited access" "limited functionality" type payer account(s) and only from within "sealed system" embodiments. By way of example the Intra-Bank "on us" Intra-Bank memo post network "sealed system" network embodiment configuration (as previously or subsequently described within this disclosure), may mitigate, greatly reduce, or eliminate the financial and/or security risk for the payer, the biller, and all parties to a payment transaction(s) between the payer and a biller.

Conversely, (in some embodiments), regardless of the aforementioned security risk and unreliable funding risk associated with "open access" accounts, a payer may be permitted to direct payment to a biller from "open access" type payer account(s) (as described within one or more embodiments of this disclosure) if, at least one, but not limited to one, form of financial risk mitigation may be employed, and if, at least one, but not limited to one, form of security risk mitigation may be employed, as follows: 1.) With respect to the financial risk associated with embodiments whereby a payer may be permitted to direct payment to a biller from "open access" type accounts, such as, but not limited to, the internally hosted payer account TDDA 202 and/or any externally hosted linked payer account DDA 205, the payer accounts thereof may be configured with overdraft protection, provided to the payer associated accounts thereof, by the financial institution(s) that hosts the account(s). This way, if a payer directs payment to a biller from "open access" type account(s), whereby the funds thereof may be unreliable, and may become insufficient (e.g., NSF or bounced funds etc.) for any reason, then overdraft protection thereof may be mandated in order to preserve the assurances that a "good funds model" may remain sustained and fully intact, so that no risk may remain whereby a payment transaction between a payer and biller would not ultimately be honored, which in turn, not only protects the payer and the associated biller thereof, but also extends financial integrity to all associated parties to a payment transaction between the payer and a biller; and 2.) With respect to the security risk associated with embodiments whereby a payer may be permitted to direct payment to a biller from "open access" type accounts, such as, but not limited to, the internally hosted payer account TDDA 202 and/or any externally hosted linked payer account DDA 205, in order to maintain strict security, general or specific rules and technological configurations (as described previously or subsequently within this disclosure) may need to be applied, as follows: In some embodiments, whenever a payer may be permitted to direct payment to a biller from "open access" type accounts, such as, but not limited to, the internally hosted payer account TDDA 202 and/or any externally hosted linked payer account DDA 205, the payment funding path may first allocate the funds from the payer "open access" account(s) into the payer POSDDA 206, to then complete the payment, via the associated Bill-Pay processor 112, into the biller DDA 107 hosted within the biller financial institution 110. In some of these types of embodiments, the POSDDA 206 of the payer may (for security purposes) be governed by a combination of rules and technological configurations that may only allow for the payer POSDDA 206 to receive the "payment directed funds" from the "open access" accounts of the payer through networks like Bill-Pay or via any network or method whereby the POSDDA 206 may receive the "payment directed funds" without responsively revealing the private payment data and/or private personal information of the payer, or payer POSDDA 206 thereof, back to the technical infrastructure of the financial institution (or funding account entity) that hosts the funding account source (i.e., "open access" type account(s)), from which the "payment directed funds" were originated. This is because, if or when, "open access" type accounts may be breached (or hacked) by nefarious persons or parties, such persons or parties may not only capture and exploit the private payment data and/or private personal information associated with the payer "open access" account itself, but may also vicariously capture and exploit other private payment data and/or private personal information (stored within the technical infrastructure that hosts the "open access" type accounts thereof) of the payer, or of other payer's or biller's (or their financial accounts) that may have previously interfaced with the "open access" account thereof, in performing credit or debit funding transactions, including, if it were possible, the payer's own POSDDA 206. Therefore, in some embodiments, whenever a payer is directing payment to a biller from any type of "open access" funding account source, into and through the payer POSDDA 206 etc. in order to complete payment to a biller (as described above), the general or specific rules and technological configurations of the payer POSDDA 206, may restrict the "open access" funding account source, or the hosting entity thereof (the origin of the "payment directed funds"), from responsively receiving private payment data and/or private personal information of the payer, or the payer POSDDA 206 thereof, so that any potential security breaches associated with the "open access" funding account source may not extend to the payer's POSDDA 206, or further extend to the associated biller thereof, or any associated parties to a payment transaction between the payer and a biller.

It should be noted that in some embodiments, even though a payer POSDDA 206 and/or other financial accounts of a payer may be governed by a combination of rules and technological configurations that ensure the utmost of security, any such accounts of the payer may be mandated, by the financial institutions (or financial entities) that host the accounts thereof, to employ overdraft protection of the payer accounts, which in turn, not only protects the payer, but also extends financial integrity to all associated parties to a payment transaction between the payer and a biller. This may further ensure a "good funds model" whereby there is no risk that a payment transaction between a payer and biller would not ultimately be honored.

In some embodiments, a payer is not restricted in directing payment to a biller from only one payer account funding source. Rather, the payer may direct payment to a biller from as many as two or more payer funding source accounts. By way of non-limiting example, when a user/payer, upon receiving a bill from a biller, via the biller point of sale device 106 (or from the virtual biller point of sale device 106) into the payer's authorized user payment interface device 104, indicating to the payer that a Bill-Payment has been initiated, the payer thereof may then choose to select and direct a credit(s) and/or debits(s) from the two or more of the payer's associated "open access" or "limited access" "limited functionality" type accounts etc., revealed to the payer (along with other payer accounts or account types) within the payer's authorized user payment interface device 104. This may be directed to the biller (the payer may select funding amounts of equal or unequal portions from the two or more accounts, the total thereof may be equal to or greater than the amount of funds needed to complete the payment transaction to the biller), via the secure pass-through server 116, into the user's/payer's associated POSDDA 206 within the payer authorized user financial institution 120, of which may simultaneously or almost simultaneously authorize the Bill-Pay processor 112 (associated with the payer authorized user financial institution 120) to receive a credit from, or perform a debit of, the payer's associated POSDDA 206 therein, in order to complete the payer initiated payment into the biller's account 107 within the biller financial institution 110 of which fulfills the payer's payment to the biller.

In some embodiments, the payer may continually, periodically, or frequently maintain a certain or desired amount of "settled" funds within the payer's POSDDA 206 (readily available to the payer) of which may be greater than, or less than, that which may be needed by the payer in directing and/or completing a payment to a biller. Therefore, even though the payer may maintain a particular amount, or fluctuating amount, of "settled" funds within the payer POSDDA 206, the payer thereof may wish to direct additional funding credits or debits into the account at any time, and for any reason. One example of when the payer may wish to direct additional funds into the payer's POSDDA 206 may be when or if existing "settled" funds therein are not sufficient to fulfill payment to a biller, then, the payer thereof may direct additional funds into the POSDDA 206 anytime in advance of, or during, the real-time process of directing a sufficiently funded payment to a biller. Accordingly, by way of example, when a user/payer, upon receiving a bill from a biller, via the biller point of sale device 106 (or from the virtual biller point of sale device 106) into the payer's authorized user payment interface device 104, indicating to the payer that a Bill-Payment has been initiated, the payer thereof may then choose to select and direct existing sufficient "settled" funds from the payer's POSDDA 206 (unless the existing "settled" funds therein are not sufficient to fulfill payment to the biller, the payer may then select and direct additional funding into the payer's POSDDA from other available payer account funding sources), revealed to the payer within the payer's authorized user payment interface device 104, to the biller, via the secure pass-through server 116 associated with the payer authorized user financial institution 120. This may simultaneously or almost simultaneously authorize the associated Bill-Pay processor 112 thereof to receive a credit from, or perform a debit of, the payer's associated POSDDA 206 therein. This may be done in order to complete the payer initiated payment into the biller's account 107 within the biller financial institution 110 that fulfills the payer's payment to the biller. Therefore, in some embodiments, when a user/payer directs payment to a biller, the payer may do so from a virtually constant availability of existing "settled" funds within the payer's POSDDA 206.

In some embodiments, whenever a payer may direct payment to a biller, the payer thereof may choose an amount of funds, from the one or more of the payer associated funding account source(s), that may be equal to, or greater than, the amount of funds needed to complete the payment transaction to the biller. Therefore, to the extent that the payer thereof chooses funding amounts that exceed the amount of funds necessary to complete a payment to a biller, the overage difference thereof, or portion(s) thereof, may be retained and/or sustained within the payer's POSDDA 206, or may be directed by the payer thereof into other accounts of the payer, or directed as needed by the payer in completing other or additional payments to the same biller, or directed by the payer in completing payments to one or more other billers, whenever the payer may choose or need to do so.

It should be noted, the technological configurations and/or attributes, characteristics and functions etc. that may differ from one payment embodiment to another, or from one payer account type to another, such as, by way of example, the differences between "sealed system" type payment embodiments and other payment embodiments of this disclosure, or the differences between "open access" payer accounts and "limited access" "limited functionality" payer accounts may not restrict the comingling of technological configurations and/or attributes, characteristics and functions etc. of any payment embodiment with at least one, or as many as all, others. Further, they may not restrict the comingling of technological configurations and/or attributes, characteristics and functions etc. of any type of payer account with at least one, or as many as all, others. Further, any payment account type (as described previously or subsequently within this disclosure) may not be restricted in being used within any payment embodiment of this disclosure.

With respect to "on us" Intra-Bank memo post network transactions that may be performed within some embodiments of the present disclosure, it should be noted that whenever a payer has two or more financial accounts (regardless of whether the payer accounts are "open access" or "limited access" "limited functionality" accounts) "internally hosted", all within the same financial institution, of which may be the payer's associated authorized user financial institution 120, and whereby the payer thereof may initiate any credit(s) only, or credit(s) or debit(s) funds transactions from any payer account therein, to another of the payer's own account's therein, then any such funds transactions thereof may be performed as "on us" Intra-Bank memo post network type transactions, meaning that such funds transactions thereof may be performed directly within the financial institution that hosts the payer accounts thereof. Therefore, such transactions may not be performed in a manner whereby any external secure network may be needed or used in performing the payer initiated "account-to-account" transaction processes thereof, because the transactions thereof may be performed directly within the internal technology infrastructure of the financial institution that hosts the payer accounts thereof.

Conversely, with respect to "external secure network" transactions that may be performed within some or all embodiments of this disclosure, it should be noted that whenever a payer may have at least one or more financial accounts (regardless of whether the payer accounts are "open access" or "limited access" "limited functionality" accounts) hosted within a financial institution, and the same payer thereof may have at least one or more other financial account(s) hosted within one or more other separate financial institution(s), and whereby one or another of the financial institution(s) thereof may be the payer's associated authorized user financial institution 120, and whereby the payer thereof initiates any credit(s) only or credit(s) or debit(s) funds transactions from any payer account that may be hosted at one financial institution of the payer, to another of the payer's own accounts that may be hosted at a separate financial institution of the payer, then, any such payer initiated funds transactions thereof may be performed as "bank to bank" transactions. This means that, in some embodiment, such funds transactions thereof may be performed via an external secure network associated with both separate financial institutions of the payer, of which may support the payer in performing any such credit(s) or debit(s) funds transactions from one payer financial institution hosted account to another separate payer financial institution hosted account. These types of financial accounts of the payer may be, as previously or subsequently described or identified herein, the "externally hosted" "linked" conjunctive DDA's 205 and/or the "externally hosted" "linked" conjunctive credit line accounts 204.

With respect to this disclosure, the terms payer, user, payer/user user/payer, customer, shopper etc. may all have the same duplicative meaning.

With respect to this disclosure, it should be noted that a modified demand deposit account and a payer POSDDA 206 are one in the same.

With respect to this disclosure, the terms "customer bank" and authorized user financial institution 120 may have the same duplicative meaning.

With respect to this disclosure, the term "limited access" in connection with particular or specific payer account descriptions herein, indicates that only a payer may be enabled with access to particular or specific payer accounts (with only a few exceptions as previously or subsequently described within this disclosure).

With respect to this disclosure, the terms "limited purpose" and "limited functionality", in connection with particular or specific payer account descriptions herein, are of duplicative meaning. These terms relate to the secure construct and nature of certain payer accounts being enabled with unique specific limited functionality for the limited purpose payer usage thereof.

With respect to this disclosure, wherever the terms "drawn", "drawn down", "decremented", "draft" or "drafted", may be used within associated text, diagrams or drawings herein (including, but not limited to, FIG. 9A-FIG. 9E), the terms may refer to both or either of a debit or a credit of funds transactions directed from one account into another, or from the payer POSDDA 206 to the Bill-Pay processor 112. Therefore, by way of example, the terms "drawn", "drawn down", "decremented", "draft", or "drafted", may each be referring to, or be replaced by either one or the other of the terms "debit" or "credit", and are intended herein to generally represent the movement of funds from one account to another, regardless of whether the funds were pulled ("debited") from an account into another account or pushed ("credited") from an account into another account.

It should be noted, in some embodiments, the biller DDA 107 may be hosted within the payer authorized user financial institution 120. Should this be the case, the fulfillment of payment, from a payer's POSDDA 206 to a biller's DDA 107, may be performed as an "on us" Intra-Bank memo post network transaction directly within the technological infrastructure of the payer authorized user financial institution 120. This may occur as the payer authorized user financial institution 120 may also be a biller financial institution 110 and a biller financial institution 110 may also be a payer authorized user financial institution 120, as either may provide the same functionality, financial products and services as the other (as previously or subsequently described within this disclosure).

In some embodiments, in any instance whereby a payer may be directing payment to a biller from within the biller's brick and mortar type of business environment, or otherwise any type of biller business environment where there may be a physical biller point of sale check-out type of location, the biller thereof may allow the payer to receive "cash back" on purchases. In this context, by way of example, a biller may offer a payer the option of choosing to receive a selected amount of "cash back" (physical cash currency) from the biller point of sale clerk at a time when the payer thereof is directing and fulfilling a purchase payment transaction to the biller for goods, products or services. When the brick and mortar biller provides the POS bill into the payer's authorized user payment interface device 104 (as previously or subsequently described within this disclosure), the bill thereof may include the payer selected or payer chosen "cash back" amount, greater than the purchase payment total, of which may be provided by the point of sale clerk (biller) to the payer, immediately upon successful fulfillment of the associated purchase payment transaction thereof.

Similarly, a biller may offer "cash back" (e.g., physical cash currency etc.) to a payer in like manner, but apart from, or outside of, a purchase payment transaction. In this context, by way of example, a biller may provide a POS bill into a payer's authorized user payment interface device in order that the payer may receive a selected amount of "cash back" (e.g., physical cash currency etc.) from the associated biller thereof. The bill may not be associated with a purchase, but may otherwise only identify a selected or chosen amount of "cash back" (e.g., physical cash currency etc.), of which the payer thereof may wish to receive from the brick and mortar POS biller thereof, outside of, or apart from, a purchase of goods, products, or services. The associated biller thereof may offer or provide this type of "cash back" solution to a payer as a free service, or as a fee service, or for a discount fee, etc., to the associated payer thereof. Therefore, immediately upon successful fulfillment of the associated payment transaction thereof, the point of sale clerk (biller) thereof, may then immediately provide the payer thereof with the associated "cash back" (e.g., physical cash currency etc.) in similar or like manner as described above herein.

The following combination of rules, technological configurations and funding protections (as previously or subsequently described within this disclosure) represent all (in some embodiments), but not limited to all, of the combined components that may come together to create a form of protective "settlement intelligence" that ensures security and reliable funding for payers, billers, and all parties to a payment transaction between the payer and a biller, as follows: 1.) The rules governing access, functionality, and the technological configurations of payer accounts may include that only an authenticated authorized user/payer may securely gain authorized permissible access to the functionality and usage of particular payer accounts within some or all embodiments of the present technology, with few exceptions (as previously or subsequently described within this disclosure). These accounts may include, but may not be limited to, the user/payer "limited access" "limited functionality" POSDDA 206, and the user/payer internal or external "limited access" "limited functionality" credit lines 204*a*, 204*b*, and 204*c* or the like, whereby (within the "credits only" "sealed system" embodiment), only the associated user/payer thereof may direct credits into, and credits out of, such accounts, and whereby (within the "credits and debits only" "sealed system" embodiment), only the associated user/payer thereof may direct debits and credits into, or debits and credits out of, such accounts. There are a few exceptions in some embodiments (as previously or subsequently described within this disclosure); and 2.) The rules governing access, functionality and the technological configurations may further include, that only the authenticated authorized user/payer thereof may gain secure access into the authorized user payment interface device 104 to direct one-time payments to billers (as described previously or subsequently within this disclosure); and 3.) The rules may further include that billers may not debit funds (as a one-time event or as periodic recurring events) from any "limited access" "limited functionality" accounts of a payer (as previously or subsequently described within this disclosure). However, a payer may securely access (within, or via, the authorized user payment interface device 104) the recurring payment module 308 (as previously or subsequently described within this disclosure) of which may be integrated into the secure pass-through server 116, or alternatively, integrated into the user/payer authorized user payment interface device 104, or a plurality of both. The recurring payment module 308 may be programmed by the associated payer thereof to perform (direct or send) a one-time scheduled payment to a biller(s) and/or ongoing future recurring periodic or scheduled payment(s) to a biller(s), and the payer thereof may program particular, various and/or variable payment funding amounts for each of any one-time scheduled payment(s) and/or for as few as one, or as much as all, of any ongoing future recurring periodic or scheduled payment(s) to a biller(s). In addition, in advance of any one-time scheduled payment(s) and/or in advance of any ongoing future recurring periodic or scheduled payments being dispatched from the associated payer recurring payment module 308 to biller(s), the associated payer thereof may stop, delete, edit and/or make changes to either the schedule(s) or the payment amount(s) etc. thereof; and 4.) The rules may include that, with respect to overdraft protection (as described previously or subsequently herein), although any financial account of a payer may be provided with overdraft protection, and although overdraft protection may not be needed for "limited access" "limited functionality" type accounts, the rules may include that, in some embodiments, overdraft protection be included as a defense against unreliable funding that the payer may direct from an "open access" type of account(s) when directing payments to billers from any such accounts, into the payer's POSDDA 206, continuing from the payer's POSDDA 206, via or through the associated Bill-Pay processor 112, into the biller DDA 107 within the biller financial institution 110 (as described previously or subsequently herein). Therefore, all, but not limited to all, of the aforementioned rules, technological configurations and funding protections may come together to create a form of rules-based "settlement intelligence" that may be used in providing, not only secure payment between the payer and a biller, and all (or some) parties to a payment transaction, but may also be used in determining, with certainty, real-time funds availability and/or the forecasting of future funds availability in order to extend financial integrity to all associated parties to a payment transaction between the payer and a biller, and further ensures a "good funds model" whereby there is no risk that a payment transaction between a payer and biller would not ultimately be honored, while ensuring greater security, fraud reduction or otherwise the prevention or elimination of fraud in any instance or environment whereby a payer is directing payment to a biller.

Furthermore, in addition to the aforementioned rules, technological configurations and funding protections that may be associated with the rules-based "settlement intelligence" (previously or subsequently described within this disclosure), the rules-based "settlement intelligence" may further include additional oversight in the form of, but not limited to, computer software algorithms of strict criterion, that, in real-time, may perform processes of "hovering over" or otherwise constantly or frequently examining many or all payer funding source accounts (within many or all "sealed system" embodiments and/or all embodiments described within, or extending from this disclosure, of which may include both "limited access" "limited functionality" and/or "open access" type accounts), in order to determine real-time available funding, or forecast future available funding. This may be based on, but not limited to, the aforementioned "hovering over" or otherwise constant or frequent examination of payment history (including the examination of present or future recurring payment(s) within the recurring payment module 308, whereby existing or future funding commitments or funding dedication is to be considered), and strict oversite in securing or allowing only specific account access and guarding against any potential breach of security etc. associated with, or of, any one or all payer funding account sources. The aforementioned "settlement intelligence" technological infrastructure may be fully integrated into either, the secure pass-through server 116, the authorized user financial institution 120, or within the technological infrastructure(s) of any other associated business entities, associated financial institutions, or a plurality of any two or more technology infrastructures thereof.

It should be noted, with respect to payer funding account sources, in particular, with respect to any payer funding account sources of any embodiment described within, or extending from, this disclosure, the payer account sources thereof may need to be replenished or "paid down" from time to time. By way of example: The collective credit lines 204 operate similarly to credit cards in that the financial institution or financial entity(s) that hosts the account(s), and has extended credit to, and on behalf of, the payer thereof, may, from time to time, or perhaps on a monthly (or other) basis, send or provide a monthly activity report(s)/billing statement(s) to the associated payer thereof. The payer thereof may be expected or obligated to pay equal to, or greater than, the minimal billing amount that is due, no later than the due date associated with any given billing period of any particular credit line statement thereof, in some embodiments. In like manner, as is common with payer DDAs (e.g., the internal traditional DDA 202 (TDDA 202) or the external conjunctive linked DDA 205 etc.), to the extent that any such payer DDAs, may be obligated to satisfy any existing or forthcoming payments, bills, fees etc., the associated payer thereof may populate, or repopulate, the DDAs with sufficient funds, or more than sufficient funding, to satisfy the aforementioned financial obligations thereof, or to retain funds within the associated DDA's thereof for "safe keeping" or "savings" purposes. The nature of the payer funding account sources (as described above), in particular, any payer funding account sources of any embodiment described within, or extending from, this disclosure, may be "paid down" or replenished with funds, only from reliable funding sources, such as, but not limited to, funds being deposited into the payer DDAs, or otherwise used in paying down the payer credit lines 204, may be performed or provided to, or into, the financial accounts, via Bill-Pay, Cashier's Check deposit, Money Order, Cash, Wiring of funds, etc.

It should be noted, a biller may "return" all, or a portion, of funds to a payer for any reason (e.g., the return of funds to the payer may be in exchange for a return of purchased goods or services, or in exchange for a return of only a portion of purchased goods or services back to the biller from the payer), including in connection with a prior payment transaction between the payer and the biller. In this regard, it is to be appreciated that a biller may perform the same functions as the payer, and a payer may perform the same functions as a biller (as previously or subsequently described within this disclosure) within virtually any or all embodiments within, or extending from, this disclosure. Therefore, a biller may return all or a portion of funds to a payer using virtually the same functional method as the payer may use in directing the original associated payment to the biller. By way of example: In an instance whereby a payer may return all, or a portion, of prior purchased goods or services to a biller (directly to a biller physical point of sale location or shipped back to an ecommerce type of biller "returns location"), along with the associated bill (billing data) thereof, the biller may then use either, 1) the payer provided associated bill (billing data), or, 2) the biller's own database transaction verification information (e.g., transaction I.D., date, product or service information, etc.) to locate, identify, verify and confirm the original bill (billing data) of the payer, to then use the associated bill (billing data) thereof, to perform a return of all, or a portion, of funds to the payer. In this way, the biller, in performing "payer like" functions, may use the biller's own "authorized user payment interface device 104" functionality, to direct the aforementioned "return" of funds back into the user/payer's associated POSDDA 206 (the same account in which the original associated payment to the biller was originated from) within the payer authorized user financial institution 120, via the mutually associated Bill-Pay processor 112 (or as an "on us" Intra-Bank memo post network transaction, as previously or subsequently described within this disclosure), of which fulfills (or credits back to the payer) the return of all, or a portion, of funds back to the original payer POSDDA 206 account. Therefore, in an instance or environment whereby a biller may need or desire to "return" all, or a portion, of funds to a payer for any reason, the biller thereof may do so in a virtually duplicative manner to that of when a payer directs a payment to a biller from the payer's POSDDA 206 (as described above).

With respect to security of the biller account(s), in particular, with respect to security of the biller DDA 107, in some embodiments, the biller DDA 107 may be hosted within the biller financial institution 110. It may be configured in such a way that it may only receive funds as credit type transactions, of which may only be directed into the biller DDA 107 by the authorized biller thereof, or by an authorized agent of the biller, or by a payer in directing payment to the biller DDA 107 via an associated Bill-Pay processor 112 (or as an "on us" Intra-Bank memo post network transaction, as previously or subsequently described within this disclosure), from the payer's POSDDA 206 (in some embodiments, a payer may only direct funds into the biller DDA 107 in connection with a payment the payer is directing to the biller, e.g., for goods or services the payer is purchasing from the biller, and without acquiring or having access to any private or sensitive biller account or otherwise private information of the biller). Furthermore and in some embodiments, funds may only be directed out of the biller DDA 107 as credit type transactions, and only by the authorized biller thereof, or by an authorized agent of the biller, and only to destination accounts authorized by the biller, or to destination accounts authorized by the authorized agent of the biller. Therefore, the biller DDA 107 may (in some embodiments) only receive funding into the account as credits, and funds may only exit the account as credits, and the account may not be debited by or from any source (with only a few exceptions as described previously or subsequently herein). An exception may be that the biller financial institution 110 that hosts the biller DDA 107 may, in their normal authorized, permissible overriding management capacity, perform "on us" Intra-Bank memo post network credits and debits transactions upon any such biller accounts that they may host, and the biller DDA 107 may also be directed to send credits into, or be debited by, a Bill-Pay processor 112 associated with the biller financial institution 110 wherein the biller DDA 107 may reside.

Figure 3:
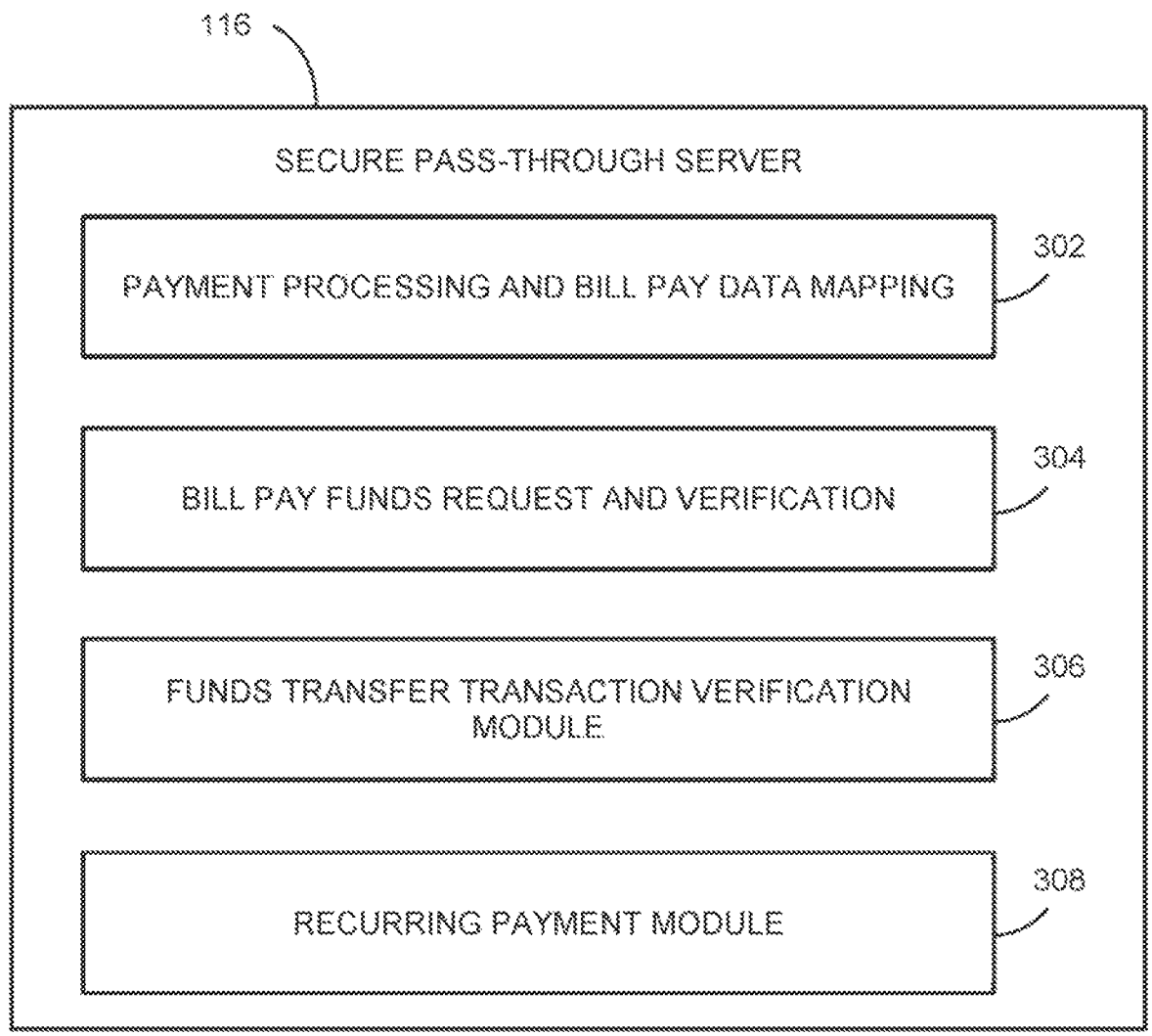
FIG. 3 illustrates an example of a secure pass-through server of the system of FIG. 1B.

FIG. 3 illustrates an embodiment of the secure pass-through server 116. As shown, the secure pass-through server 116 may include a payment processing and Bill-Pay data mapping module 302. The payment processing and Bill-Pay data mapping module 302 may be configured to modify (e.g., format etc.) the biller data received from the authorized user payment interface device 104 to comply with the requirements of the Bill-Pay processor 112 as described above. The payment processing and Bill-Pay data mapping module 302 may further be configured to send the modified biller data to the Bill-Pay processor 112 (either directly or indirectly as shown in FIG. 1B) to initiate/facilitate a transfer of funds from a payer to a biller as described above.

The secure pass-through server 116 may further include a Bill-Pay funds request and verification module 304. The Bill-Pay funds request and verification module 304 may be configured to interface with the authorized user financial institution 120 to request and/or verify that an amount of funds needed for the payment transaction is available from one or more internally hosted or externally hosted accounts associated with the user. The accounts associated with the user may include the internally hosted TDDA account 202 or externally linked DDA's 205 and internally hosted conjunctive credit lines 204a and 204b, including externally hosted conjunctive credit lines 204c. Further, the Bill-Pay funds request and verification module 304 may be configured to receive an indication of whether sufficient funds are available from the payer POSDDA 206 and/or the one or more accounts associated with the payer POSDDA 206 at the payer authorized user financial institution 120 to fulfill the payer initiated payment transaction to the biller.

The secure pass-through server 116 may further include a funds transfer transaction verification module 306 that is configured to verify that a Bill-Payment for the amount of funds has been initiated by the Bill-Pay processor 112, such as by receiving an indication of the initiation of the Bill-Payment from the Bill-Pay processor 112 as described above. The funds transfer transaction verification module 306 may further be configured to send an indication to the authorized user payment interface device 104 and/or the biller point of sale device 106 (or virtual biller point of sale device 106, or other parties, as described previously or subsequently herein), of whether or not the Bill-Payment has been initiated as described above. The funds transfer transaction verification module 306 may further be configured to send an indication to the authorized user payment interface device 104 and/or the biller point of sale device 106 (or virtual biller point of sale device 106, or other parties, as described previously or subsequently within this disclosure), of whether or not the Bill-Payment was successfully completed and funds transferred to the biller account 107 at the biller financial institution 110 as described above.

The secure pass-through server 116 may further include a recurring payment module 308 (or alternatively, the recurring payment module 308 may be integrated into the user's/ payer's authorized user payment interface device 104, or may be integrated into a plurality of both the secure pass-through server 116 and the authorized user payment interface device 104). A user/payer may (via the authorized user payment interface device 104) may securely access the recurring payment module 308 in order to configure or program (set-up or enter) biller(s) provided billing data into the recurring payment module 308. This may be done in order that the recurring payment module 308 may then dispatch a future one-time scheduled payment to a biller(s) and/or dispatch future recurring periodic or scheduled payment(s) to a biller(s) at future times, dates, or date ranges etc. (i.e., to occur one or more selected time(s) of a day, of any selected calendar day(s), of any selected calendar month(s), of any selected calendar year(s) etc.). Further, the funding amount(s) of each payment thereof may be programmed by the associated payer, to be of duplicative funding amount(s) for any single scheduled one-time payment to a biller(s), or of duplicative funding amount(s) throughout an entire series of recurring payments to any biller or billers, from the first payment of a series of recurring payments to the last payment thereof. The associated payer thereof may program particular, various, and/or variable payment funding amounts for each of any one-time scheduled payment(s) to a biller(s) and/or variable payment funding amounts for as few as one, or as much as all, of any ongoing future recurring periodic or scheduled payment(s) to a biller(s). The funding amount(s) of each payment thereof may be programmed to incrementally increase or incrementally decrease, or both, beginning with, and ending with, any payment within a series of payments. By way of non-limiting example, the first payment of a series of recurring payments may be of a greater funding amount than the last payment thereof, or the payment amounts thereof may increase or decrease in payment funding amounts for only one, or more than one, specifically selected payments, or for only one, or more than one, specifically selected groups of payments within a series of payments directed by a payer to a biller or billers. The user/payer thereof may program payments to be automatically directed or sent to a biller as a response to first receiving an expected or unexpected bill from a biller into the associated authorized user payment interface device 104.

The scheduled one-time or periodic recurring payments, to be completed to a biller from the payer's recurring payment module 308 (as described above), may be fulfilled in like manner as when a payer directs payment to a biller from within a point of sale environment (as described in numerous embodiments of this disclosure). The payer scheduled one-time or recurring payment(s) thereof, upon being released or dispatched for completion to a biller from the recurring payment module 308 may be completed from the one or more of the payer's (pre-determined or pre-chosen) accounts, such as, but not limited to, the payer associated conjunctive credit lines 204 (e.g., conjunctive credit lines 204*a*, 204*b*, and 204*c*) revealed to the payer (along with other payer accounts or account types) within the payer's authorized user payment interface device 104, to the biller. This may be done via the secure pass-through server 116, into the user/payer's associated POSDDA 206 within the payer authorized user financial institution 120, of which may almost simultaneously authorize the Bill-Pay processor 112 (associated with the payer authorized user financial institution 120) to receive a credit from, or perform a debit of, the payer's associated POSDDA 206 therein, in order to complete the payer initiated payment into the biller's DDA account 107 within the biller financial institution 110 of which fulfills the payer's payment to the biller (the payment being pre-scheduled to occur, only by the associated payer thereof). In addition, in advance of any one-time scheduled payment(s) and/or in advance of any future recurring periodic or scheduled payments being dispatched or deployed from the associated payer recurring payment module 308 to complete payment(s) to biller(s), the associated payer thereof may, as needed or desired, stop, delete, edit, and/or make changes to either the schedule(s) and/or the payment amount(s) and/or biller (billing data) etc. thereof.

Although described separately, it is to be appreciated that functional blocks/modules described with respect to the secure pass-through server 116 need not be separate structural elements. For example, the modules 302, 304, 306, and 308 may be embodied in a single chip.

The modules 302, 304, 306, and 308 may be implemented as software, firmware, hardware, or any combination thereof. For example, the modules 302, 304, 306, and 308 may include a general purpose processor, a digital signal processor (DSP), an application specific integrated circuit (ASIC), a field programmable gate array (FPGA) or other programmable logic device, discrete gate or transistor logic, discrete hardware components, memory, software or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

Figure 4:
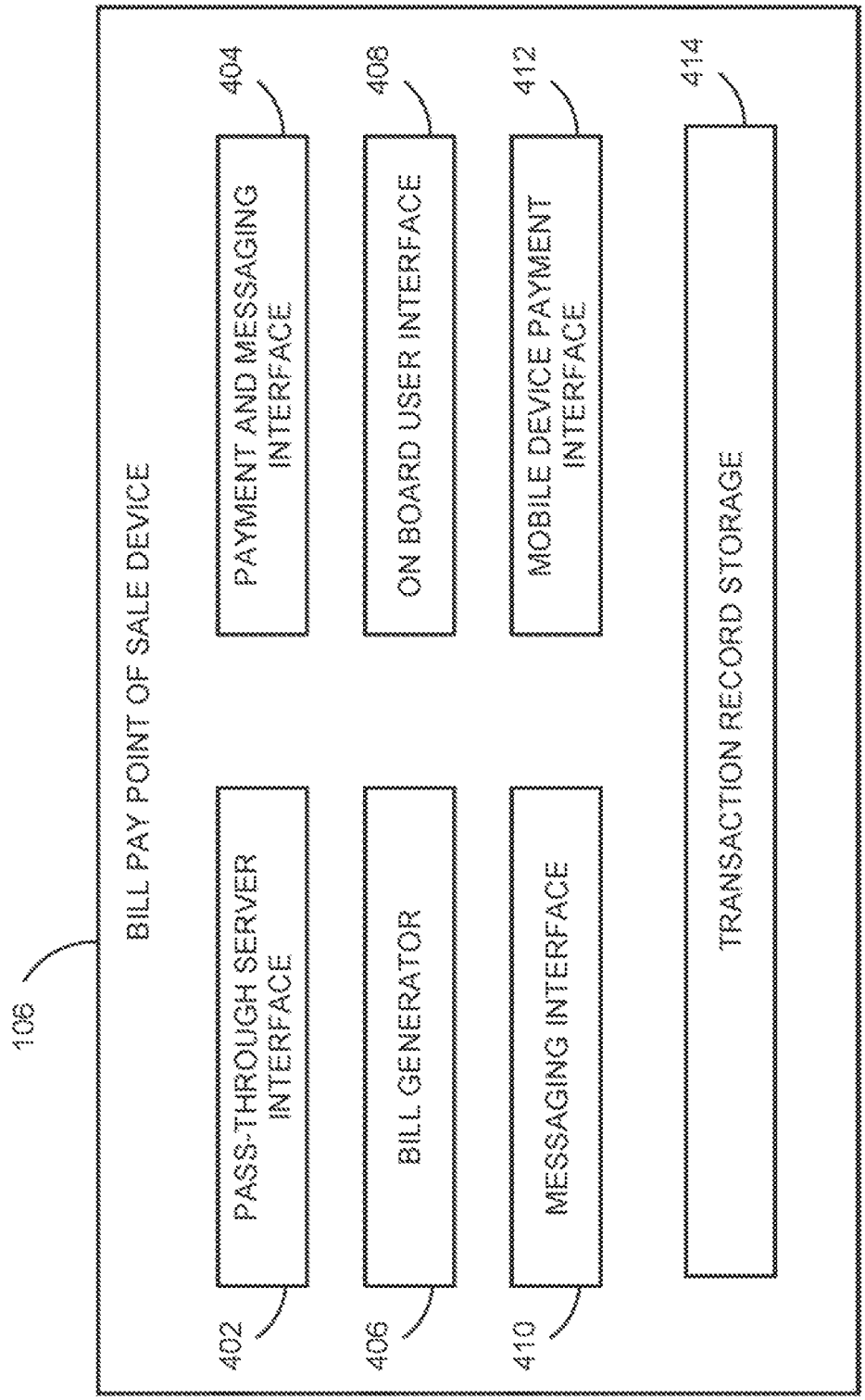
FIG. 4 illustrates an example of a biller point of sale device of the system of FIG. 1B.

FIG. 4 illustrates an embodiment of the biller point of sale device (or Bill-Pay point of sale device) 106. As shown, the biller point of sale device 106 may include a pass-through server interface 402. The pass-through server interface 402 may be configured to interface with the secure pass-through server 116 as described above. For example, the pass-through server interface 402 may comprise a driver, software, and/or hardware (e.g., network interface) that configures and exchanges data with the secure pass-through server 116. The pass-through server interface 402 may be configured to send and receive data (e.g., messages, indications, etc.) related to processing of Bill-Payments.

The biller point of sale device 106 may further include a mobile device payment interface 412. The mobile device payment interface 412 may comprise one or more of the following types of interfaces: NFC, WiFi, Bluetooth, infrared, RFID, QR code, etc. The mobile device payment interface 412 may be configured to interface with the authorized user payment interface device 104 as described above. For example, the mobile device payment interface 412 may be configured to provide biller data for a payment transaction to the authorized user payment interface device 104 as described above. The mobile device payment interface 412 may comprise a driver, software, and/or hardware (e.g., network interface).

It is to be further appreciated that the systems and methods described herein may enable an internet online biller to provide billing code(s) (billing data) for products or services offered through the biller's online websites or online advertisements (e.g., check-out pages etc.), of which correspond with one or more products or services that payer(s) may wish to purchase from the associated biller thereof. In similar or like manner, the systems and methods described herein may enable any type of biller to present or provide a bill (billing code(s)) to payers on, or through, virtually any type of media, such as, but not limited to, television presentation or advertising type media, or otherwise electronic media of any kind, or upon any tangible printed material, or a tangible surface of any kind, in order for payers to capture such bills (billing codes) either electronically, or from any type of tangible media or surface, into their authorized user payment interface device 104 (as described previously or subsequently herein), in order to further direct payment to the associated biller thereof for the purchase of any associated products or services thereof.

Thus, in some embodiments, the biller point of sale device 106 may be configured to technologically extend its functions, including, but not limited to, the mobile device payment interface 412 functions, to a website check-out page or online advertisement check-out page. These pages may allow or enable a customer (payer) to pay for products or services purchased from an online biller. In this context, when a user/payer, through any type of computing device, reaches the biller's website payment screen (e.g., website check-out page etc.) to pay for selected products or services, a billing code (such as a barcode, QR code, or some other type of billing message or billing code etc.) that represents or provides the bill (billing data) associated with the products, goods, or services being purchased by the user/payer, may be presented to the payer on the payment screen or website check-out page etc.

The payer may scan or capture the billing code (such as a barcode, QR code, or some other type of billing message or billing code etc. containing the bill or pertinent biller data) directly from the payment screen into the user's/payer's authorized user payment interface device 104 (in similar or like manner as when a payer may capture the same or similar type of billing code (biller data) from a biller brick and mortar/retail point of sale environment, as described previously or subsequently herein) in order to complete or fulfill payment to the online biller. Alternatively, when a user/payer, through any type of computing device, reaches a payment screen (e.g., website check-out page), the biller thereof may otherwise offer the user/payer a corresponding method to receive the bill (biller data) via text, email, or some other form of supported communication between the biller and the payer. The QR billing code (or some other type of supported billing message that represents or provides the bill, or biller data, to the payer from the online biller) may include all of the pertinent Bill-Payment transaction information necessary for the payer to direct and fulfill payment to the online biller.

For example, in some embodiments, a payment application of the user's/payer's authorized user payment interface device 104 may cause a code scanning application (or code reading application) (e.g., barcode reader, QR-code reader, or other application) to scan or capture the billing code (e.g., associated with the products, goods, or services being purchased by the user/payer). Upon the scanning/capturing of the billing code, the code scanning application may provide the billing code to the payment application. The payment application may then use the billing code to complete or fulfill payment to the biller. The code scanning application may be (i) an application incorporated as part of the payment application, (ii) an application separate and independent from the payment application (e.g., an application which can be independently run on the authorized user payment interface device 104, an application callable and usable by applications other than the payment application, etc.), (iii) an application designated as a default application for scanning barcodes, QR-codes, or other codes, or (iv) other application. As an example, without a user input specifically indicating the launching of the code scanning application or scanning of the billing code, the payment application may automatically launch the code scanning application based on one or more automated triggers to cause the code scanning application to scan or capture the billing code. The automated triggers may include (i) the payment application being executed on the authorized user payment interface device 104 (e.g., the payment application being launched, the payment application's state being changed from a background state to a foreground state, thereby being set to run in the foreground, etc.), (ii) recognition of patterns indicative of a barcode, QR code, or other type of code, or (iii) other triggers. In this way, even if certain latency and other delay-related issues with regard to communication between the user application and the code scanning application do occur, the negative effects on the user experience is reduced. As an example, even if other background processes on a user device slows the transmission of a launch command from the user application to the code scanning application or delays the launch of the code scanning application, one or more portions of such slowdown/delays will not be noticed by the user given that the user application can initiate launching of the code scanning application before the time that the user realizes the code scanning application should be launched.

In one use case, without a user input specifically indicating the launching of the code scanning application or scanning of the billing code (or other code), the payment application may automatically launch the code scanning application in response to the payment application's image recognition component (or pattern recognition component) recognizing patterns indicative of a barcode, QR code, or other type of code (e.g., when a the billing code is in view of a camera of the authorized user payment interface device 104). The image recognition component (or pattern recognition component) used by the payment application may be hosted locally on the authorized user payment interface device 104 (e.g., where at least a portion of the recognition processing is performed locally), remotely on one or more servers (e.g., where at least a portion of the recognition processing is performed remotely), etc. In some use cases, the payment application may obtain a user input specifying scanning of the billing code or the launching of the code scanning application. In response to such user input, the payment application may launch the code scanning application to cause the code scanning application to scan or capture the billing code. Such user input may include a user clicking, tapping, or otherwise selecting a menu item (e.g., button, icon, or other menu item) specifying scanning of the billing code or the launch of the coding scanning application. In some embodiments, the code scanning application may be automatically launched and executed in an active state in the background (e.g., based on one or more automated triggers), and then is brought to the foreground of based on one or more other triggers (e.g., another automated trigger or a user input specifying the code scanning application or the scanning of a pattern/code). In some cases, in response to being launched, the code scanning application may obtain light reflected from a physical medium (on which the billing code is presented) via a light sensor of the authorized user payment interface device 104, and decode the reflected light to obtain the billing code. As an example, when the reflected light is detected, an analog signal may be generated, and then converted by the light sensor into a digital signal. The code scanning application may then interpret the digital signal to determine the billing code.

In some embodiments, pattern recognition (e.g., image recognition, speech/voice recognition, facial recognition, iris recognition, etc.) may be performed via one or more prediction models (e.g., one or more prediction models of pattern recognition components of authorized user payment interface device 104). The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion. As an example, the neural networks (or other prediction models) may be trained to recognize that a barcode, QR code, or other type of code is presented on a piece of paper, a screen, or other object. As an example, the neural networks (or other prediction models) may be trained to determine what the barcode, QR code, or other code represents, or to extract additional information from the information represented by the barcode, QR code, or other code. As an example, one or more sensors (e.g., one or more sensors of authorized user payment interface device 104 or other components) may obtain an image or image stream from the sensors' environment (e.g., on a periodic basis, according to a predetermined schedule, in response to one or more automated triggers, etc.). The image or image stream may be provided to a neural network (or other prediction model) to detect one or more patterns. In one use case, for example, the neural network may specify that a pattern indicative of a given code type was detected. In another use case, the neural network may provide other output that is used by authorized user payment interface device 104 or other components to detect that the pattern is indicative of the given code type (or detect one or more other patterns).

In some embodiments, upon obtaining the billing code, the payment application may initiate (i) process the billing code to determine information corresponding to respective portions of the bill code (e.g., portions of billing details/invoice, product/goods/services details, etc., corresponding to different sets of bits represented by the bill code), (ii) initiate one or more queries to one or more sources to obtain results corresponding to respective portions of the billing code (e.g., performing queries of sources at the authorized user payment interface device 104, performing queries of sources remote from the authorized user payment interface device 104, such as servers or databases at biller financial institution 110, bill pay processor 112, secure pass-through server 116, authorized user financial institution 120, etc., or other servers/databases), (iii) using the determined information or obtained results to compile the total bill or other billing information, or (iv) other actions (e.g., to complete or fulfill payment to the biller based on the billing code or other purposes). The determined information or obtained results may include (i) the biller's name or other identifier, (ii) the biller's account information, (iii) the biller's physical address, email address, phone number, or other contact information, (iv) identifier(s) of the product/goods/services, price(s) of the product/goods/services, (v) discount(s) provided by the biller for the product/goods/services, or other billing information. In some cases, the payment application may provide one or more queries (or a request for such queries) to the secure pass-through server 116 to obtain results corresponding to the billing code (or portions thereof) from the secure pass-through server 116. As an example, the payment application may provide the billing code (or portions thereof) (e.g., as part of such request) to the secure pass-through server 116, and the secure pass-through server 116 may use the billing code (or portions thereof) to obtain results corresponding to the billing code (or portions thereof). In some cases, the secure pass-through server 116 may provide the obtained results to the payment application, which may use such obtained results to compile the total bill or other billing information. In some cases, the secure pass-through server 116 may such obtained results to compile the total bill or other billing information, and provide the total bill/billing information to the payment application.

Regardless of which of the aforementioned methods are provided by the online biller to enable the payer to receive the QR code or billing code (or some other type of supported billing message that represents or provides the bill, or biller data, to the payer from the online biller), into the payer's authorized user payment interface device 104, the payer thereof may then continue through virtually the same payment routine as the payer would otherwise perform within a point of sale brick and mortar retail environment. This may be done regardless of which payment embodiment is being used (as described previously or subsequently within the present disclosure), to complete or fulfill payment to the online biller for the purchase. However, instead of having a human check-out clerk on the other side of a brick and mortar retail check-out counter, a virtual biller POS server 106 may be configured to receive (from the secure pass-through server 116) payer shipping information, transaction I.D., authorization, and approval of available good funds, to then approve the transaction and release the purchased product(s) or services for shipping to the payer, via a shipping service (US Postal Service, Fed-Ex, UPS, etc.), for tangible or intangible items, or, for strictly intangible electronic products such as software etc. The shipping may be performed via software download, email link, or any other suitable form of tangible or intangible fulfillment method to the user/payer/purchaser thereof. Conversely, should the virtual biller POS server 106 conclude a decline of the payer transaction based on a decline of payer authorization, approval, or available good funds, then, such a result may effectively stop or cancel the transaction and the associated products and/or services would not be shipped to the payer (and the secure pass-through server may communicate the approval or decline status of the transaction to the payer, the online ecommerce biller and one or more other parties to the payment transaction, as described previously of subsequently herein).

Further, in some embodiments, the biller point of sale device 106 may be configured to technologically extend its functions, including, but not limited to, the mobile device payment interface 412 functions, to a television screen. This may enable a payer to purchase products, goods, or services presented or provided for purchase, through a television medium by a television biller. In this context (in similar manner as the aforementioned payment method), a user/payer may view (on a television screen or via some other viewing device(s)), a television program or television advertisement presenting and/or offering products, goods, or services for purchase, along with a billing code (such as a barcode, QR code, etc.) or some other type of billing message or billing code. This code may include, represent, or provide the pertinent Bill-Payment transaction information necessary (biller data) for the payer to fulfill payment to the television advertiser (biller) for the products, goods, or services presented on the television screen (or presented through other similar viewing devices) that the user/payer may wish to purchase.

In some embodiments, the user/payer thereof may scan and capture the coded bill into the user's/payer's authorized user payment interface device 104 directly from the television screen (or from or through other viewing devices, in similar or like manner as the aforementioned ecommerce bill (biller data) may be captured directly from a computer check-out screen, as outlined previously or subsequently within this disclosure). In some embodiments, the user/payer may be offered corresponding biller contact information on the television screen (or from or through other viewing devices) that may enable the payer to correspond with the biller to receive the bill (biller data) from the television advertiser (biller) via text, email, or some other form of supported communication between the television biller and the payer. The QR code (or some other type of supported billing message or biller data) that the payer may capture or receive from the television biller may include pertinent Bill-Payment transaction information (biller data) necessary to be provided to the payer for the payer to fulfill payment to the television medium biller.

Once the payer scans or captures the QR billing code (or some other type of supported billing message that represents or provides the bill, or biller data from the television biller) into the payer's authorized user payment interface device 104, or the payer otherwise receives, captures, or scans the bill (biller data) from an email or text message etc., that the payer may receive from the television biller into the payer's authorized user payment interface device 104, the payer may then continue through virtually the same payment routine as the payer would within a POS brick and mortar retail environment. This may be done regardless of which payment embodiment is being used (as described previously or subsequently herein) to complete or fulfill payment to the television biller for the purchase. However, instead of having a human check-out clerk on the other side of a brick and mortar retail check-out counter, a virtual biller POS server 106 may be configured to receive payer shipping information, transaction I.D., authorization, and approval of available good funds, to then approve the transaction and release the purchased product(s) or services for shipping to the payer from the television advertiser (television biller), via a shipping service (US Postal Service, Fed-Ex, UPS, etc.), for tangible or intangible items, or, for strictly intangible electronic products such as software etc. The shipping may be performed via software download, email link, or some other form of tangible or intangible fulfillment method to the user/payer/purchaser thereof. Conversely, should the virtual biller POS server 106 conclude a decline of the payer transaction based on a decline of payer authorization, approval, or available good funds, such a result may effectively stop or cancel the transaction and the associated products and/or services would not be shipped to the payer (and the secure pass-through server may communicate the approval or decline status of the transaction to the payer, the television biller and one or more other parties to the payment transaction, as described previously or subsequently within the present disclosure).

In some embodiments, a payer may be reading a magazine and encounter an advertisement for product(s) or service(s) that may also contain an associated billing code or codes (a QR code, bar code, billing code or billing message, etc.) for the products or services offered within the magazine advertisement. The payer may either scan the code or codes into the authorized user payment interface device 104. Alternatively, the biller advertisement may offer some other form of mutually supported corresponding communication. The payer may provide the biller with specific or general products or services identification numbers from the biller's own advertisement in such a way that the magazine biller thereof may respond to the payer (via an email, a text message, or some other mutually supported corresponding communication method) with a bill for the item or items offered in the advertisement. The bill may contain a billing code (QR code, bar code, billing code or billing message, etc.) that may be received into the payer authorized user payment interface device 104 in order that the payer thereof may then direct payment, shipping information, and/or contact information to the associated magazine advertising biller thereof, so that the biller, upon confirmation of payment fulfillment, may then ship the advertised products, goods, or services to the associated payer thereof. As an example (and indicated herein), a payment application of the user's/payer's authorized user payment interface device 104 may cause a code scanning application to scan or capture the code. Upon the scanning/capturing of the code, the code scanning application may provide the code to the payment application. The payment application may then use the code to direct payment, shipping information, and/or contact information to the biller (e.g., by sending the code and related instructions to the secure pass-through server 116, by sending the shipping information along with the code and related instructions to the secure pass-through server 116, by obtaining information corresponding to the code and sending the obtained information to the secure pass-through server 116, etc.). The code scanning application may be (i) an application incorporated as part of the payment application, (ii) an application separate and independent from the payment application, (iii) an application designated as a default application for scanning barcodes, QR-codes, or other codes, or (iv) other application. In some use cases, without a user input specifically indicating the launching of the code scanning application or scanning of the code, the payment application may automatically launch the code scanning application based on one or more automated triggers to cause the code scanning application to scan or capture the code. The automated triggers may include (i) the payment application being executed on the authorized user payment interface device 104, (ii) recognition of patterns indicative of a barcode, QR code, or other type of code, or (iii) other triggers. As indicated, in some cases, pattern recognition may be performed via one or more prediction models, such as neural networks, other machine learning models, or other prediction models.

In some embodiment (such as the or television billers etc.), instead of having a human check-out clerk on the other side of a brick and mortar retail check-out counter, the magazine advertisement biller may employ a virtual biller POS server 106 that may be configured to receive payer shipping information, transaction I.D., authorization, and approval of available good funds, to then approve the transaction and release the purchased product(s) or services for shipping to the payer from the magazine advertisement biller location. The biller may ship the products or services (tangible or intangible items) to the associated payer via any common or uncommon shipping service (US Postal Service, Fed-Ex, UPS, etc.), or, for strictly intangible electronic products such as software etc., the shipping may be performed for the payer via software download, email link or some other form of tangible or intangible fulfillment method to the user/payer/purchaser thereof. Conversely, should the virtual biller POS server 106 conclude a decline of the payer transaction based on a decline of payer authorization, approval, or available good funds, then, such a result may effectively stop or cancel the transaction and the associated products and/or services may not be shipped to the payer (and the secure pass-through server may communicate the approval or decline status of the transaction to the payer, the magazine advertisement biller and one or more other parties to the payment transaction, as described previously or subsequently herein).

In some embodiments, the purchase transaction may occur within a brick and mortar business establishment, but may avoid the need for a typical point of sale check-out process. In some embodiments, a brick and mortar establishment may provide a code (such as a barcode, QR code, billing data code etc.) on items available for purchase. When a shopper (a user/payer) wants to purchase a singular item, the payer may scan the singular item code into the payer's authorized user payment interface device 104. In response to scanning the code on the singular item, the singular item code may automatically be passed into the payer's authorized user payment interface device 104 to generate and/or reveal a bill therein to the payer thereof. This may be done in similar or like manner as when a payer scans a code (such as a barcode, QR code, billing data code etc.) within a typical brick and mortar point of sale check-out process (from a biller point of sale device 106) in order to capture a point of sale bill into the authorized user payment interface device 104 (as described previously or subsequently within this disclosure). As an example (and indicated herein), a payment application of the user's/payer's authorized user payment interface device 104 may cause a code scanning application to scan or capture the code. Upon the scanning/capturing of the code, the code scanning application may provide the code to the payment application. The payment application may then use the code to generate and/or reveal a bill therein to the payer thereof. In some use cases, without a user input specifically indicating the launching of the code scanning application or scanning of the code, the payment application may automatically launch the code scanning application based on one or more automated triggers to cause the code scanning application to scan or capture the code. The automated triggers may include (i) the payment application being executed on the authorized user payment interface device 104, (ii) recognition of patterns indicative of a barcode, QR code, or other type of code, or (iii) other triggers. As indicated, in some cases, pattern recognition may be performed via one or more prediction models, such as neural networks, other machine learning models, or other prediction models.

In some cases, the payer may pay the bill immediately by following the same payment routine as would otherwise be followed within a brick and mortar POS environment (as previously or subsequently described within this disclosure), or in other cases, a plurality of items may all be scanned as a group, or individually, and compiled into one total bill within the authorized user payment interface device 104, of which may then be paid immediately by the payer. By initiating the payment in this manner, the need for the consumer (payer) to bring the item or items through a typical point of sale check-out "lane" process is avoided, as the payment may otherwise be fulfilled to the biller in the aforementioned manner.

As an example, a payment application of the user's/payer's authorized user payment interface device 104 may cause a code scanning application to scan or capture codes of the plurality of items. Upon the scanning/capturing of each code, the code scanning application may provide the code to the payment application. As the payment application obtains each code, the payment application may iteratively compile the total bill. As another example, the payment application may wait to obtain a predetermined threshold number of codes (e.g., greater than one code, two codes, five codes, ten codes, or other number) (or wait until one or more predetermined threshold amounts of time, e.g., 3 or more seconds, 5 or more seconds, 10 or more seconds, or other amounts of time, has passed since obtaining a code from the code scanning application) prior to taking one or more actions. Such actions may include (i) processing each of the obtained codes to determine information corresponding to respective portions of the code (e.g., portions of billing details, product/goods/services details, etc., corresponding to different sets of bits represented by the code), (ii) initiating one or more queries to one or more sources to obtain results corresponding to respective portions of the code (e.g., performing queries of sources at the authorized user payment interface device 104, performing queries of sources remote from the authorized user payment interface device 104, such as servers or databases at biller financial institution 110, bill pay processor 112, secure pass-through server 116, authorized user financial institution 120, etc., or other servers/databases), (iii) using the determined information or obtained results to compile the total bill or other billing information, or (iv) other actions. The determined information or obtained results may include (i) the biller's name or other identifier, (ii) the biller's account information, (iii) the biller's physical address, email address, phone number, or other contact information, (iv) identifier(s) of the product/goods/services, price(s) of the product/goods/services, (v) discount(s) provided by the biller for the product/goods/services, or other billing information. Such thresholds may, for example, facilitate a reduction of computer resource usage by the payment application. It should be noted that, in some embodiments, the payment application may wait to obtain a predetermined threshold number of codes (or wait until one or more predetermined threshold amounts of time has passed since obtaining a code from the code scanning application) prior to taking one or more of the foregoing actions (or portions of the foregoing actions), but may not wait prior to taking other ones of the foregoing actions (or portions of the foregoing actions).

In some cases, in response to determining that a particular threshold number of codes has not been obtained (e.g., 10 codes or other threshold number of codes), the payment application may execute one or more queries for results corresponding to the codes that have been obtained (or perform one or more of the foregoing actions). In some cases, in response to determining that the threshold number of codes has not been obtained, the payment application may continue to wait before executing at least some queries for results corresponding to one or more codes that have been obtained (e.g., wait until the predetermined threshold number of codes has been obtained or one or more predetermined threshold amounts of time has passed since obtaining a code). As an example, the payment application may continue to wait and not execute any queries for results corresponding to one or more codes that have been obtained. As another example, the payment application may execute one or more queries corresponding to one or more portions of codes that have been obtained (e.g., code portions that correspond to information stored locally at the authorized user payment interface device 104, code portions that correspond to information stored at services from which computer resource costs are low to obtain such information relative to obtaining information corresponding to other code portions, etc.). In this way, the payment application may conserve computer resource usage (e.g., network resource usage or other resource usage) by waiting to perform certain higher-cost queries, while performing lower-cost queries or other queries (e.g., for important or critical information) to avoid any substantial period of delay for the user or to otherwise provide the user with a better user experience. In one scenario, for instance, the payment application may immediately process sets of bit represented by a particular portion of an obtained code to obtain header information stored at the authorized user payment interface device 104 to enable the payment application to interpret one or more other portions of the obtained code (e.g., subsequently after the threshold number of codes has been obtained or one or more threshold amounts of time has passed since obtaining a code).

Further, the payer may be expected or required to provide evidence to the biller (or biller representative, security person or some type of biller/payer technical electronic reader interface etc.) of a successfully completed purchase of the products, goods, or services thereof before being cleared by the biller to exit the biller brick and mortar retail establishment. Therefore, the payer may be expected or required to provide the biller (or biller representative, security person or some type of biller/payer technical electronic reader interface) with the responsive receipt, and/or payment approval and fulfillment information (received within the payer's authorized user payment interface device 104 from the secure pass-through server 116 and also received within the biller point of sale device 106 or virtual biller point of sale device 106 from the secure pass-through server 116, as previously or subsequently described within this disclosure) that matches the responsive receipt, and/or payment approval and fulfillment information received by the biller. The biller (or biller representative, security person or some type of biller/payer technical electronic reader interface), upon confirming a match of payer and biller received responsive receipts, and/or payment approval and fulfillment information, indicating the payer concluded a successfully completed purchase, may then clear the payer to exit the biller brick and mortar retail establishment with the successfully purchased products, goods, or services from the biller thereof. As an example, in order to indicate a successfully completed purchase of the products, goods, or services thereof, the secure pass-through server 116 may generate and provide a hash or other randomly-generated number or string (or other payment approval fulfillment information) to the authorized user payment interface device 104 and the point of sale device 106 (or another biller/biller representative device). A payment application of the authorized user payment interface device 104 may transmit the hash to a billing application of the point of sale device 106 (or another biller/biller representative device). Upon determining that the transmitted hash matches one of the billing application's valid hashes (e.g., the hash provided to the billing application to indicate the payer's successfully completed purchase), the billing application may provide a notification that the payer is cleared to exit the biller establishment (e.g., a notification to the biller representative indicating that the payer has paid, a notification to a door or gate to cause the door or gate to open, etc.). In some cases, the payment application may transmit the hash to the billing application (e.g., via Bluetooth or other short-range wireless communication channel, via the Internet, etc.) in response to detecting that the payer (or the payer's the authorized user payment interface device 104) is within a predetermined threshold distance of the point of sale device 106 (or another biller/biller representative device). Conversely, the biller (or biller representative, security person or some type of biller/payer technical electronic reader interface) may not allow a payer to exit the biller brick and mortar retail establishment with products, goods, or services of which are not proven to have been successfully purchased by the associated payer thereof.

In other embodiments, a payer may receive a bill from a biller associated with an account that the payer may have in place with the biller. The bill may be a tangible paper bill that contains an account statement or billing statement provided to the payer from the biller through a mail service provider such as the US postal mail service, Federal Express, etc., or alternatively, the payer may receive an electronic version of the same type of bill from a biller (via email, via text message or via some other mutually supported corresponding communication method between both the biller and the payer). Examples of some, but not all, of such tangible paper bills, or electronic bills sent by a biller to a payer include, but are not limited to, utility bills, mortgage bills, credit card bills, etc. Each bill may contain an account statement or billing statement and a billing code or billing message (such as a barcode, QR code, etc.). The billing code or billing message may contain data components necessary for a payer to fulfill payment to the associated biller thereof. When the payer scans (or receives) the associated billing code or billing message thereof into the user/payer authorized user payment interface device 104, the payer thereof may then direct payment to the associated biller thereof (in similar or like manner as described previously or subsequently within some or all embodiments of this disclosure). These types of bills may be for products, goods, or services that the payer may have already received, such as but not limited to utility services, a prior propane delivery, garbage services, telephone services or a credit card or credit line statement that may require a minimal or total payment, etc., or, for products, goods or services that the payer may have not yet received because the payer thereof may be expected or required to pre-pay for such items (or at least pre-pay a portion or a deposit on such items), in advance of receiving any such items as, by way of example, automobile parts, customized textiles, rental equipment, special order items, etc.

In some embodiments, whether internal of, or external of, any physical biller location, at any time, by any means or method, a tangible or intangible bill for products, goods, or services may be provided to a payer from a biller. Examples of this may include a payer receiving a bill from a biller (or biller representative, such as a customer service person, waiter, waitress or salesperson, a kiosk, a vending machine, etc.) within any enclosed or open air business environments, including, but not limited to, restaurants, sporting events, musical concerts, indoor competitive drone flying events, open air flea markets, etc., where there may be few or no traditional point of sale check-out locations therein. Or and also this may happen where physical billing codes or billing data may not be affixed to, or upon, products, goods, or services (as previously or subsequently described within this disclosure). Therefore, the biller (or biller representative, such as a customer service person, waiter, waitress or salesperson, a kiosk, a vending machine, etc.) may print or reveal and/or provide a bill to a payer for any products, goods or services the payer may wish to purchase (or is in the process of purchasing) in order that the payer may scan or receive the bill (e.g., scan the QR code, bar code or otherwise some form of billing code or billing message) into the payer's authorized user payment interface device 104. Alternatively, the payer thereof may receive an electronic bill from the biller (or biller representative, such as a customer service person, waiter, waitress or salesperson, a kiosk, a vending machine, etc.) via some other supported corresponding communication between the biller and the payer, whereby the bill containing a billing code (QR code, bar code, billing code, or billing message, etc.) may be received into the payer authorized user payment interface device 104, in order for the payer thereof to direct payment to the associated biller thereof (as previously of subsequently described within the present disclosure) before exiting the enclosed or open air biller business operations environment.

In some embodiments, more specifically, restaurant type biller establishments, or similar type business establishments, a payer may dine or consume both food and/or beverages, or may partake of other types of products and/or services (tangible or intangible), provided to the payer by a biller, or an employee of the biller (e.g., a biller representative, such as a customer service person, waiter, waitress, bartender, etc.) during the time in which the payer may be patronizing the biller establishment. The payer thereof, upon conclusion of dining and/or partaking of, products and/or services, etc. within the biller establishment, may be directly provided with a tangible paper bill, or an electronic bill (received by the payer via some supported corresponding communication between the biller and the payer) containing a billing code or billing data (QR code, bar code, billing code or billing message, etc.) from the biller and/or an employee of the biller (e.g., a biller representative, such as a customer service person, waiter, waitress, bartender, etc.).

The bill (or billing data), may be scanned or otherwise received by the payer into the payer's authorized user payment interface device 104 from either a point of sale environment (e.g., via a payment application or code scanning application as described herein or via other processes), or scanned or received by the payer into the payer's authorized user payment interface device 104 while the payer is located someplace else within the biller establishment (e.g., via a payment application or code scanning application as described herein or via other processes). From either location, the payer thereof may then direct payment (that may include any added gratuity or a "tip" for a service person or persons) to the associated biller thereof (in like manner as previously or subsequently described within this disclosure). The biller may require or request that the payer direct and complete verifiable payment to the biller in advance of the payer being permitted by the biller to exit the restaurant type biller establishment (or otherwise similar type business establishment). The biller, or an employee of the biller (e.g., a biller representative, such as a customer service person, waiter, waitress, bartender, etc.) upon confirming a match of payer and biller received responsive receipts, and/or payment approval and fulfillment information, indicating the payer concluded a successfully completed purchase (from the secure pass-through server 116), may then clear the payer to exit the restaurant type biller establishment. Conversely, the biller, or an employee of the biller (e.g., a biller representative, such as a customer service person, waiter, waitress, bartender, etc.), may not allow a payer to exit the biller establishment without conclusive evidence of a successfully completed purchase by the associated payer thereof.

In some embodiments, a payer may contact a biller (or biller surrogate) to place an order for goods, products, or services from the biller of which the payer may then "pick-up" from the biller location or biller designated location. In this context, a payer, whether solicited or unsolicited by a biller, may take steps to place an order with a biller for goods, products, or services via telephone, and/or via some other form of communication or interactive ordering interface of some sort or another with the biller, including, but not limited to, a payer placing an order with a biller via the biller's website, etc. The payer may place the order in response to seeing some type of biller advertisement (in one form or another), or the payer may simply need or desire to place an order for products, goods, or services of which the payer may subsequently "pick-up" from the biller location or biller designated location. Examples of a payer placing an order to "pick-up" goods, products, or services from a biller location may be, for example, a payer ordering and picking up food from a restaurant biller, or a payer ordering and picking up flowers from a flower shop biller, or a payer placing an order for products, goods or services with any type of biller via some form of communication, or interactive ordering interface of some sort or another, to then "pick-up" the ordered items or services from the biller location, biller satellite location or otherwise biller designated location.

With respect to a payer directing payment to a biller for "pick-up" items or services, the biller (or biller representative, such as a customer service person, waiter, waitress, salesperson, a kiosk, a vending machine, etc.), may provide the payer with a tangible paper bill, or an electronic bill (received by the payer via some supported corresponding communication between the biller and the payer) containing a billing code or billing data (e.g., QR code, bar code, billing code or billing message, etc.), in advance of payer arrival, upon payer arrival, or after payer arrival, to the biller "pick-up" location. The bill (or billing data), once scanned or otherwise received by the payer into the payer's authorized user payment interface device 104 (e.g., via a payment application or code scanning application as described herein or via other processes), may enable the associated payer thereof to direct payment to the associated biller thereof (in like manner as previously and/or subsequently described herein). The biller may require and/or request that the payer direct and complete verifiable payment to the biller in advance of the payer being permitted by the biller to exit the biller "pick-up" location with the products, goods, or services previously ordered by the associated payer thereof. The biller (or biller representative, such as a customer service person, waiter, waitress, salesperson, a kiosk, a vending machine, security person or some type of biller/payer technical electronic reader interface, etc.), upon confirming a match of payer and biller received responsive receipts, and/or payment approval and fulfillment information, indicating the payer concluded a successfully completed purchase, may then clear the payer to exit the biller "pick-up" location with the successfully purchased products, goods or services. Conversely, the biller (or biller representative, security person, or some type of biller/payer technical electronic reader interface, etc.) may not allow a payer to exit the biller "pick-up" location with products, goods, or services of which are not proven to have been successfully purchased by the associated payer thereof.

In some embodiments, a payer may be solicited by a "solicitation type biller", which is any type of biller that may directly (or via any type of biller solicitation system, such as, but not limited to, a fax system, or robotic fax system, an email system, or robotic email system, or via a telemarketer call, or robotic telemarketer call system to a payer's cell phone, or land line, etc., or, via postal mail, special delivery notice, etc.), solicit a payer. The solicitation of a payer, by a "solicitation type biller", may be associated with the biller's efforts in trying to entice the payer to purchase products or services, or may be performed by a biller (or by a surrogate of the biller) in pursuit of a payer to collect a debt from the payer, or in seeking charitable contributions from a payer, or performed as a follow-up with a payer in connection with a prior payer purchase, etc. In some embodiments, a payer may be solicited by any biller, for any reason, through any ways or means described herein, but not limited to any of the ways and means described herein. In response to the biller solicitation, the payer may elect to direct payment to the biller (in like manner as previously or subsequently described within this disclosure or in any other suitable manner).

In some embodiments, in order for the "solicitation type biller" to receive payment from the payer (for products and/or services, a debt collection, a contribution, etc.), the biller and the payer may provide, either to the other, methods whereby the payer may receive or capture a bill or billing data (e.g., QR code, bar code, billing code or billing message, etc.) into the payer's authorized user payment interface device 104 from the associated biller thereof. For this purpose, a payer may provide the biller with an email address, postal mailing address, text number, etc., of which the biller may use to send or communicate the bill to the associated payer thereof. Conversely, the biller may provide the payer with a website or physical location, etc., where the associated payer thereof may navigate to, in order to scan, capture, or receive a bill from the associated biller thereof. Once the payer captures the "solicitation type biller" bill into the payer's authorized user payment interface device 104, the payer thereof may then direct or complete the payment to the associated biller thereof (in like manner as described previously or subsequently within this disclosure).

Should it be the case that a payer may elect to direct payment to a "solicitation type biller" for tangible goods, products, or services, the biller may ship the products or services to the associated payer thereof via any common or uncommon shipping service (e.g., US Postal Service, FedEx, UPS, etc.). The biller may otherwise provide the payer with a physical pick-up location to pick-up the products or services, or, for strictly intangible or electronic products, such as software etc., the shipping may be provided by the "solicitation type biller" to the payer via software download, email link, or some other form of electronic or intangible fulfillment method.

Further, should it be the case that a payer may direct payment to a "solicitation type biller" to support a charitable contribution, or debt collection type of payment, etc., the associated biller thereof may only be requested or required to provide (via email, text, postal service, fax, etc.) a receipt to the payer in connection with the payment, that may also include descriptions of the nature of the payment for tax purposes etc. Conversely, should the "solicitation type biller" biller POS device 106 (or virtual biller POS device 106), via communication with the secure pass-through server 116, conclude a decline of the payer transaction based on a decline of payer authorization, approval, or available good funds, then, such a result may effectively stop or cancel the transaction and the associated products and/or services would not be shipped to the payer. Or the payer may otherwise not receive any form of credit for the associated decline thereof (and the secure pass-through server 116 may communicate the approval or decline status of the transaction to the payer, the "solicitation type biller" and one or more other parties to the payment transaction, as described previously or subsequently within this disclosure).

In some embodiments, a payer may direct payment to a biller via a biller provided kiosk, vending machine, kiosk, fast food restaurant, parking meter, airport storage container, etc. (e.g., via a payment application as described herein or via other processes). By way of non-limiting example, a payer may desire to park a motorized vehicle within a parking space along a curb, or a parking space within a parking lot, where there may be a biller parking meter associated with the space whereby the payer may purchase the use of a block, or period, of time (e.g., minutes, hours, etc.) associated with the biller parking space in exchange for payment directed by the payer to the associated biller thereof in connection with a bill generated for the payer from the associated biller parking meter thereof. The payer may operate the parking meter buttons, dials, or functions thereof in such a way as to choose or select the use of a block or period of time associated with the parking space. Once the payer selection is completed, the parking meter may provide a bill or billing code (e.g., QR code, bar code, billing code or billing message, etc.) on a screen of the meter (or the meter may otherwise print out a ticket of some sort or another with the billing code thereon) of which may be scanned by the payer into the payer's authorized user payment interface device 104 (e.g., via a payment application or code scanning application as described herein or via other processes), in order that payer may then direct payment to the associated biller thereof for use of the biller's parking space (in like manner as previously or subsequently described within this disclosure). Once the biller's virtual bill-pay POS device 106 receives a responsive message from the secure pass-through server 116, a successful purchase message (or a decline of purchase message) may be further communicated to the biller parking meter, the biller, and/or the payer. If a successful purchase was completed (by the associated payer thereof to the associated biller thereof), a screen on the meter may provide evidence of the successful purchase to the payer, or, the parking meter may print out a successful purchase ticket or receipt for the payer indicating the successful purchase. In either case, the chosen amount of time successfully purchased by the associated payer thereof for the associated parking space thereof may be revealed and provided to the payer. Conversely, should the parking space biller virtual biller POS server 106, via communication with the secure pass-through server 116, conclude a decline of the payer transaction based on a decline of payer authorization, approval, or available good funds, then such a result may effectively stop or cancel the transaction and the associated parking space would not grant evidence, authorization, or permission for the payer to use the associated biller parking space thereof (and the secure pass-through server 116 may communicate the approval or decline status of the transaction to the payer, the parking space biller, and one or more other parties to the payment transaction, as described previously or subsequently within the present disclosure).

In some embodiments, similar to a payer directing payment to a parking space biller (as previously described herein), a biller may otherwise employ a biller kiosk type of solution to provide a bill to a payer. By way of non-limiting example, should a payer need or desire to park a motorized vehicle within a biller parking space within a biller parking garage, or biller parking lot, etc. (collectively: biller parking garage), the payer may drive the motorized vehicle to the entrance of a biller parking garage where the payer may be issued an "entry time stamp" type of ticket from the biller parking garage entry kiosk, of which the payer may retain. Upon receiving the "entry time stamp" type of ticket, the payer may then be authorized or permitted to drive the motorized vehicle into the biller parking garage, and park the motorized vehicle in a parking space therein. At some later random payer chosen or appointed time, the payer may remove the motorized vehicle from the biller parking garage, therefore, at that time, the payer may drive the motorized vehicle to an exit location of the biller parking garage. Once at the exit location, in order to be authorized or permitted to drive or remove the motorized vehicle out of the biller parking garage (e.g., by causing a gate, gate arm, or other gate component to be raised or via other process), the associated payer thereof may be obligated to provide the original payer retained, "entry time stamp" type of ticket, or similar type of ticket (collectively: ticket) to the parking garage biller, via the parking garage biller exit kiosk. In this regard, the parking garage biller exit kiosk may be configured to enable the payer to insert the ticket, scan the ticket etc. into the exit kiosk, or the exit kiosk may otherwise be configured with (and enable the payer to use) some form of reader (i.e., barcode reader, QR code reader, etc.) to read and/or, in some way, capture particular ticket information from the ticket (e.g., how many days, hours, minutes, etc. of biller parking garage time was used by the associated payer thereof) in order for the exit kiosk to then provide a bill to the payer for use of biller parking garage space. The bill or a billing code thereof (e.g., QR code, bar code, billing code, or billing message, etc.) may be presented on a screen of the exit kiosk to the payer. Or the exit kiosk may otherwise print out a ticket or bill of some sort or another with the billing code thereon (e.g., QR code, bar code, billing code, or billing message, etc.), of which, in either case or another, may be scanned by the associated payer into the payer's authorized user payment interface device 104 (e.g., via a payment application or code scanning application as described herein or via other processes), in order that payer may then direct and complete payment to the associated parking garage biller thereof (in like manner as previously or subsequently described within this disclosure). During this payment process, the parking garage biller's virtual bill-pay POS device 106 may receive a responsive message from the secure pass-through server 116 indicating the payer's payment for use of the biller parking garage space was successful (or a responsive decline of payment message may occur). The responsive message may be communicated to the biller, the biller parking garage exit kiosk, and/or the payer. If a successful payment were completed (e.g., by the associated payer thereof to the associated biller thereof), a screen on the exit kiosk may provide evidence of the successful purchase to the payer and/or the exit kiosk may print out a successful purchase receipt for the payer, and the payer may then be authorized or permitted to exit the biller parking garage with the payer associated motorized vehicle (e.g., by causing a gate, gate arm, or other gate component to be raised or via other process). Conversely, should the parking garage virtual biller POS server 106, via communication with the secure pass-through server 116, receive a message of a decline of the payer payment transaction based on a decline of payer authorization, approval, or available good funds etc., then, such a result may effectively stop or cancel the payment transaction and the associated payer thereof may not be authorized or permitted to exit the biller parking garage with the associated motorized vehicle without first fulfilling payment to the associated parking garage biller thereof and/or receiving consent or permission from the associated parking garage biller to exit the biller parking garage with the motorized vehicle (and the secure pass-through server 116 may communicate the approval or decline status of the transaction to the payer, the parking garage biller, and one or more other parties to the payment transaction, as described previously or subsequently within this disclosure).

In some embodiments, such as a fast food type of restaurant or other type of restaurant, or similar or dissimilar business establishment (collectively: biller establishment), a payer may place or generate an order for food, drinks etc., or other products or services, via a biller provided kiosk (biller kiosk) that may be located within the biller establishment. Furthermore, subsequent to a payer completing an order for food, drinks etc., or other products or services via a biller kiosk, the biller kiosk may then responsively generate or provide a bill to the payer associated with the payer's order. The bill may be provided to the payer from the biller kiosk, in the form of an electronic bill or a billing code (e.g., QR code, bar code, billing code or billing message, etc.) that may be presented on a screen of the biller kiosk to the payer, or alternatively, the biller kiosk may otherwise print out a bill of some sort or another with the billing code thereon (e.g., QR code, bar code, billing code or billing message, etc.), of which, in either case or another, may be scanned by the associated payer into the payer's authorized user payment interface device 104 (e.g., via a payment application or code scanning application as described herein or via other processes). This may be done in order that the payer may then direct and complete payment to the associated biller establishment thereof (in like manner as previously or subsequently described within this disclosure). During this payment process, the biller establishment's virtual bill-pay POS device 106 may receive a responsive message from the secure pass-through server 116 indicating the payer's payment (for food, drinks etc., or other products or services) was successful (or a responsive decline of payment message may occur). The responsive message may be communicated to the biller, the biller kiosk, and/or the payer. If a successful payment was completed (by the associated payer thereof to the associated biller thereof), a screen on the biller kiosk may provide evidence of the successful purchase to the payer and/or the biller kiosk may print out a successful purchase receipt for the payer. The payer may then be authorized or permitted to receive, or take possession of (either internal of, or external of, the biller establishment), the food, drinks etc., or other products or services, associated with the payer's order, of which may also correspond with the bill the payer received from the biller kiosk. Conversely, should the biller establishment virtual biller POS server 106, via communication with the secure pass-through server 116, receive a message of a decline of the payer payment transaction based on a decline of payer authorization, approval, or available good funds etc., then, such a result may effectively stop or cancel the payment transaction. The associated payer thereof may not be authorized or permitted to receive or take possession of the food, drinks etc., or other products or services provided by the associated biller establishment thereof, unless the payer may otherwise fulfill the obligatory payment to the associated biller establishment thereof (and the secure pass-through server 116 may communicate the approval or decline status of the transaction to the payer, the biller establishment, and one or more other parties to the payment transaction, as described previously or subsequently within the present disclosure).

In some embodiments, a vending machine biller may receive payment from a payer. By way of example, a payer may desire to purchase a certain type of candy bar from a biller's vending machine. The biller's vending machine may house at least one, but not limited to one, type of candy bar, or other assorted candies, drinks or food items of some sort or another. In one example, the payer may be over abundantly desirous to purchase only the given type of candy bar from the biller's vending machine. The payer may operate the vending machine buttons, dials, or functions thereof in such a way as to choose or select at least one, but not limited to one, given type of candy bar and/or one or more other of the assorted candies, drinks, or food items of some sort or another therein. The payer may choose to select only the given type of candy bar. Once the selection is completed, the vending machine may provide a bill or billing code (e.g., QR code, bar code, billing code or billing message, etc.) on a small screen of the vending machine (or may otherwise print out a ticket of some sort or another with the billing code thereon) of which may be scanned by the payer into the payer's authorized user payment interface device 104 (e.g., via a payment application or code scanning application as described herein or via other processes), in order for the payer thereof to then direct payment to the vending machine biller (in like manner as previously or subsequently described within this disclosure). Once the vending machine biller's virtual bill-pay POS device 106 receives a responsive message from the secure pass-through server 116, the successful purchase message (or a decline of purchase message) may be further communicated to the biller vending machine, the biller and the payer. If a successful purchase was completed (by the associated payer thereof to the associated biller thereof), a screen on the biller vending machine may provide evidence of the successful purchase to the payer thereof, or, the vending machine may otherwise print out a successful purchase ticket or receipt for the payer indicating the successful purchase, and the given type of candy bar may then be released or dispensed from the associated vending machine thereof to the associated payer thereof. Conversely, the biller vending machine may not release or dispense the payer selected given type of candy bar and/or one or more other of the assorted candies, drinks or food items of some sort or another of which are not proven or recognized to have been successfully purchased by the associated payer thereof.

In some embodiments, the biller may be the same as, or similar to, a "gas station" (i.e., fuel station) type of biller. In some embodiments, a payer may direct payment to the biller thereof (fuel station biller) for fuel or other products or services. By way of example, a payer may drive a motorized vehicle into a gas station (fuel station biller) physical location, wherein the payer may stop or park the motorized vehicle by, or near, or parallel to, or adjacent to, a payer selected fuel pump of one sort or another, such as a gasoline fuel pump or diesel fuel pump, etc., that the payer may wish to use in dispensing fuel into the fuel tank of the payer's motorized vehicle.

In advance of the payer (or a service person, or employee, of the fuel station biller thereof) facilitating the dispensing of fuel into the payer's motorized vehicle from the fuel pump thereof, the payer thereof may be directed or obligated to direct payment to the associated fuel station biller thereof.

In order that the payer may direct payment to the associated fuel station biller, the payer selected fuel pump may be designed in such a way that it may include being physically outfitted with a user interface of some sort or another (or an associated user interface thereof may be located elsewhere on the fuel station biller premises), similar to a fast food restaurant type of biller kiosk embodiment or a vending machine biller type of embodiment (as described previously or subsequently within the present disclosure).

The fuel pump user interface may include an order screen and/or a payment screen, or otherwise buttons or controls of some sort or another that may enable the payer to place a fuel order (or an order for other products and/or services of some sort or another) from the fuel station biller.

In some embodiments, when a payer may place an order for fuel (or an order for products and/or services of some sort or another) from the fuel pump user interface, then, in advance of, or subsequent to the fuel station biller fuel pump dispensing any fuel, or the fuel station biller otherwise fulfilling the payer's order for other products or services, etc., the fuel pump user interface may generate an electronic bill or billing code (e.g., QR code, bar code, billing code or billing message, etc.) that may be presented on a screen of the fuel pump user interface to the associated payer thereof, in order that the associated payer thereof may scan or capture the bill or billing code into the payer's authorized user payment interface device 104, or, the fuel pump user interface may otherwise be equipped to send a text message bill, or an email bill, with the billing code therein or thereon (e.g., QR code, bar code, billing code or billing message, etc.) to, or into, the payer's authorized user payment interface device 104. Alternatively, the fuel pump user interface may otherwise print out a bill of some sort or another with the billing code thereon (e.g., QR code, bar code, billing code or billing message, etc.), of which, in either case or another, may be scanned by, or captured into, the associated payer's authorized user payment interface device 104 (e.g., via a payment application or code scanning application as described herein or via other processes).

The payer thereof may then direct and complete payment to the associated fuel station biller establishment thereof, in connection with the order that was initiated by the associated payer thereof, in order that the payment may then be completed or fulfilled to the associated fuel station biller thereof (in like manner or in similar manner as previously or subsequently described within this disclosure).

During this payment process, the fuel station biller establishment's virtual bill-pay POS device 106 may receive a responsive message from the secure pass-through server 116 indicating the payer's payment for the fuel order (or an order for products and/or services of some sort or another) was successfully completed or fulfilled (or a responsive "decline of payment" message may occur) to the associated fuel station biller thereof.

The responsive message may be communicated to the fuel station biller, the fuel pump user interface, and/or the payer. If a successful payment was completed (by the associated payer thereof to the associated fuel station biller thereof), a screen on the fuel pump user interface may provide evidence of the successful purchase to the payer and/or the fuel pump user interface may print out a successful purchase receipt for the payer. The payer may then be authorized or permitted to dispense fuel from the associated fuel station biller fuel pump (and/or the payer may otherwise take possession of the products and/or services associated with the payer's order), of which may also correspond with the bill the payer received from the fuel station biller fuel pump user interface.

Further and in some embodiments, should it be the case that the fuel station biller fuel pump user interface may be configured in such a way that the payer may be expected or obligated to direct payment to the fuel station biller thereof, in advance of being able to dispense fuel into the payer's motorized vehicle, then the fuel pump user interface thereof may allow or support the payer in ordering an amount of fuel less than, equal to, or greater than the amount needed or desired by the payer to be dispensed into the fuel tank of the payer's motorized vehicle. In this regard, should the payer use less fuel than the payer may have initially purchased, the fuel station biller may (as described previously or subsequently within this disclosure) direct a credit payment back to the associated payer thereof for the cost of the fuel that was not otherwise dispensed into the payer's motorized vehicle fuel tank. It should be noted that within this disclosure the vehicle may not be "motorized" and may be powered in other ways. Further, the "vehicle" may be a device other than a vehicle.

In some embodiments, should the fuel station biller virtual biller POS server 106, via communication with the secure pass-through server 116, receive a message of a decline of the payer payment transaction based on a decline of payer authorization, approval, or available good funds etc., then, such a result may effectively stop or cancel the payment transaction, and the associated payer thereof may not be authorized or permitted to dispense fuel from the associated fuel station biller fuel pump, or receive or take possession of other products or services that may have otherwise been ordered through the fuel pump user interface by the associated payer thereof, unless the payer, through some other form of payment fulfillment may otherwise fulfill the obligatory payment to the associated biller establishment thereof (and the secure pass-through server 116 may communicate the approval or decline status of the transaction to the payer, the biller establishment, and one or more other parties to the payment transaction, as described previously or subsequently herein).

In some embodiments, a payer may be enabled to perform an automated teller machine (ATM) transaction to procure cash from an ATM (ATM biller). By way of non-limiting example, a payer may receive or procure cash from an ATM in exchange for directing reciprocal payment to the associated ATM biller thereof. In this context, the payer may have direct human user interface, of some sort or another, directly with the physical ATM (e.g., via an associated touchscreen and/or keyboard or voice recognition type of communication interface or device, etc.) associated with the ATM biller thereof. The payer may use one or more of the aforementioned ATM user interface types of screens or keyboards, buttons, or other user interface command or request solutions, etc. (provided to the payer directly on the ATM) to select a desired general or specific amount of cash currency (and/or other information) from a menu of general or specific (or payer configured) choices.

The payer may further provide input and/or other pertinent data or information into the ATM human user interface solution(s) to request, choose, or configure additional or other information selections the payer may wish to receive from the ATM. The payer may furthermore prompt the ATM (ATM biller) to generate a bill (that may also contain the other related or pertinent information) the payer may receive from the ATM, in order that the payer may perform a reciprocal payment to the ATM biller thereof in exchange for receiving a requested amount of cash disbursement, etc. from the ATM. In some embodiments, the payer may perform the reciprocal payment to the ATM biller thereof in advance of, or subsequent to, receiving the requested amount of cash disbursement, etc. from the ATM.

In some embodiments, the payer may receive a bill that may indicate the payer chosen, or selected, amount of funds (and/or other information) that the ATM may dispense (or that the ATM may have already dispensed), to the payer. This may include any other default or payer requested or selected, or payer configured, information that may be included on the bill. The bill may also include other information, such as but not limited to ATM network type fees, other fees, account balances, and/or any other default or payer requested information, etc.

After the bill or billing code (e.g., QR code, bar code, billing code or billing message, etc.) is generated and provided to the payer on the ATM human interface screen and/or printed out of the ATM printer for the payer, the payer may then scan or otherwise capture the bill or billing code (e.g., QR code, bar code, billing code or billing message, etc.) into the payer's user/payer authorized user payment interface device 104 (e.g., via a payment application or code scanning application as described herein or via other processes). Alternatively, the payer may receive the bill or billing code (e.g., QR code, bar code, billing code or billing message, etc.) into the payer's authorized user payment interface device 104 via text message, or via email (or via any other supported communication of one type or another between the ATM biller and the payer authorized user payment interface device 104). The payer may then direct payment to the ATM biller (in a similar manner as previously or subsequently described within this disclosure).

In some embodiments, after the payer scans or otherwise captures the bill or billing code (e.g., QR code, bar code, billing code, or billing message, etc.) into the payer's user/payer authorized user payment interface device 104, the payer may then direct and/or complete payment to the associated ATM biller thereof. The ATM bill may be paid in similar or like manner as making payment to an ecommerce website biller or television biller (as previously described above).

Upon the ATM biller virtual biller point of sale device 106 and/or the associated or controlling or governing persons or management systems thereof receiving approval and/or authorization for the ATM to dispense funds to the payer (from the secure pass-through server 116), the associated ATM thereof may dispense the payer selected amount of cash currency to the associated payer thereof, directly from the ATM biller associated ATM.

In some embodiments, a user/payer (user/payer bill receiver) may perform a person-to-person (P2P) type of payment transaction, or funds transfer transaction, whereby a user/payer bill receiver may direct payment to another user/payer (user/payer biller). By way of example, a user/payer biller may send a bill or billing code (e.g., QR code, bar code, billing code, or billing message, etc.) via text message, or via email (or via any other type of supported secure communication between the user/payer biller and user/payer bill receiver) to, or into, a user/payer bill receiver's authorized user payment interface device 104, or alternatively, the user/payer bill receiver may scan the bill or billing code (e.g., QR code, bar code, billing code or billing message, etc.) from some other tangible or intangible source, etc. associated with, or provided by, the user/payer biller, such as, but not limited to, a screen on the user/payer biller's authorized user payment interface device 104, made accessible to the user/payer bill receiver by the user/payer biller. The bill that may be received by the user/payer bill receiver from the user/payer biller may be for a currency amount (a payment or funds transfer transaction amount) that may, or may not, have been pre-determined, or pre-discussed, between both parties to the payment or funds transfer transaction.

The bill received by user/payer bill receiver may be from a user/payer biller that may be a friend, a family member, or any other person or entity. The bill received by a user/payer bill receiver from a user/payer biller may be for any descript or nondescript reason or purpose and may or may not be associated with the user/payer bill receiver facilitating a purchase of goods, products or services from the user/payer biller.

After the user/payer bill receiver receives a bill from the user/payer biller (into the user/payer bill receiver's authorized user payment interface device 104), the user/payer bill receiver may direct, complete, and/or fulfill a P2P payment transaction, or funds transfer transaction, to the associated user/payer biller thereof (i.e., friend, family member, or any other person) in similar or like manner as a user/payer may perform in directing payment to a merchant or any other type of biller (as previously or subsequently described in this disclosure). This may be possible because, in this context, the user/payer bill receiver and user/payer biller may, by default, both be pivotally enrolled as both a payer and/or a biller. Therefore, they may both be provided with a POSDDA 206 and other associated accounts, etc., and may both have the same type of associated support applications (e.g., an application, software, and/or some type of hardware component) that may be associated with or integrated into each of their own authorized user payment interface device's 104. This may be done in order to pivotally perform the functions of both a payer and a biller. Ergo, both user/payer parties thereof are enabled to perform P2P payment transactions with one another or other user/payer bill receivers and/or other user/payer billers of the same system.

Further, in any instance whereby the user/payer bill receiver and the user/payer biller have POSDDA 206 accounts within the same authorized user financial institution 120, or otherwise POSDDA 206 accounts in separate branches of the same financial institution 120 of which may have network connectivity between the branches thereof, the P2P payment or funds transfer transactions that may be performed between the aforementioned parties may be performed as "on us" Intra-Bank memo post network transactions (as previously or subsequently described within this disclosure).

It is to be appreciated that, in some embodiments of this disclosure, any payer may pivotally be enrolled as a biller and any biller may pivotally be enrolled as a payer, and both may perform the functions of the other (as previously or subsequently described or identified within this disclosure).

One of ordinary skill in the art will readily appreciate the many ways in which a payer may scan, capture, receive, or otherwise be provided with a bill or billing code (e.g., QR code, bar code, billing code or billing message, etc.) from any one or another biller business environment embodiment (as identified or described previously or subsequently herein), into the payment application associated with, or integrated into, the payer's authorized user payment interface device 104.

Further, in any one or another biller business environment embodiment description (as identified or described previously or subsequently within this disclosure) whereby the biller thereof may provide a payer with a bill or billing code (e.g., QR code, bar code, billing code or billing message, etc.) into a payer's authorized user payment interface device 104, it should be noted, even though one or another description thereof may not further specifically describe the total process of payment fulfillment from the payer to the biller. Nevertheless, if the associated payer thereof continues the payment process, via the payer's authorized user payment interface device 104, then, without further explanation thereof, it is to be assumed or expected that the payment process may continue to be performed via one or another payment fulfillment embodiment, or via one or another combination thereof (as previously or subsequently described within this disclosure). Therefore, unless the payment is otherwise stopped by the payer thereof, or otherwise cancelled or unfulfilled for lack of available funding etc. (as previously of subsequently described within this disclosure), the payment may be fulfilled to the associated biller thereof. Examples of one or another of such payment fulfillment embodiments may include, but may not be limited to, the aforementioned "credits only" "sealed system" or the "credits and debits only" "sealed system" or the "on us" Intra-Bank memo post network "sealed system" or the "open access" type account(s) system, etc. (as extensively described previously or subsequently within and/or throughout the scope of the present disclosure).

It should be noted that in some embodiments, with respect to each of any financial institution, Bill-Pay network and/or Bill-Pay provider, payer and/or biller, etc., that may be licensed and/or authorized to use the financial products and/or services, (or any portions thereof), identified or described throughout the scope of (or extending from), this disclosure, certain things may occur. For example, in some embodiments, each of any financial institution, Bill-Pay network and/or Bill-Pay provider, payer and/or biller, etc. thereof, may also be licensed and/or authorized to vicariously host or provide the financial products and/or services, (or any portions thereof), identified or described throughout the scope of (or extending from), this disclosure to one or another other financial institution, Bill-Pay network and/or Bill-Pay provider, payer and/or biller, etc.

In some embodiments, the biller point of sale device 106 may further include an on board user interface 408. The user interface 408 may comprise software, hardware, firmware, or a combination thereof to display an interface (e.g., graphical user interface) to a biller or other user of the biller point of sale device 106. The user interface 408 may include, for example, a display and an input device, such as a display with a touch screen. The user interface 408 may include a graphical user interface on the display that allows a user of the biller point of sale device 106 to control it according to the functions described herein. For example, the user interface 408 may display information regarding the transaction including line items, costs, approval of transactions, availability of funds, context-relevant messages, and other information described herein.

The biller point of sale device 106 may further include a bill generator 406. The bill generator 406 may comprise software, hardware, firmware, or a combination thereof to generate the biller data that is transferred to the authorized user payment interface device 104. The biller point of sale device 106 may also include a payment and messaging interface 404. The payment and messaging interface 404 may be configured to process messages received from the secure pass-through server 116, the authorized user payment interface device 104, and/or the messaging module 108. For example, the payment and messaging interface 404 may be configured to receive messages or data from the messaging interface 410 and process the messages for display on the biller point of sale device 106 using the on board user interface 408. Further, the payment and messaging interface 404 may be configured to send and/or receive messages or data from the mobile device payment interface 412 and process the messages, such as to receive biller data from the bill generator 406 and process it for transmission to the authorized user payment interface device 104 via the mobile device payment interface 412. The payment and messaging interface 404 may also process authorization codes received from the pass-through server interface 402 and/or the mobile device payment interface 412 from the secure pass-through server 116 and the authorized user payment interface device 104, respectively.

The payment and messaging interface 404 may be configured to receive messages and/or data from the pass-through server interface 402 and process it, such as to verify availability of funds of the user for completing the payment transaction, whether a Bill-Payment has been initiated, whether funds have been received in the biller DDA 107 at the biller financial institution 110, and other functions described herein.

Figure 5:
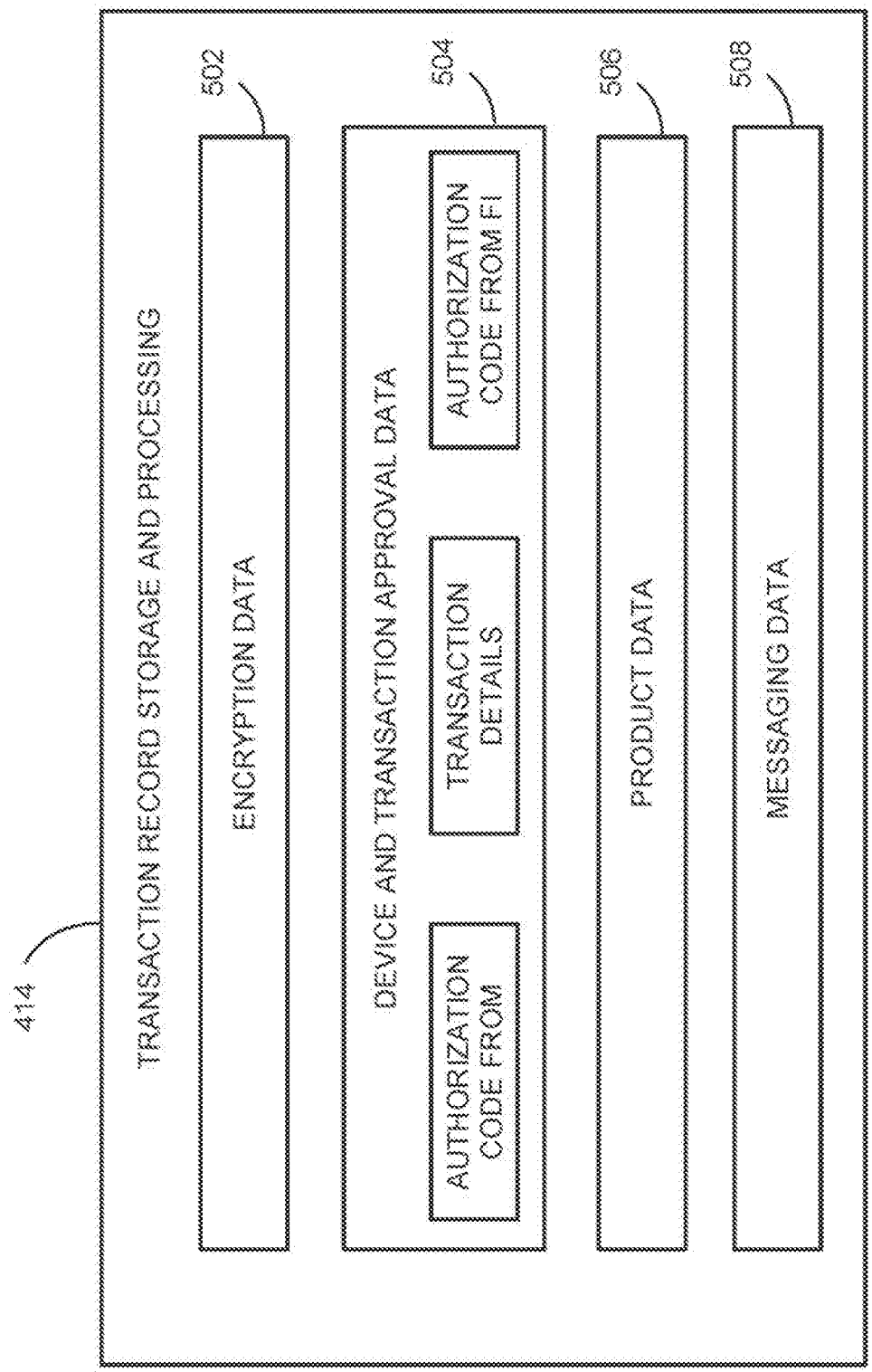
FIG. 5 illustrates an example of a transaction record storage and processing of the biller point of sale device of FIG. 4.

The payment and messaging interface 404 may be coupled to the transaction record storage 414, which may comprise physical memory and/or a data storage structure. Although it is shown as being incorporated into the biller point of sale device 106, it will be readily appreciated that the transaction record storage 414 may be physically separate from the biller point of sale device. As shown in FIG. 5, the transaction record storage 414 may include an encryption data portion 502, a device and transaction approval data portion 504, a product data portion 506, and/or a messaging data portion 508. The payment and messaging interface 404 may store and retrieve data related to processing of messages and other information from the transaction record storage 414. The encryption data portion 502 may include data related to encryption protocols, security keys, etc. for generating and/or processing encrypted messages. The device and transaction approval data 504 may include data related to payment transactions, such as authorization codes from the authorized user financial institution 120, the secure pass-through server 116, and/or authorized user payment interface device 104 associated with the payment transaction and/or other transaction details, such as biller data etc.

The product data portion 506 may include a database and/or list of products and/or services available for purchase from the biller, including information about the products and/or services, such as details, descriptions, costs, etc. The messaging data portion 508 may include data to be used in generating context-relevant messages, such as information regarding which products are related to products being purchased, etc.

Although described separately, it is to be appreciated that functional blocks/modules described with respect to the biller point of sale device 106 need not be separate structural elements.

The modules 402, 404, 406, 408, 410, 412, and 414 may be implemented as software, firmware, hardware, or any combination thereof. For example, the modules 402, 404, 406, 408, 410, 412, and 414 may be a general purpose processor, a digital signal processor (DSP), an application specific integrated circuit (ASIC), a field programmable gate array (FPGA) or other programmable logic device, discrete gate or transistor logic, discrete hardware components, memory, software, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

Figure 6:
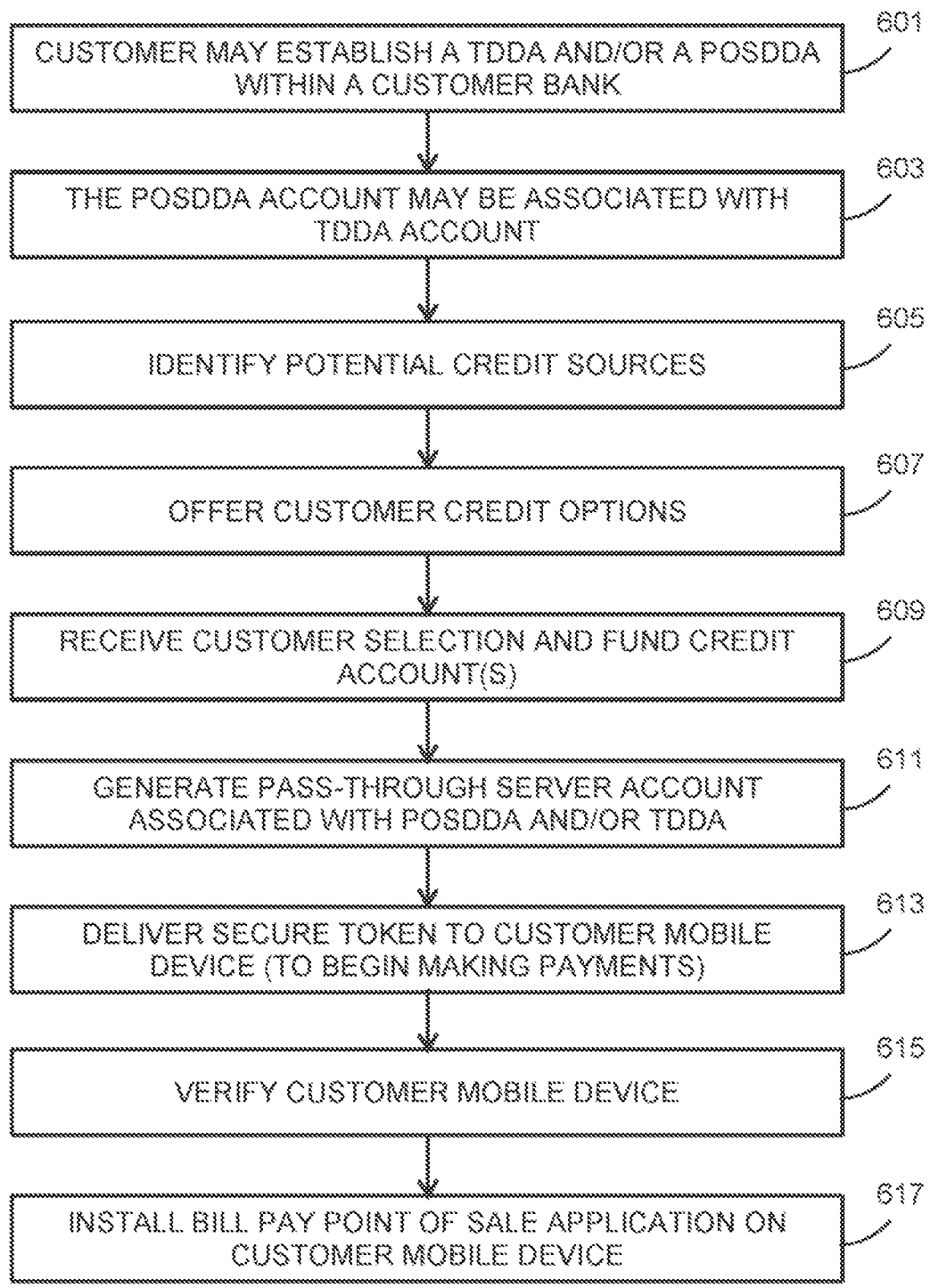
FIG. 6 illustrates an example of a process for establishing accounts and verifications for making secure payments using the system of FIG. 1B.

FIG. 6 illustrates an example of a process for establishing accounts and verifications for making secure payments using the system 100. At block 601, a payer/user (e.g., customer) may establish a POSDDA 206 (point of sale demand deposit account) with Bill-Pay capability with a financial institution (e.g., a bank etc.), such as authorized user financial institution 120 (e.g., a customer bank etc.). For example, the payer/user may utilize the authorized user payment interface device 104 to exchange data with the authorized user financial institution 120 (via the secure pass-through server 116) to setup a POSDDA 206 with Bill-Pay capability.

In addition, at block 601 a payer/user (e.g., a customer etc.) may also establish a TDDA 202 (traditional demand deposit account) with Bill-Pay capability with a financial institution (e.g., a bank etc.), such as authorized user financial institution 120 (e.g., a customer bank etc.). For example, the user may utilize the authorized user payment interface device 104 to exchange data with the authorized user financial institution 120 (via the secure pass-through server 116) to setup a TDDA 202 with Bill-Pay capability.

Further, at block 603, it is to be appreciated that the payer/user (e.g., customer etc.) established POSDDA 206 with Bill-Pay capability may be associated with the payer/user (e.g., customer etc.) established TDDA 202 within the same financial institution (e.g., bank etc.), such as the authorized user financial institution 120 (e.g., customer bank etc.).

In some embodiments, at block 605, potential funding sources are identified (e.g., TDDA and/or conjunctive credit lines etc.) to work in conjunction with the POSDDA 206 to conduct Bill-Pay transactions with billers. For example, the payer may utilize the authorized user payment interface device 104 to input information regarding the creation of potential credit sources and exchange the information with the authorized user financial institution 120 (via the secure pass-through server 116) to allow the authorized user financial institution 120 to create or assist in the creation of and/or provide access to the potential credit sources. Additionally or alternatively, the authorized user financial institution 120 may utilize information (e.g., social security number, account number, etc.) about the payer/user to automatically identify potential credit sources already linked to the payer.

In some embodiments, at block 607, the authorized user financial institution 120 may generate, send, or present credit options (e.g., lines of credit, debit accounts, etc.) to the payer/user (via the secure pass-through server 116) such as via the authorized user payment interface device 104.

Continuing at block 609, the authorized user financial institution 120 may receive (via the secure pass-through server 116) from the payer/user authorized user payment interface device 104, a selection of one or more credit sources, such as the potential credit sources and/or credit options. The authorized user financial institution 120 may utilize the received information from the payer (via the secure pass-through server 116) about the selected one or more credit sources to fund the POSDDA 206 with funds from the selected one or more credit sources.

Continuing, at block 611, the authorized user financial institution 120 may establish a payer/user account (within the secure pass-through server 116) associated with the POSDDA 206. For example, the authorized user financial institution 120 may transmit information to the secure pass-through server 116 associating the payer with the POSDDA 206. As will be described in more detail below in connection with FIG. 7, the secure pass-through server 116 may store this information and utilize it to facilitate payment transactions on behalf of the authorized user (payer), whereby payment to the biller is effectuated as a POSDDA 206 Bill-Pay transaction (or as an "on us" Intra-Bank memo post network payment transaction, as previously or subsequently described within this disclosure).

Further, at block 613, the secure pass-through server 116 may generate a security token (e.g., token, certificate, shared key, etc.) associated with the Bill-Pay account (POSDDA) and send the security token to the authorized user payment interface device 104. The secure pass-through server 116 and authorized user payment interface device 104 may utilize the security token to verify, secure, and/or encrypt data exchanged between the devices and ensure that the devices are valid and the system has not been compromised by a third party.

At block 615, the payer may transmit verification information (e.g., social security number, security token, etc.) to the secure pass-through server 116 using the authorized user payment interface device 104 to verify that the authorized user payment interface device 104 belongs to the payer/user. At block 617, the secure pass-through server 116 may directly or indirectly install a Bill-Pay point of sale payment application on or within the authorized user payment interface device 104 to allow the payer to make secure payments as described herein.

It is to be appreciated that blocks 601, 603, 605, 607, 609, 611, 613, 615, and 617 of FIG. 6 may not occur in the order presented in FIG. 6 of this disclosure. For example, block 615 may be verified before block 601 may be fulfilled.

Figure 7:
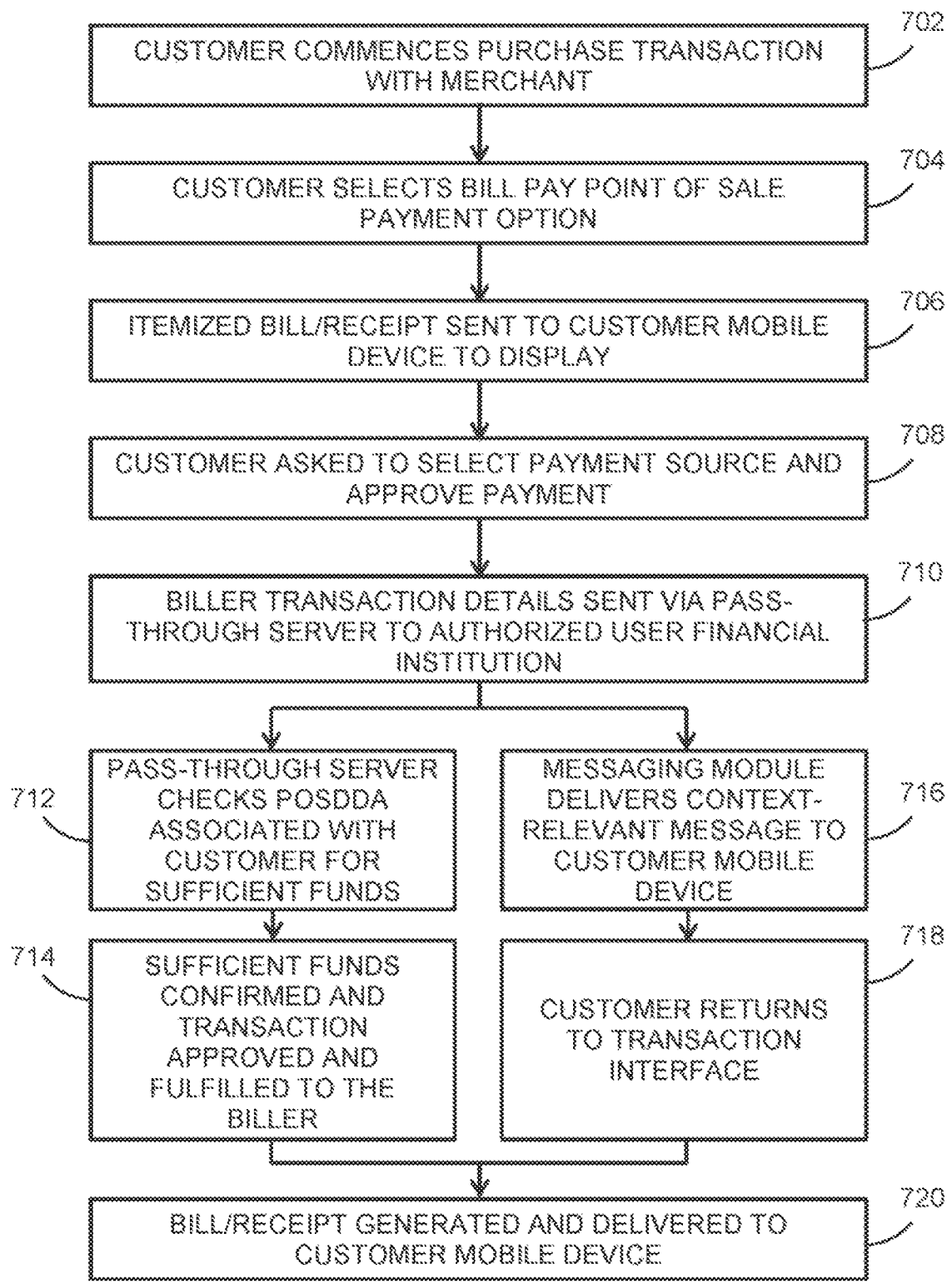
FIG. 7 illustrates an example of a process for completing a purchase transaction using the system of FIG. 1B.

FIG. 7 illustrates an example of a process for completing a payment transaction using the system 100. At block 702, a payer/user (e.g., customer) begins a payment transaction (e.g., a purchase transaction for goods or services) with a biller (e.g., merchant) by selecting an item for purchase. As described above, the payment transaction may be any one of various types of payment transactions, including an Internet sales transaction, a bricks and mortar point of sale transaction (with or without a check-out procedure), a purchase selected from a television advertisement, and/or a person-to-person (P2P) transaction, etc. At block 704, the payer may select an option to use a Bill-Pay point of sale payment application for completing the purchase. Further, at block 706, the payer may receive from the biller point of sale device 106 an itemized list of items and costs (e.g., an invoice or bill of items, etc.) and it may be displayed through the Bill-Pay point of sale payment application residing on or within the authorized user payment interface device 104.

Continuing, at block 708, the payer may be prompted to select a payment source and then approve the payment transaction. The selection of the payment source may be made using the Bill-Pay point of sale payment application on or within the authorized user payment interface device 104. The payment source may be the payer/user POSDDA 206 or any one or more of the payer associated traditional DDA 202, external DDA 205, the conjunctive credit line(s) 204, and/or any other identified funding account source. In some embodiments, the payer may be presented with a menu on their authorized user payment interface device 104, which shows the payer's various available payment funding sources. The displayed available payment funding sources may include each of the payer's accounts at the authorized user financial institution 120 or additional payer accounts at other financial institutions and/or hosting entities. Alternatively, only payment funding sources with sufficient funds for the payment transaction may be displayed for selection.

In some additional implementations, the payer may be permitted to shift money between their various payment sources, or even to select multiple payment sources for the payment (as described previously or subsequently within this disclosure).

Further, at block 710, if the payer (e.g., customer) selects a payment source (or sources) and approves the payment transaction, the authorized user payment interface device 104 transmits biller data transaction details etc. associated with the payment transaction (via the secure pass-through server 116) to the payer authorized user financial institution 120 (e.g., customer bank).

Continuing, at block 712, the secure pass-through server 116 (via interface with the authorized user financial institution 120) checks to confirm whether the payer POSDDA 206 account therein and/or other payer associated selected payment source(s) have sufficient funds to complete the payment transaction. Further, at block 714, the secure pass-through server 116 confirms that sufficient funds are available based on information received from the authorized user financial institution 120 and the payment transaction is fulfilled to the biller via the associated Bill-Pay processor 112 thereof.

At or near the same time that the payer, via the payer authorized user payment interface device 104 checks and confirms, via the secure pass-through server 116, available funds the authorized user financial institution 120, and/or the messaging module 108, at block 716, may deliver context-relevant messages to the payer via the authorized user payment interface device 104 for display to the payer/user. These context-relevant messages may include advertisements such as a banner ad, a video, an audio message, a graphic message, an animation, or even a text message that may be displayed to the payer within the Bill-Pay point of sale payment application residing on the payer authorized user payment interface device 104. Further, after the context-relevant message is displayed to the payer/user, the authorized user payment interface device 104 may, at block 718, return to displaying an interface related to completing the payment transaction. It is to be appreciated that the context-relevant messages may be provided at any time before, during or after the payment transaction process shown in FIG. 7, either automatically, or by the payer manually prompting the message(s). At block 720, (after sufficient funds are confirmed available and the payment transaction is approved and fulfilled to the merchant (biller) via the associated Bill-Pay processor 112 thereof, as described at block 714 above) a bill/receipt for the payment may be generated by the secure pass-through server 116 and sent to the authorized user payment interface device 104 for display. Alternatively, the itemized bill received by the customer (payer), at block 706, may be considered by the associated parties to the transaction as the customer (payer) receipt (bill/receipt) or the bill/receipt may be generated by the biller point of sale device and transmitted to the authorized user payment interface device 104.

Figure 8:
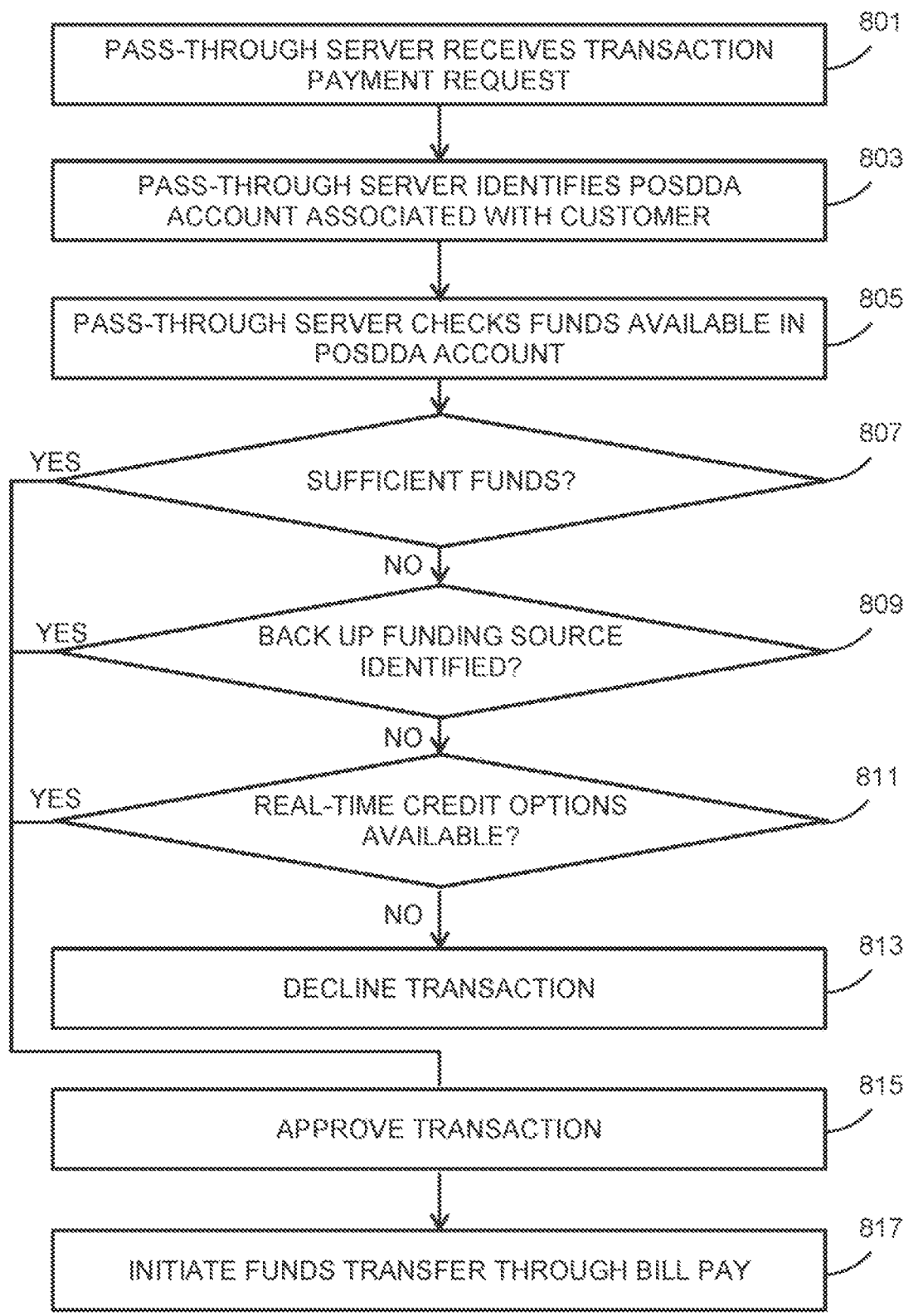
FIG. 8 illustrates an example of a process for approving or declining a transaction using the system of FIG. 1B.

FIG. 8 illustrates an example of a process for approving or declining a payment transaction using the system 100. A payer/user (e.g., customer) may begin a payment transaction (e.g., purchase transaction for products, goods or services) with a biller (e.g., a merchant etc.) by selecting an item for purchase. The biller Bill-Pay point of sale device 106 passes the biller data (e.g., the bill or invoice) into the Bill-Pay point of sale payment application associated with, residing within, or on the payer/user's authorized user payment interface device 104. At block 801, the secure pass-through server 116 receives a transaction payment request, which includes the biller data, directly from the authorized user payment interface device 104. Alternatively, the secure pass-through server 116 may receive biller data directly from the biller point of sale device 106. In either case, the biller data may include a transaction payment request and an authorization code and/or security token associated with a user and/or authorized user payment interface device (AUPID) 104.

Continuing, at block 803, the secure pass-through server 116, based on the received security token from the payer/user authorized user payment interface device 104, identifies the payer/user POSDDA 206 account (within the authorized user financial institution 120) associated with the payer/user (e.g. customer etc.).

Further, at block 805, the secure pass-through server 116 may check (via secure interface with the payer associated authorized user financial institution 120) to see if one or more accounts of the payer (e.g., the POSDDA 206 and/or other associated payment accounts TDDA 202, TDDA 205 and/or credit lines 204*a*, 204*b* or 204*c* or the like) associated with the payer/user POSDDA 206 have sufficient funds to complete the payment transaction. This checking of the accounts may be implemented by sending a message to the authorized user financial institution 120. If at block 807, it is determined there are not sufficient funds in the one or more accounts currently associated with the user, (e.g., the POSDDA 206 and/or other payment accounts TDDA 202, TDDA 205 and/or 204*a*, 204*b* or 204*c* or the like) the process continues to block 809. At block 809, the secure pass-through server 116 may check with the authorized user financial institution 120 to see if any backup funding source with sufficient funds is available for the payment transaction, such as an additional external conjunctive credit lines or the like. If at a block 809 it is determined there are not sufficient funds in a backup funding source or no back up funding source is identified to complete the payment transaction, the process continues to block 811. At the block 811, the secure pass-through server 116 checks with the authorized user financial institution 120 to determine if any credit options can be offered to the user, (such as options for conjunctive credit lines 204*a*, 204*b*, or external conjunctive credit line 204*c* or the like) from the payer authorized user financial institution 120 to provide funds for the payment transaction. If at the block 811 it is determined no credit options can be offered to the user, or the payer/user declines the credit options and the process continues to a block 813 where the payment transaction is declined.

It is to be appreciated that the secure pass-through server 116 may be authorized by the associated payer/user thereof, and/or by the payer/user's associated authorized user financial institution 120 and/or by any other payer/user associated financial institutions or entities that hosts a payer/user associated account (of which the secure pass-through server 116 may have some form of direct or indirect secure communications with) to determine funding availability (or the lack thereof) directly from any such funding sources or accounts. This may be done instead of making such a determination only via communications with or through the authorized user financial institution 120 regarding any such accounts, regardless of whether a payment transaction may be approved or declined.

If at any of blocks 807, 809, or 811 it is determined by the secure pass-through server 116 that there are sufficient funds available to complete the payment transaction from either the payer/user associated POSDDA as a selected payment account and/or from the one or more other selected payment accounts associated with the payer/user (e.g., payment accounts TDDA 202, TDDA 205 and/or 204*a*, 204*b*, 204*c*, or the like), the process continues to the block 815 where the secure pass-through server 116 approves the payment transaction to be fulfilled to the biller with either existing funds selected by the payer/user from within the payer/user POSDDA 206 and/or from funds selected by the payer/user from the one or more other of the associated payer/user payment accounts (e.g., payment accounts TDDA 202, TDDA 205 and/or 204*a*, 204*b*, 204*c*, or the like), or from a plurality of more than one of any such accounts, as directed by the associated payer/user thereof into the associated payer/user POSDDA 206 (as later described herein and illustrated within FIGS. 9, A, B, C, and D of this disclosure).

Further, at block 817 the secure pass-through server 116 may send a message to the authorized user financial institution 120 requesting that the payment be initiated from the associated payer/user POSDDA 206 therein to the biller through the associated Bill-Pay processor 112 interface thereof to fulfill payment into the biller DDA 107 hosted within the biller financial institution 110. Alternatively, the secure pass-through server 116 may send a message directly to the Bill-Pay processor 112 associated with the authorized user financial institution 120 requesting that the payment be fulfilled from the associated payer/user POSDDA 206 therein to the biller through the associated Bill-Pay processor 112 interface thereof to effectuate and fulfill payment into the biller DDA 107 hosted within the biller financial institution 110.

FIGS. 9A-9E represent flow diagrams that provide various examples of how the payer (e.g., customer) POSDDA 206 may be funded, and how good funds may be ensured to the merchant/recipient of the payment (e.g., biller etc.). As described above, there are various ways that funds may be made available to the POSDDA 206 for payment. Various different funding scenarios are shown in FIGS. 9A-9E.

Figure 9A:
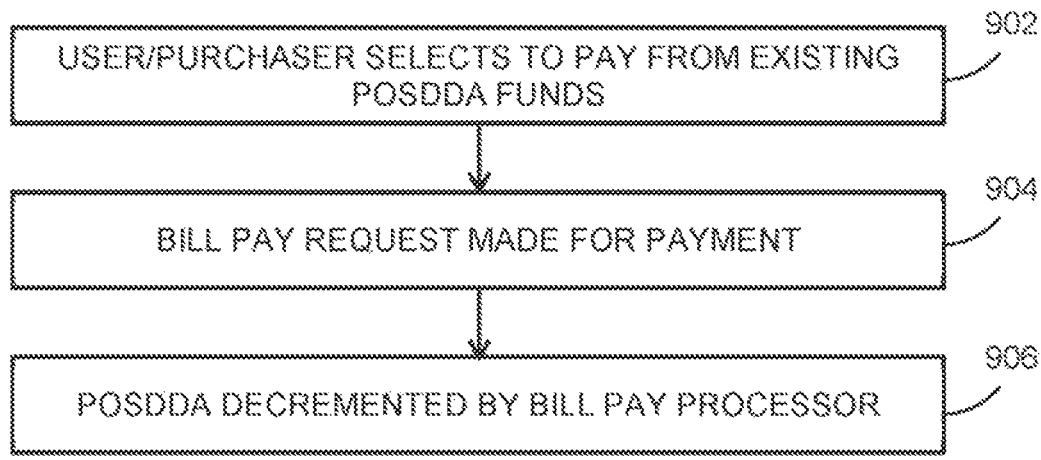
FIGS. 9A-9E illustrate various payment funding scenarios according to one or more embodiments.

Turning first to FIG. 9A, the process is shown by which a payment is funded via existing POSDDA 206 funds (as previously illustrated and/or described in connection with FIG. 2). The process may begin at block 902. There, the user/purchaser (payer) in the context of a purchase transaction, selects to direct payment to a biller from existing POSDDA 206 funds presented among the menu of payment funding source options to the user/payer via the Bill-Pay point of sale payment application associated within or on the payer/user AUPID 104, of which has secure interface with the payer's authorized user financial institution 120 via secure interface with the secure pass-through server 116. As described herein, in some embodiments, this payment option may only be made available to the payer when there are sufficient available funds in the POSDDA 206 account to complete the payment transaction to the biller. It should be noted that, in some embodiments, when the payer is directing payment to a biller from the associated payer/user's POSDDA 206, such payments may only be directed by the associated user/payer thereof and the payer POSDDA 206 may not otherwise be credited and/or debited by or from any other source other than by the authorized user financial institution 120 or by the associated Bill-Pay processor 112 thereof (via ACH or via some other similar type of payment processing technology), (as previously or subsequently described within this disclosure).

Once the payer selection has been made to pay the biller from existing payer POSDDA 206 funds, the process moves to block 904. There, the payer's Bill-Pay request is made upon the POSDDA 206 to fulfill payment to the biller via the associated Bill-Pay processor 112 (or as an "on us" Intra-Bank memo post network payment transaction, as previously or subsequently described within this disclosure), (this request may be granted as it complies with the technological configurations and/or the governing rules that permit or allow for the payer POSDDA 206 to be credited and/or debited, only, in some embodiments, by the associated payer thereof, the authorized user financial institution 120 that hosts the payer POSDDA 206 thereof, and by the associated Bill-Pay processor 112 thereof).

Once the request is made by the payer to direct or fulfill payment to the biller, the process then moves to block 906. There, the Bill-Pay processor 112 may perform a debit of, or receive a credit from, the payer's POSDDA 206 (via ACH or via some other similar type of payment processing technology) for the payment amount that was selected and initiated by the associated payer thereof, in order that the Bill-Pay processor 112 thereof may then fulfill the payment to the associated biller DDA 107 thereof. This may be done within the biller financial institution 110 (unless the payment transaction is performed as an "on us" Intra-Bank memo post network payment transaction, as previously or subsequently described within this disclosure).

It should be noted that, only available funds or "good funds" may be directed from a payer to a biller, therefore, overdraft protection and/or "settlement intelligence" solutions may be extensively employed to guarantee the payment from the payer to the biller will ultimately be honored (as previously or subsequently described within this disclosure). This may be instituted for some or all embodiments of this disclosure.

Figure 9B:
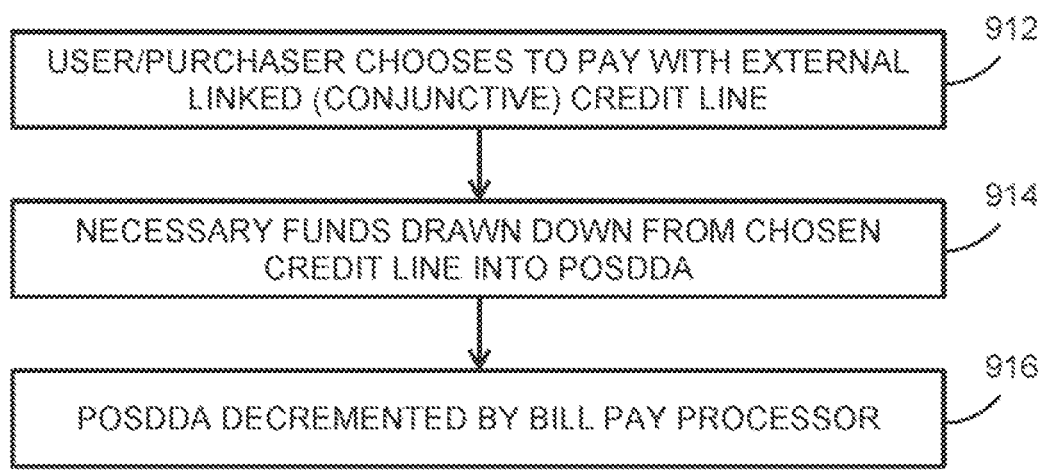

Turning now to FIG. 9B, a flow diagram illustrates a scenario in which a payer/user chooses to pay a bill using externally linked credit lines such as one of the externally linked conjunctive credit line(s) 204c (previously illustrated and/or described in connection with FIG. 2 above). In this instance, the external linked credit line 204c is presented among the menu of options to the customer/user (payer) via the Bill-Pay point of sale payment application associated with the payer/user authorized user payment interface device 104 (AUPID 104) of which has secure interface with the payer's authorized user financial institution 120 via the secure pass-through server 116. It is to be appreciated that if the externally hosted credit line is overextended, it may not be presented as an available option within the Bill-Pay point of sale payment application associated with the payer/user AUPID 104. At block 912, the user/purchaser (payer) may choose to pay with the external, linked conjunctive credit line 204c. Once the user/payer purchaser has made the selection, the process moves to block 914. There, the necessary funds may be debited from (drawn down), or credited from, the selected credit line into the user/payer POSDDA 206. Depending on the specific implementation, the externally linked credit line funds may be automatically debited from (drawn down) into, or credited into, the user/payer POSDDA 206 using some sort of shared ledger network, such as a block chain or similar network, or through some other related or unrelated network that supports the release or movement of funds from the payer/user selected credit line 204c into the payer's POSDDA 206. In some embodiments, the payer conjunctive credit line 204c funds may only be directed by the payer/user into the payer/user's POSDDA 206 and the conjunctive credit lines 204c may be configured in such a way that they cannot be credited and/or debited by any other source than an authorized payer/user thereof (or the financial institution or entity that hosts the credit line 204c account(s), in its normal authorized, permissible overriding management capacity to appropriately manage or perform "on us" Intra-Bank memo post network credit and debit transactions upon any such credit line 204c accounts). Once the funds have reached the payer POSDDA 206, the process moves to block 916. There the Bill-Pay processor 112 may perform a debit of, or receive a credit from, the payer's POSDDA 206. As with the other credits and debits transactions associated with the payer's POSDDA 206, this transaction may be permitted or authorized (this request may be granted as it complies with the technological configurations and/or the governing rules that permit or allow for the payer POSDDA 206 to be credited and/or debited, only by the associated payer thereof, the authorized user financial institution 120 that hosts the payer POSDDA 206 thereof, and/or by the associated Bill-Pay processor 112 thereof) because it may be a credit or debit transaction initiated (via ACH or via some other similar type of payment processing technology) by a Bill-Pay processor 112. The payment thereof may then be fulfilled (via the Bill-Pay processor 112) to the biller DDA 107 hosted within the associated biller's financial institution 110 (as previously or subsequently described within the present disclosure).

Figure 9C:
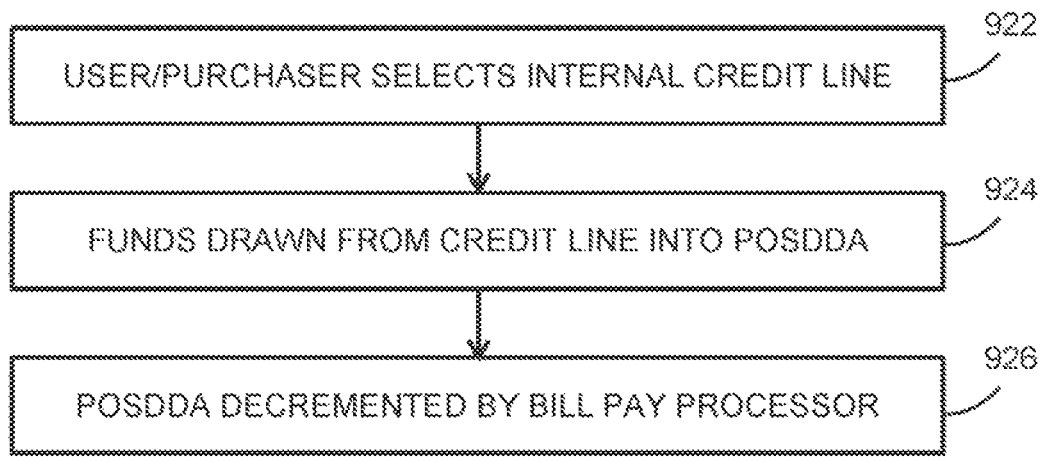

FIG. 9C provides an illustration of the process, in some embodiments, that takes place when the user/purchaser (payer) may select an internal conjunctive credit line to direct payment to a biller, such as the conjunctive credit line 204a and/or 204b (previously illustrated and/or described in connection with FIG. 2 above). In this payment scenario, the payer/user may select an internally hosted credit line 204a and/or 204b from the various payment funding options presented to the customer/user (payer) within the Bill-Pay point of sale payment application associated with the payer/user AUPID 104, of which has secure interface with the payer's authorized user financial institution 120 via secure interface with the secure pass-through server 116. The process begins at block 922, where the user/purchaser may select the internal conjunctive credit line 204a and/or 204b from among the options presented. It is to be appreciated, that if an internally hosted credit line 204a and/or 204b are overextended, or do not have sufficient funding available to fulfill the payment. One and/or the other may not be presented as available funding source option(s) within the Bill-Pay point of sale payment application associated with the payer/user AUPID 104. Furthermore, the payer associated credit lines 204a and/or 204b are dedicated credit lines that, in some embodiments, cannot be credited and/or debited by or from any source other than the associated payer/user thereof (or by the financial institution or entity that hosts the credit line 204a and 204b accounts, in its normal authorized, permissible overriding management capacity to appropriately manage or perform "on us" Intra-Bank memo post network credit and debit transactions upon any credit lines 204a and/or 204b accounts that it hosts). Therefore, the payer may select to direct payment to a biller from the payer's associated credit line(s) 204a and/or 204b. The process continues at block 924, where funds are debited from (drawn down), or credited from, the payer conjunctive credit line(s) 204a and/or 204b, into the payer/user's POSDDA 206. In some implementations, the POSDDA 206 host bank may draft the funds from the credit line(s) as an automatic function within the bank itself as an "on us" Intra-Bank memo post network debit transaction. Additionally, a modified overdraft technology tool may be utilized in connection with internal credit lines 204 in funding the POSDDA 206. Once the funds are debited from (drawn down), or credited from, the credit line 204a and/or 204b into the POSDDA 206, the process moves then to block 926. There, the POSDDA 206 may send a credit to, or be debited (via ACH or some other similar type of payment processing technology) by the Bill-Pay processor 112 thereof (this request may be granted as it complies with the technological configurations and/or the governing rules that permit or allow for the payer POSDDA 206 to be credited and/or debited, only by the associated payer thereof, the authorized user financial institution 120 that hosts the payer POSDDA 206 thereof, and/or by the associated Bill-Pay processor 112 thereof) and the payment thereof may then be fulfilled to the biller via the Bill-Pay processor 112 (unless the payment transaction is performed as an "on us" Intra-Bank memo post network payment transaction, as previously or subsequently described within this disclosure) into the biller DDA 107 hosted within the biller financial institution 110.

Figure 9D:
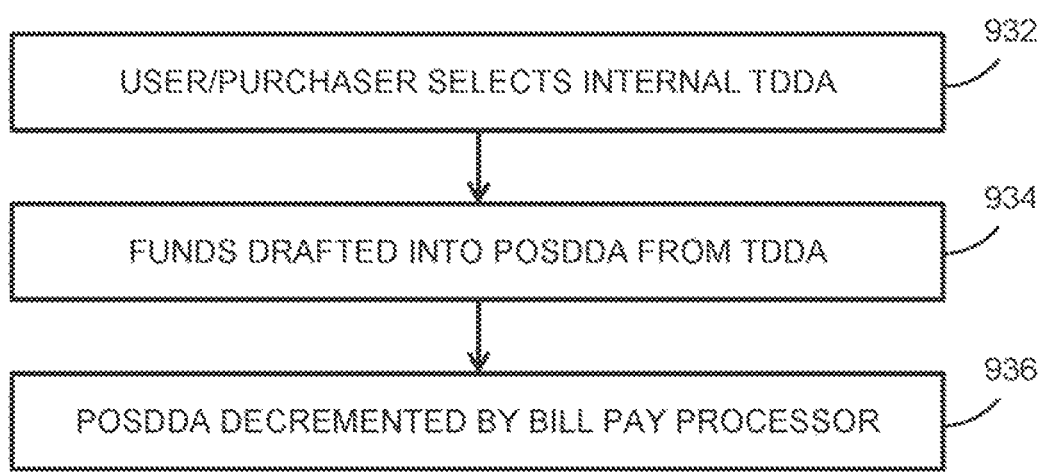

In some payment situations, the user/purchaser (payer) may wish to make payment to a biller with funds debited from (drawn down), or credited from, the payer's internal traditional demand deposit account 202 (TDDA 202) held at the same financial institution as their POSDDA 206 (the authorized user financial institution 120). FIG. 9D provides one illustration of this process. The process begins at block 932, where the user/purchaser may select their TDDA 202 (previously illustrated and/or described in connection with FIG. 2 above) from among a menu of payment options presented within the Bill-Pay point of sale payment application associated with the payer/user AUPID 104 of which has secure interface with the payer's authorized user financial institution 120 via the secure pass-through server 116. There, the user/purchaser selects their internal traditional demand deposit account 202 (TDDA 202) as the source for payment in a payment transaction. It is to be appreciated, that if the payer's TDDA 202, may not be able to provide enough funding for the payment transaction, it may not be presented as an available option within the Bill-Pay point of sale payment application associated with the payer/user AUPID 104, and the payer thereof may select another available payment source or option therein. If the TDDA 202 is selected, the process then moves to block 934 where the funds are debited from (drafted), or credited from, the payer's TDDA 202 into the payer's POSDDA 206. Once the payer selects payment from their TDDA 202, the movement of the funds from the TDDA 202 into the POSDDA 206 may be an automatic function performed within the (the authorized user financial institution 120) host bank as an "on us" Intra-Bank memo post network debit or credit transaction. The authorized user financial institution 120 thereof may provide overdraft protection to the user/purchaser (payer) TDDA 202, ensuring funds availability for the payment to be honored to the merchant (biller). Once the funds have been debited into, or credited into, the POSDDA 206, the process moves to block 936. There, the POSDDA 206 may send a credit to, or be debited (via ACH or some other similar type of payment processing technology) by the associated Bill-Pay processor 112. This request may be granted as it complies with the technological configurations and/or the governing rules that permit or allow for the payer POSDDA 206 to be credited and/or debited, only by the associated payer thereof, the authorized user financial institution 120 that hosts the payer POSDDA 206 thereof, and/or by the associated Bill-Pay processor 112 thereof) and the payment may then be fulfilled, via the Bill-Pay processor 112 (unless the payment transaction is performed as an "on us" Intra-Bank memo post network payment transaction, as previously or subsequently described within this disclosure) into the biller DDA 107 hosted within the biller financial institution 110.

Figure 9E:
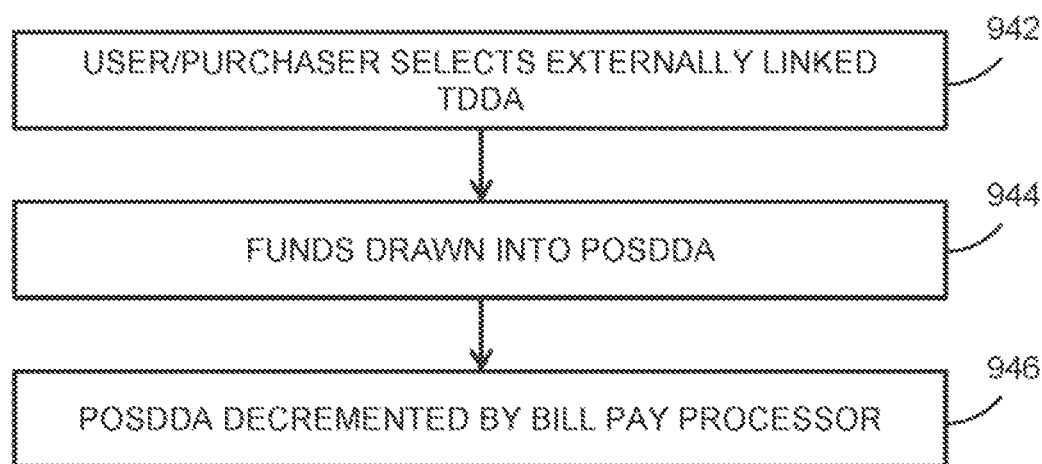

Turning now to FIG. 9E, one example of a payment scenario utilizing an externally linked traditional demand deposit account TDDA 205 is provided. In this scenario, the user/purchaser has selected an externally linked demand deposit account TDDA 205 as a source of funding to pay a biller. The process begins at block 942 where the user/purchaser selects the externally linked TDDA 205 from among a menu of payment options presented within the Bill-Pay point of sale payment application associated with the payer/user AUPID 104 of which has secure interface with the payer's authorized user financial institution 120 via the secure pass-through server 116. It is to be appreciated that if the payer's TDDA 205 may not be able to provide enough funding for the payment transaction, it may not be presented as an available option within the Bill-Pay point of sale payment application associated with the payer/user AUPID 104, and the payer thereof may select another available payment source or option. If the payer's TDDA 205 is presented to the payer as an option that may be used for payment to the biller, then the process moves to block 944 where the payment funds may be debited from (drawn down), or credited from, the externally linked TDDA 205 into the POSDDA 206. The externally linked TDDA 205 funds may be automatically debited (drawn down) into the POSDDA 206 through the ACH network, or through a type of shared ledger network like a block chain or similar network, or through some other related or unrelated network that supports the release of funds from the user chosen externally hosted TDDA 205 into the user POSDDA 206. Once the funds have been debited into, or credited into, the payer POSDDA 206, the process then moves to block 946. There, the POSDDA 206 may send a credit to, or be debited (via ACH or some other similar type of payment processing technology) by the Bill-Pay processor 112 (this request may be granted as it complies with the technological configurations and/or the governing rules that permit or allow for the payer POSDDA 206 to be credited and/or debited, only by the associated payer thereof, the authorized user financial institution 120 that hosts the payer POSDDA 206 thereof, and/or by the associated Bill-Pay processor 112 thereof) and the payment may then be fulfilled to the biller. This may be done via the associated Bill-Pay processor 112 thereof, into the biller DDA 107 hosted within the biller financial institution 110.

Figure 10:
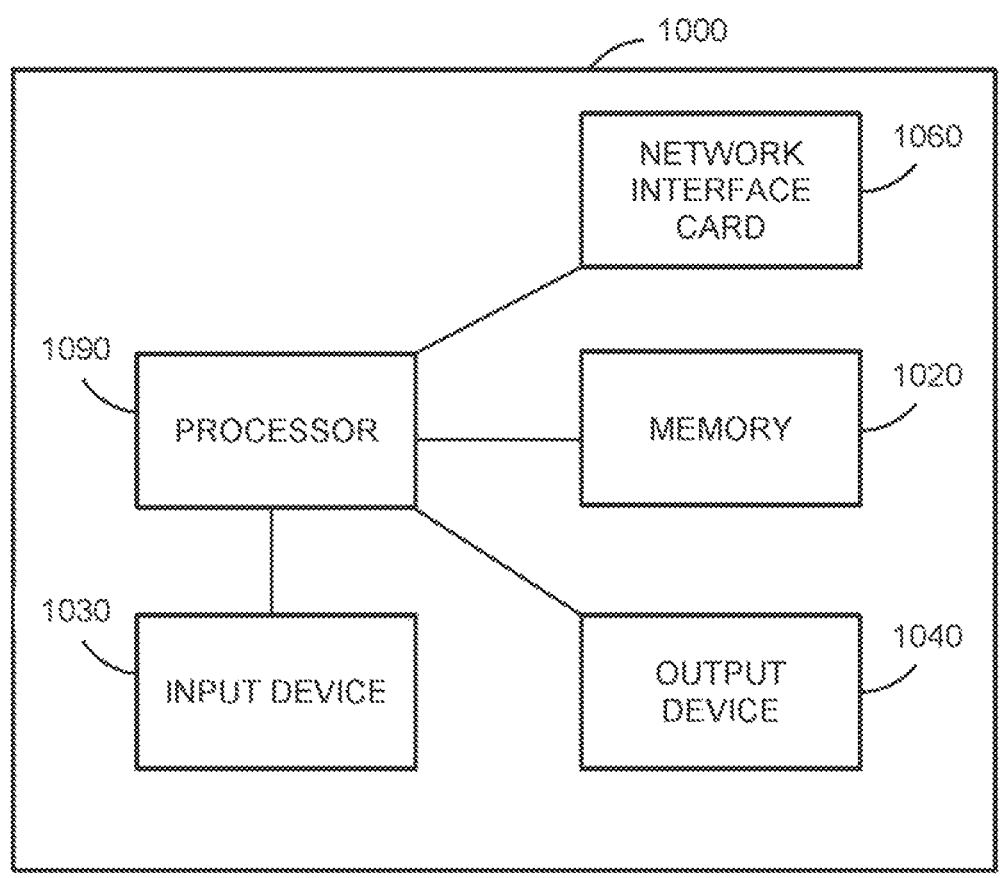
FIG. 10 illustrates an example of a block diagram of a computing device.

FIG. 10 illustrates a functional block diagram of one example of a computing device 900, such as any of the authorized user financial institution 120, the Bill-Pay processor 112, the biller financial institution 110, the secure pass-through server 116, the authorized user payment interface device 104, and/or the biller point of sale device 106, according to some embodiments. The computing device 1000 includes a processor 1090 in data communication with a memory 1020, an input device 1030, and an output device 1040. The processor is further in data communication with a network interface device 1060. In some embodiments, the network interface device 1060 comprises a transceiver configured for wireless communication. In other embodiments, the network interface device 1060 comprises a wired network interface. Although described separately, it is to be appreciated that functional blocks described with respect to the computing device 1000 need not be separate structural elements. For example, the processor 1090 and memory 1020 may be embodied in a single chip.

The processor 1090 may be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 1090 may be coupled, via one or more buses, to read information from or write information to memory 1020. The processor may additionally, or in the alternative, contain memory, such as processor registers. The memory 1020 may include processor cache, including a multi-level hierarchical cache in which different levels have different capacities and access speeds. The memory 1020 may also include random access memory (RAM), other volatile storage devices, or non-volatile storage devices. The storage can include built-in or removable flash memory, or other appropriate storage mediums.

The processor 1090 also may be coupled to an input device 1030 and an output device 1040 for, respectively, receiving input from and providing output to a user of the computing device 1000. Suitable input devices include, but are not limited to, a keyboard, buttons, keys, switches, a digitizer for stylus input, a touch screen (e.g., capacitive or resistive), an infrared detector, a camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays, audio output devices, including speakers, headphones, earphones, and alarms, and haptic output devices.

The processor 1090 further may be coupled to a network interface device 1060. The network interface device 1060 prepares data generated by the processor 1090 for transmission via a network according to one or more data transmission protocols. The network interface device 1060 also decodes data received via a network according to one or more data transmission protocols. The network interface device 1060 may include a transmitter, receiver, or both. In other embodiments, the transmitter and receiver may be two separate components. The network interface device 1060, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Such embodiments and further embodiments of the systems and methods described herein may advantageously improve the functioning of financial systems and computing devices by increasing the security for conducting electronic based payments. For example, previous financial systems and computing devices may be restricted to only being able to complete financial payment transactions through the exchange of sensitive information between customer devices and biller devices in order to maintain a particular level of ease of use for a customer. However, the systems and methods described herein may allow financial systems and computing devices to function without the transfer of such sensitive information while still maintaining a particular level of ease of use for a customer.

It should be noted that where reference is made herein to a device sending/transmitting to or receiving data or the like from another device, even if not explicitly stated, the other device, respectively, inherently receives from or sends/transmits the data or the like to the device. Further, and sending/transmitting or receiving may be performed over one or more networks, such as the Internet, and may be secured, such as using a virtual private network (VPN), encryption, and/or some other security protocols.

Various embodiments disclosed herein provide for electronically sending payment to a biller without transmitting certain sensitive information to the biller. A skilled artisan will readily appreciate that these embodiments may be implemented using numerous different types of computing devices, including both general purpose and/or special purpose computing systems, environments, or configurations. Examples of well-known computing systems, environments, and/or configurations that may be suitable for use in connection with the embodiments set forth above may include, but are not limited to, personal computers, server computers, hand-held or laptop devices, smartphones, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, may cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The present techniques will be better understood with reference to the following enumerated embodiments:

1. A system for improving security of computing devices used for financial payment transactions, the system comprising: a memory; and a processor communicatively coupled with the memory, the processor being configured to: receive, via a computing device associated with a payer, biller data associated with a biller for a payment transaction between the payer and the biller; determine availability of funds in one or more accounts associated with the payer for completing the payment transaction to the biller based on the received biller data; receive a selection of one or more of the payer accounts having sufficient available funds to use for payment; provide to the payer, via the computing device associated with the payer, an indication of the payer accounts having sufficient available funds to use for payment to the biller based on the received biller data; provide to the biller, via a computing device associated with the biller, and/or via a computing device associated with the payer, an indication of the payer accounts having sufficient available funds to use in fulfilling payment to the biller; and receive from the payer, via the computing device associated with the payer, a command to initiate a payment to the biller from a selection of one or more of the payer accounts having sufficient available funds to use for payment to the biller.

2. The system of embodiment 1, wherein receiving biller data, determining availability of funds, receiving a selection of one or more of the payer accounts, providing an indication of the payer accounts having sufficient available funds to use for payment to the biller based on the received biller data, providing an indication of the payer accounts having sufficient available funds to use in fulfilling payment to the biller, and receiving a command are performed outside a traditional financial institution or partially within a traditional financial institution and partially external to a traditional financial institution, and wherein the payer accounts and biller accounts reside outside a traditional financial institution or partially within a traditional financial institution and partially external to a traditional financial institution.

3. The system of embodiment 1, wherein only the payer directs a debit into the payer POSDDA, of a given amount, from at least one payer credit line, wherein the debit is only fulfilled into the payer POSDDA as a result of the payer directing a corresponding credit, of at least the same given amount, initiated by only the payer, from at least one payer credit line, into the payer POSDDA to fulfill the corresponding payer directed debit.

4. The system of embodiment 1, wherein only the payer directs a credit into the payer POSDDA, of a given amount, from at least one payer credit line, wherein the credit is only fulfilled into the payer POSDDA as a result of the payer directing a corresponding debit, of at least the same given amount, initiated by only the payer, of at least one payer credit line, into the payer POSDDA to fulfill the corresponding payer directed credit.

5. The system of embodiment 1, wherein the processor is further configured to facilitate a transfer of at least a portion of the funds from the one or more payer selected accounts into a payer modified demand deposit account (POSDDA) of the payer to then further complete the payment transaction to a biller (financial account) DDA via a Bill-Pay Processor or a bill-pay solution internal of, or external of, the payer authorized user financial institution without the biller or the computing device of the biller receiving sensitive or private information regarding the payer or the one or more accounts of the payer.

6. The system of embodiment 1, wherein the processor is further configured to receive identification information of the payer comprising at least one of a security token or an authorization code.

7. The system of embodiment 1, wherein the biller data comprises at least a cost of the goods, products, or services associated with the payment transaction and an identifier of the payment transaction.

8. The system of embodiment 1, wherein the processor is further configured to provide to at least the payer, via the payer computing device, and to at least the biller, via the biller computing device and/or via the payer computing device, an indication of the availability of funds for the payment transaction.

9. The system of embodiment 1, wherein the processor is further configured to provide, via a secure pass-through server, to at least the payer, via the payer computing device, and to at least the biller, via the biller computing device and/or via the payer computing device, an indication of the availability of funds for the payment transaction.

10. The system of embodiment 1, wherein the processor is further configured to provide, via a management server, to at least the payer, via the payer computing device, and to at least the biller, via the biller computing device and/or via the payer computing device, an indication of the availability of funds for the payment transaction.

11. The system of embodiment 1, wherein the processor is further configured to provide, via a proxy server, to at least the payer, via the payer computing device, and to at least the biller, via the biller computing device and/or via the payer computing device, an indication of the availability of funds for the payment transaction.

12. The system of embodiment 1, wherein the one or more accounts associated with the payer include a payer modified demand deposit account (POSDDA) that receives payer initiated credits only from other payer accounts and performs payer initiated debits only of other payer accounts and, wherein the POSDDA is configured such that it is not debited or credited by a biller or any source other than only the associated payer and only the financial institution or hosting entity that hosts the account and only by an associated Bill-Pay processor thereof and, wherein only the payer initiates one or more payments to one or more billers to be fulfilled from the payer POSDDA via a Bill-Pay processor, internal of, or external of, the financial institution or hosting entity that hosts the payer POSDDA.

13. The system of embodiment 1, wherein the payer modified demand deposit account (POSDDA) is configured to allocate all or at least a portion of the funds in the payer modified demand deposit account (POSDDA) to the payment transaction, between the payer and the biller, before or after the information indicating the availability of funds is sent to one or more parties associated with the payment transaction.

14. The system of embodiment 1, wherein the transfer of at least a portion of the funds from the payer POSDDA to the biller (financial account) DDA is performed via a bill payment processor or bill pay solution internal to, or external of, the payer authorized user financial institution or hosting entity thereof.

15. The system of embodiment 1, wherein the processor is further configured to send information to at least the computing device associated with the payer, and to at least the computing device associated with the biller, that all of the funds or at least a portion of the funds have been transferred from the one or more payer selected accounts to an account associated with the biller.

16. The system of embodiment 1, wherein the one or more accounts associated with the payer comprise a payer modified demand deposit account (POSDDA) configured to only receive payer directed electronic "on us" intra-bank network and external payment network funding credits from at least one of the one or more traditional demand deposit accounts of the payer and only receive payer directed electronic "on us" intra-bank network and external payment network funding credits from at least one of the one or more conjunctive credit lines of the payer and wherein the POSDDA is configured such that it is not debited or credited by a biller or any source other than only the associated payer and only the financial institution or hosting entity that hosts the account and only by an associated Bill-Pay processor or bill pay solution internal to, or external of, the payer authorized user financial institution or hosting entity thereof.

17. The system of embodiment 1, wherein the one or more accounts associated with the payer comprise a payer modified demand deposit account (POSDDA) configured to only perform payer directed electronic "on us" intra-bank network and external payment network funding debits of at least one of the one or more traditional demand deposit accounts of the payer and only perform payer directed electronic "on us" intra-bank network and external payment network funding debits of at least one of the one or more conjunctive credit lines of the payer and wherein the POSDDA is configured such that it is not debited or credited by a biller or any source other than only the associated payer and only the financial institution or hosting entity that hosts the account and only by a Bill-Pay processor or bill pay solution internal to, or external of, the payer authorized user financial institution or hosting entity thereof.

18. The system of embodiment 1, wherein the one or more accounts associated with the payer comprise a payer modified demand deposit account (POSDDA) and one or more traditional demand deposit accounts of the payer, and one or more conjunctive credit lines of the payer, and wherein the one or more conjunctive credit lines of the payer are configured such that only the payer directs electronic "on us" intra-bank network and external payment network funding credits from any one of the one or more conjunctive credit lines of the payer, and only into the payer modified demand deposit account (POSDDA), and the one or more conjunctive credit lines of the payer are configured such that the accounts are not debited or credited by a biller or any source other than only the associated payer and only the financial institution or hosting entity that hosts the accounts.

19. The system of embodiment 1, wherein the one or more accounts associated with the payer comprise a payer modified demand deposit account (POSDDA) and one or more traditional demand deposit accounts of the payer, and one or more conjunctive credit lines of the payer, and wherein the one or more conjunctive credit lines of the payer are configured such that only the payer directs electronic "on us" intra-bank network and external payment network funding debits of any one of the one or more conjunctive credit lines of the payer, and only from and into the payer modified demand deposit account (POSDDA), and the one or more conjunctive credit lines of the payer are configured such that the accounts are not debited or credited by a biller or any source other than only the associated payer and only the financial institution or hosting entity that hosts the accounts.

20. The system of embodiment 1, wherein the one or more accounts associated with the payer comprise a payer modified demand deposit account (POSDDA) and one or more traditional demand deposit accounts of the payer, and one or more conjunctive credit lines of the payer, and wherein the payer modified demand deposit account (POSDDA) is hosted within one payer associated financial institution, and wherein the one or more traditional demand deposit accounts of the payer, and the one or more conjunctive credit lines of the payer are hosted within the same financial institution that hosts the payer modified demand deposit account (POSDDA) and are also hosted within other financial institutions of the payer, and wherein the payer modified demand deposit account (POSDDA) is configured to only receive payer directed electronic "on us" intra-bank network and external payment network credits from, and only perform payer directed electronic "on us" intra-bank network and external payment network funding debits of, at least one of the one or more internal or external traditional demand deposit accounts of the payer and is configured to only receive payer directed electronic "on us" intra-bank network and external payment network credits from, and only perform payer directed electronic "on us" intra-bank network and external payment network funding debits of, at least one of the one or more internal or external conjunctive credit lines of the payer and wherein the payer POSDDA is configured such that it is not debited or credited by a biller or any source other than only the associated payer and only the financial institution or hosting entity that hosts the account and only by an associated Bill-Pay processor internal to, or external of, the payer authorized user financial institution or hosting entity thereof.

21. The system of embodiment 1, wherein the one or more accounts associated with the payer comprise a payer modified demand deposit account (POSDDA) and one or more traditional demand deposit accounts of the payer, and one or more conjunctive credit lines of the payer, and wherein the payer modified demand deposit account (POSDDA) is hosted within one payer associated financial institution, and wherein the one or more traditional demand deposit accounts of the payer, and the one or more conjunctive credit lines of the payer are hosted within the same financial institution that hosts the payer modified demand deposit account (POSDDA) and are also hosted within other financial institutions of the payer, and wherein the payer modified demand deposit account (POSDDA) is configured to only receive payer directed electronic "on us" intra-bank network and external payment network credits from, and only perform payer directed electronic "on us" intra-bank network and external payment network funding debits of, at least one of the one or more internal or external traditional demand deposit accounts of the payer and is configured to only receive payer directed electronic "on us" intra-bank network and external payment network credits from, and only perform payer directed electronic "on us" intra-bank network and external payment network funding debits of, at least one of the one or more internal or external conjunctive credit lines of the payer and wherein the payer POSDDA is configured such that it is not debited or credited by a biller or any source other than only the associated payer and only the financial institution or hosting entity that hosts the account and only by an associated Bill-Pay processor, internal to, or external of, the payer authorized user financial institution or hosting entity thereof.

22. The system of embodiment 1, wherein the one or more accounts associated with the payer comprise a payer modified demand deposit account (POSDDA) and one or more traditional demand deposit accounts of the payer, and one or more conjunctive credit lines of the payer, all hosted within one payer associated financial institution that has one or more branch locations, that have one or more electronic "on us" intra-bank network, and wherein the payer modified demand deposit account (POSDDA) is configured to only receive payer directed electronic "on us" intra-bank network credits from, and only perform payer directed electronic "on us" intra-bank funding debits of at least one of the one or more internal traditional demand deposit accounts of the payer and only receive payer directed electronic "on us" intra-bank network funding credits from, and only perform payer directed electronic "on us" intra-bank funding debits of, at least one of the one or more internal conjunctive credit lines of the payer and wherein the payer POSDDA is configured such that it will not be debited or credited by a biller or any source other than only the associated payer and only the financial institution or hosting entity that hosts the account and only by a Bill-Pay processor or bill pay solution internal to, or external of, the payer authorized user financial institution or hosting entity thereof.

23. The system of embodiment 1, wherein a payer and biller each have the same types of accounts as each other, and perform the same functions of each other as a payer is configured to also be a biller and a biller is configured to also be a payer.

24. The system of embodiment 1, wherein a payer authorized user financial institution and a biller financial institution are one in the same and each provides or supports the same accounts and functions as the other.

25. The system of embodiment 1, wherein as few as one, or as many as all, of the payer credit lines, and as few as one, or as many as all, other financial accounts of the payer, are enabled with the same duplicative functionality and capacity as the payer POSDDA.

26. The system of embodiment 1, wherein the one or more accounts associated with the payer include a payer POSDDA that receives credits, wherein the payer POSDDA may not be decremented by a biller or any source other than a Bill-Pay processor, internal to, or external of, the financial institution or hosting entity that hosts the payer POSDDA, and wherein only the payer may initiate one or more payments to one or more billers from the payer POSDDA to be fulfilled via a Bill-Pay processor, internal to, or external of, the financial institution or hosting entity that hosts the payer POSDDA and wherein the one or more accounts associated with one or both of the payer or a POSDDA associated with the payer include one or both of an internal or an external payer credit line account associated with the payer and configured in such a way that only the payer may initiate decrements out of any such accounts and the accounts may not be decremented by or from a biller or any source other than a financial institution or hosting entity that hosts the internal and/or external credit line accounts associated with the payer, the payment transaction solution being a certified sealed system that provides a guarantee of funds from the payer to the biller.

27. The system of embodiment 1, wherein for any type of account a financial institution hosts, the financial institution has management oversight of the account and may freeze, levee fees and penalties against an account and/or take control of the account.

28. The system of embodiment 1, wherein a Bill-Pay processor or Bill-Pay solution, internal to, or external of, the financial institution, is configured to perform a debit of, or receive a credit from, a POSDDA.

29. The system of embodiment 1, wherein a host financial institution is configured to create and host one or more payer accounts and/or one or more biller accounts on behalf of another financial institution's payers and billers.

30. A method for improving security of computing devices used for financial payment transactions, the method being performed by one or more hardware processors configured by machine-readable instructions, the method comprising: receiving, via a computing device associated with a payer, biller data associated with a biller for a payment transaction between the payer and the biller; determining availability of funds in one or more accounts associated with the payer for completing the payment transaction to the biller based on the received biller data; receiving a selection of one or more of the payer accounts having sufficient available funds to use for payment; providing to the payer, via the computing device associated with the payer, an indication of the payer accounts having sufficient available funds to use for payment to the biller based on the received biller data; providing to the biller, via a computing device associated with the biller, and/or via a computing device associated with the payer, an indication of the payer accounts having sufficient available funds to use in fulfilling payment to the biller; and receiving from the payer, via the computing device associated with the payer, a command to initiate a payment to the biller from a selection of one or more of the payer accounts having sufficient available funds to use for payment to the biller.

31. The method of embodiment 30, wherein receiving biller data, determining availability of funds, receiving a selection of one or more of the payer accounts, providing an indication of the payer accounts having sufficient available funds to use for payment to the biller based on the received biller data, providing an indication of the payer accounts having sufficient available funds to use in fulfilling payment to the biller, and receiving a command are performed outside a traditional financial institution or partially within a traditional financial institution and partially external to a traditional financial institution, and wherein the payer accounts and biller accounts reside outside a traditional financial institution or partially within a traditional financial institution and partially external to a traditional financial institution.

32. The method of embodiment 30, wherein only the payer directs a debit into the payer POSDDA, of a given amount, from at least one payer credit line, wherein the debit is only fulfilled into the payer POSDDA as a result of the payer directing a corresponding credit, of at least the same given amount, initiated by only the payer, from at least one payer credit line, into the payer POSDDA to fulfill the corresponding payer directed debit.

33. The method of embodiment 30, wherein only the payer directs a credit into the payer POSDDA, of a given amount, from at least one payer credit line, wherein the credit is only fulfilled into the payer POSDDA as a result of the payer directing a corresponding debit, of at least the same given amount, initiated by only the payer, of at least one payer credit line, into the payer POSDDA to fulfill the corresponding payer directed credit.

34. The method of embodiment 30, wherein the one or more hardware processors are further configured to facilitate a transfer of at least a portion of the funds from the one or more payer selected accounts into a payer modified demand deposit account (POSDDA) of the payer to then further complete the payment transaction to a biller (financial account) DDA via a Bill-Pay Processor or a bill-pay solution internal of, or external of, the payer authorized user financial institution without the biller or the computing device of the biller receiving sensitive or private information regarding the payer or the one or more accounts of the payer.

35. The method of embodiment 30, wherein the one or more hardware processors are further configured to receive identification information of the payer comprising at least one of a security token or an authorization code.

36. The method of embodiment 30, wherein the biller data comprises at least a cost of the goods, products, or services associated with the payment transaction and an identifier of the payment transaction.

37. The method of embodiment 30, wherein the one or more hardware processors are further configured to provide to at least the payer, via the payer computing device, and to at least the biller, via the biller computing device and/or via the payer computing device, an indication of the availability of funds for the payment transaction.

38. The method of embodiment 30, wherein the one or more hardware processors are further configured to provide, via a secure pass-through server, to at least the payer, via the payer computing device, and to at least the biller, via the biller computing device and/or via the payer computing device, an indication of the availability of funds for the payment transaction.

39. The method of embodiment 30, wherein the one or more hardware processors are further configured to provide, via a management server, to at least the payer, via the payer computing device, and to at least the biller, via the biller computing device and/or via the payer computing device, an indication of the availability of funds for the payment transaction.

40. The method of embodiment 30, wherein the one or more hardware processors are further configured to provide, via a proxy server, to at least the payer, via the payer computing device, and to at least the biller, via the biller computing device and/or via the payer computing device, an indication of the availability of funds for the payment transaction.

41. The method of embodiment 30, wherein the one or more accounts associated with the payer include a payer modified demand deposit account (POSDDA) that receives payer initiated credits only from other payer accounts and performs payer initiated debits only of other payer accounts and, wherein the POSDDA is configured such that it is not debited or credited by a biller or any source other than only the associated payer and only the financial institution or hosting entity that hosts the account and only by an associated Bill-Pay processor thereof and, wherein only the payer initiates one or more payments to one or more billers to be fulfilled from the payer POSDDA via a Bill-Pay processor, internal of, or external of, the financial institution or hosting entity that hosts the payer POSDDA.

42. The method of embodiment 30, wherein the payer modified demand deposit account (POSDDA) is configured to allocate all or at least a portion of the funds in the payer modified demand deposit account (POSDDA) to the payment transaction, between the payer and the biller, before or after the information indicating the availability of funds is sent to one or more parties associated with the payment transaction.

43. The method of embodiment 30, wherein the transfer of at least a portion of the funds from the payer POSDDA to the biller (financial account) DDA is performed via a bill payment processor or bill pay solution internal to, or external of, the payer authorized user financial institution or hosting entity thereof.

44. The method of embodiment 30, wherein the one or more hardware processors are further configured to send information to at least the computing device associated with the payer, and to at least the computing device associated with the biller, that all of the funds or at least a portion of the funds have been transferred from the one or more payer selected accounts to an account associated with the biller.

45. The method of embodiment 30, wherein the one or more accounts associated with the payer comprise a payer modified demand deposit account (POSDDA) configured to only receive payer directed electronic "on us" intra-bank network and external payment network funding credits from at least one of the one or more traditional demand deposit accounts of the payer and only receive payer directed electronic "on us" intra-bank network and external payment network funding credits from at least one of the one or more conjunctive credit lines of the payer and wherein the POSDDA is configured such that it is not debited or credited by a biller or any source other than only the associated payer and only the financial institution or hosting entity that hosts the account and only by an associated Bill-Pay processor or bill pay solution internal to, or external of, the payer authorized user financial institution or hosting entity thereof.

46. The method of embodiment 30, wherein the one or more accounts associated with the payer comprise a payer modified demand deposit account (POSDDA) configured to only perform payer directed electronic "on us" intra-bank network and external payment network funding debits of at least one of the one or more traditional demand deposit accounts of the payer and only perform payer directed electronic "on us" intra-bank network and external payment network funding debits of at least one of the one or more conjunctive credit lines of the payer and wherein the POSDDA is configured such that it is not debited or credited by a biller or any source other than only the associated payer and only the financial institution or hosting entity that hosts the account and only by a Bill-Pay processor or bill pay solution internal to, or external of, the payer authorized user financial institution or hosting entity thereof.

47. The method of embodiment 30, wherein the one or more accounts associated with the payer comprise a payer modified demand deposit account (POSDDA) and one or more traditional demand deposit accounts of the payer, and one or more conjunctive credit lines of the payer, and wherein the one or more conjunctive credit lines of the payer are configured such that only the payer directs electronic "on us" intra-bank network and external payment network funding credits from any one of the one or more conjunctive credit lines of the payer, and only into the payer modified demand deposit account (POSDDA), and the one or more conjunctive credit lines of the payer are configured such that the accounts are not debited or credited by a biller or any source other than only the associated payer and only the financial institution or hosting entity that hosts the accounts.

48. The method of embodiment 30, wherein the one or more accounts associated with the payer comprise a payer modified demand deposit account (POSDDA) and one or more traditional demand deposit accounts of the payer, and one or more conjunctive credit lines of the payer, and wherein the one or more conjunctive credit lines of the payer are configured such that only the payer directs electronic "on us" intra-bank network and external payment network funding debits of any one of the one or more conjunctive credit lines of the payer, and only from and into the payer modified demand deposit account (POSDDA), and the one or more conjunctive credit lines of the payer are configured such that the accounts are not debited or credited by a biller or any source other than only the associated payer and only the financial institution or hosting entity that hosts the accounts.

49. The method of embodiment 30, wherein the one or more accounts associated with the payer comprise a payer modified demand deposit account (POSDDA) and one or more traditional demand deposit accounts of the payer, and one or more conjunctive credit lines of the payer, and wherein the payer modified demand deposit account (POSDDA) is hosted within one payer associated financial institution, and wherein the one or more traditional demand deposit accounts of the payer, and the one or more conjunctive credit lines of the payer are hosted within the same financial institution that hosts the payer modified demand deposit account (POSDDA) and are also hosted within other financial institutions of the payer, and wherein the payer modified demand deposit account (POSDDA) is configured to only receive payer directed electronic "on us" intra-bank network and external payment network credits from, and only perform payer directed electronic "on us" intra-bank network and external payment network funding debits of, at least one of the one or more internal or external traditional demand deposit accounts of the payer and is configured to only receive payer directed electronic "on us" intra-bank network and external payment network credits from, and only perform payer directed electronic "on us" intra-bank network and external payment network funding debits of, at least one of the one or more internal or external conjunctive credit lines of the payer and wherein the payer POSDDA is configured such that it is not debited or credited by a biller or any source other than only the associated payer and only the financial institution or hosting entity that hosts the account and only by an associated Bill-Pay processor, internal to, or external of, the payer authorized user financial institution or hosting entity thereof.

50. The method of embodiment 30, wherein the one or more accounts associated with the payer comprise a payer modified demand deposit account (POSDDA) and one or more traditional demand deposit accounts of the payer, and one or more conjunctive credit lines of the payer, and wherein the payer modified demand deposit account (POSDDA) is hosted within one payer associated financial institution, and wherein the one or more traditional demand deposit accounts of the payer, and the one or more conjunctive credit lines of the payer are hosted within the same financial institution that hosts the payer modified demand deposit account (POSDDA) and are also hosted within other financial institutions of the payer, and wherein the payer modified demand deposit account (POSDDA) is configured to only receive payer directed electronic "on us" intra-bank network and external payment network credits from, and only perform payer directed electronic "on us" intra-bank network and external payment network funding debits of, at least one of the one or more internal or external traditional demand deposit accounts of the payer and is configured to only receive payer directed electronic "on us" intra-bank network and external payment network credits from, and only perform payer directed electronic "on us" intra-bank network and external payment network funding debits of, at least one of the one or more internal or external conjunctive credit lines of the payer and wherein the payer POSDDA is configured such that it is not debited or credited by a biller or any source other than only the associated payer and only the financial institution or hosting entity that hosts the account and only by an associated Bill-Pay processor, internal to, or external of, the payer authorized user financial institution or hosting entity thereof.

51. The method of embodiment 30, wherein the one or more accounts associated with the payer comprise a payer modified demand deposit account (POSDDA) and one or more traditional demand deposit accounts of the payer, and one or more conjunctive credit lines of the payer, all hosted within one payer associated financial institution that has one or more branch locations, that have one or more electronic "on us" intra-bank network, and wherein the payer modified demand deposit account (POSDDA) is configured to only receive payer directed electronic "on us" intra-bank network credits from, and only perform payer directed electronic "on us" intra-bank funding debits of at least one of the one or more internal traditional demand deposit accounts of the payer and only receive payer directed electronic "on us" intra-bank network funding credits from, and only perform payer directed electronic "on us" intra-bank funding debits of, at least one of the one or more internal conjunctive credit lines of the payer and wherein the payer POSDDA is configured such that it will not be debited or credited by a biller or any source other than only the associated payer and only the financial institution or hosting entity that hosts the account and only by a Bill-Pay processor or bill pay solution, internal to, or external of, the payer authorized user financial institution or hosting entity thereof.

52. The method of embodiment 30, wherein a payer and biller each have the same types of accounts as each other, and perform the same functions of each other as a payer is configured to also be a biller and a biller is configured to also be a payer.

53. The method of embodiment 30, wherein a payer authorized user financial institution and a biller financial institution are one in the same and each provides or supports the same accounts and functions as the other.

54. The method of embodiment 30, wherein as few as one, or as many as all, of the payer credit lines, and as few as one, or as many as all, other financial accounts of the payer, are enabled with the same duplicative functionality and capacity as the payer POSDDA.

55. The method of embodiment 30, wherein the one or more accounts associated with the payer include a payer POSDDA that receives credits, wherein the payer POSDDA may not be decremented by a biller or any source other than a Bill-Pay processor, internal to, or external of, the financial institution or hosting entity that hosts the payer POSDDA, and wherein only the payer may initiate one or more payments to one or more billers from the payer POSDDA to be fulfilled via a Bill-Pay processor, internal to, or external of, the financial institution or hosting entity that hosts the payer POSDDA and wherein the one or more accounts associated with one or both of the payer or a POSDDA associated with the payer include one or both of an internal or an external payer credit line account associated with the payer and configured in such a way that only the payer may initiate decrements out of any such accounts and the accounts may not be decremented by or from a biller or any source other than a financial institution or hosting entity that hosts the internal and/or external credit line accounts associated with the payer, the payment transaction solution being a certified sealed system that provides a guarantee of funds from the payer to the biller.

56. The method of embodiment 30, wherein for any type of account a financial institution hosts, the financial institution has management oversight of the account and may freeze, levee fees and penalties against an account and/or take control of the account.

57. The method of embodiment 30, wherein a Bill-Pay processor or Bill-Pay solution, internal to, or external of, the financial institution, is configured to perform a debit of, or receive a credit from, a POSDDA.

58. The method of embodiment 30, wherein a host financial institution is configured to create and host one or more payer accounts and/or one or more biller accounts on behalf of another financial institution's payers and billers.

59. A tangible, non-transitory, machine-readable medium storing instructions that when executed by a data processing apparatus cause the data processing apparatus to perform operations comprising those of any of embodiments 31-58.

What is claimed is:

1. A user device for providing automatic triggering of a code scanning application by a user application to facilitate transaction security and a user-friendly obtainment of information corresponding to physically-presented code, the user device comprising:
   one or more processors; and
   memory storing computer instructions that, when executed by the one or more processors, causes the one or more processors to perform operations comprising:
      storing a user application;
      storing a code scanning application;
      storing a plurality of code types;

scanning, via the user application, a pattern on a physical object;

detecting, via the user application, a code type of the plurality of code types using the user application's scanned pattern;

identifying, via the user application, the code scanning application in response to the detection of the code type;

activating, via the user application, the identified code scanning application;

scanning, via the activated code scanning application, the pattern on the physical object;

deriving, via the code scanning application, a code from the code scanning application's scanned pattern;

obtaining, via the user application, the code from the code scanning application;

obtaining, via the user application, a payment authorization for a transaction;

transmitting, via the user application, the code over the Internet to a computer system; and transmitting, via the user application, a message comprising the payment authorization over the Internet to the computer system.

2. The user device of claim 1, wherein the operations further comprise:

activating, via the user application, based on the detection of the code type, the code scanning application in a background process of the user device;

subsequent to the activation of the code scanning application, obtaining, via the user application, a user input specifying pattern/code scanning;

running, based on the user input, the code scanning application in a foreground process of the user device; and scanning, via the code scanning application, the pattern on the physical object.

3. The user device of claim 1, wherein the operations further comprise:

determining that a predetermined threshold number of codes has been obtained, the predetermined threshold number of codes being greater than one code; and transmitting, via the user application, based on the determination that the predetermined threshold number of codes has been obtained, the code and one or more other codes over the Internet to the computer system.

4. The user device of claim 1, wherein the operations further comprise:

determining that a predetermined threshold number of codes has been obtained, the predetermined threshold number of codes being greater than one code; and performing, based on the determination that the predetermined threshold number of codes has been obtained, one or more actions comprising (i) processing the code and one or more other codes and determining information corresponding to the respective codes from the processing of the code, (ii) querying one or more sources and obtaining results corresponding to the respective codes from the querying, or (iii) compiling billing information using the determined information.

5. The user device of claim 1, wherein the operations further comprise:

determining, at a first time, that a predetermined threshold number of codes has not been obtained, the predetermined threshold number of codes being greater than one code;

subsequent to the obtainment of the code from the code scanning, and prior to a second time after the first time, querying one or more local sources at the user device without querying one or more remote sources based on the determination that the predetermined threshold number of codes has not been obtained;

obtaining first results corresponding to at least one of the respective codes from the querying of the one or more local sources;

determining, at a second time after the first time, that the predetermined threshold number of codes has been obtained;

querying, based on the determination that the predetermined threshold number of codes has been obtained, the one or more remote sources; and obtaining second results corresponding to at least one of the respective codes from the querying of the one or more remote sources.

6. The user device of claim 1, wherein the operations further comprise:

determining that a predetermined threshold amount of time has passed since obtaining at least one code from the code scanning application; and transmitting, via the user application, based on the determination that the predetermined threshold amount of time has passed, the code and one or more other codes over the Internet to the computer system.

7. The user device of claim 1, wherein the operations further comprise:

determining that a predetermined threshold amount of time has passed since obtaining at least one code from the code scanning application; and performing, based on the determination that the predetermined threshold amount of time has passed, one or more actions comprising (i) processing the code and one or more other codes and determining information corresponding to the respective codes from the processing of the code, (ii) querying one or more sources and obtaining results corresponding to the respective codes from the querying, or (iii) compiling billing information using the determined information.

8. The user device of claim 1, wherein the operations further comprise:

determining that a predetermined threshold amount of time has passed since obtaining at least one code from the code scanning application;

querying, based on the determination that the predetermined threshold amount of time has passed, one or more sources; and obtaining to obtain results corresponding to the respective codes from the querying.

9. The user device of claim 1, wherein the operations further comprise:

obtaining, via the user application, fund availability information from the computer system over the Internet; and transmitting, via the user application, a selection of one or more accounts of a user of the user application to the computer system over the Internet.

10. A method of providing automatic triggering of a code scanning application by a user application to facilitate transaction security and a user-friendly obtainment of information corresponding to physically-presented code, the method comprising:

storing, by a user device, a user application;

storing, by the user device, a code scanning application;

storing, by the user device, a plurality of code types;

scanning, via the user application, a pattern on a physical object;
detecting, via the user application, a code type of the plurality of code types using the user application's scanned pattern;
identifying, via the user application, the code scanning application in response to the detection of the code type;
activating, via the user application, the identified code scanning application;
scanning, via the activated code scanning application, the pattern on the physical object;
deriving, via the code scanning application, a code from the code scanning application's scanned pattern;
obtaining, via the user application, the code from the code scanning application;
obtaining, via the user application, a payment authorization for a transaction;
transmitting, via the user application, the code over the Internet to a computer system; and
transmitting, via the user application, a message comprising the payment authorization over the Internet to the computer system.

11. The method of claim 10, further comprising:
activating, via the user application, based on the detection of the code type, the code scanning application in a background process of the user device;
subsequent to the activation of the code scanning application, obtaining, via the user application, a user input specifying pattern/code scanning;
running, by the user device, based on the user input, the code scanning application in a foreground process of the user device; and
scanning, via the code scanning application, the pattern on the physical object.

12. The method of claim 10, further comprising:
determining, by the user device, that a predetermined threshold number of codes has been obtained, the predetermined threshold number of codes being greater than one code; and
transmitting, via the user application, based on the determination that the predetermined threshold number of codes has been obtained, the code and one or more other codes over the Internet to the computer system.

13. The method of claim 10, further comprising:
determining, by the user device, that a predetermined threshold number of codes has been obtained, the predetermined threshold number of codes being greater than one code; and
performing, by the user device, based on the determination that the predetermined threshold number of codes has been obtained, one or more actions comprising (i) processing the code and one or more other codes and determining information corresponding to the respective codes from the processing of the code, (ii) querying one or more sources and obtaining results corresponding to the respective codes from the querying, or (iii) compiling billing information using the determined information.

14. The method of claim 10, further comprising:
determining, by the user device, at a first time, that a predetermined threshold number of codes has not been obtained, the predetermined threshold number of codes being greater than one code;
subsequent to the obtainment of the code from the code scanning, and prior to a second time after the first time, querying, by the user device, one or more local sources at the user device without querying one or more remote sources based on the determination that the predetermined threshold number of codes has not been obtained;
obtaining, by the user device, first results corresponding to at least one of the respective codes from the querying of the one or more local sources;
determining, by the user device, at a second time after the first time, that the predetermined threshold number of codes has been obtained;
querying, by the user device, based on the determination that the predetermined threshold number of codes has been obtained, the one or more remote sources; and
obtaining, by the user device, second results corresponding to at least one of the respective codes from the querying of the one or more remote sources.

15. The method of claim 10, further comprising:
determining, by the user device, that a predetermined threshold amount of time has passed since obtaining at least one code from the code scanning application; and
transmitting, via the user application, based on the determination that the predetermined threshold amount of time has passed, the code and one or more other codes over the Internet to the computer system.

16. The method of claim 10, further comprising:
determining, by the user device, that a predetermined threshold amount of time has passed since obtaining at least one code from the code scanning application; and
performing, by the user device, based on the determination that the predetermined threshold amount of time has passed, one or more actions comprising (i) processing the code and one or more other codes and determining information corresponding to the respective codes from the processing of the code, (ii) querying one or more sources and obtaining results corresponding to the respective codes from the querying, or (iii) compiling billing information using the determined information.

17. The method of claim 10, further comprising:
determining, by the user device, that a predetermined threshold amount of time has passed since obtaining at least one code from the code scanning application;
querying, by the user device, based on the determination that the predetermined threshold amount of time has passed, one or more sources; and
obtaining, by the user device, results corresponding to the respective codes from the querying.

18. The method of claim 10, further comprising:
obtaining, via the user application, fund availability information from the computer system over the Internet; and
transmitting, via the user application, a selection of at least one account of the one or more accounts of a user of the user application to the computer system over the Internet.

* * * * *